United States Patent
Aihara et al.

[11] Patent Number: 5,630,024
[45] Date of Patent: May 13, 1997

[54] METHOD AND APPARATUS FOR PROCESSING USING NEURAL NETWORK WITH REDUCED CALCULATION AMOUNT

[75] Inventors: Kimihisa Aihara; Kuniharu Uchimura, both of Kanagawaken, Japan

[73] Assignee: Nippon Telegraph and Telephone Corporation, Tokyo, Japan

[21] Appl. No.: 373,440

[22] Filed: Jan. 17, 1995

[30] Foreign Application Priority Data

Jan. 19, 1994 [JP] Japan .................................. 6-003885
Jan. 19, 1994 [JP] Japan .................................. 6-004043
Jul. 18, 1994 [JP] Japan .................................. 6-165641

[51] Int. Cl.$^6$ .................................................. G06F 15/18
[52] U.S. Cl. ................................................ 395/27; 395/24
[58] Field of Search .................................. 395/22, 27

[56] References Cited

U.S. PATENT DOCUMENTS

| | | | |
|---|---|---|---|
| 4,943,931 | 7/1990 | Allen | 395/27 |
| 5,131,073 | 7/1992 | Furuta et al. | |
| 5,166,539 | 11/1992 | Uchimura et al. | |
| 5,208,900 | 5/1993 | Gardner | 395/27 |
| 5,276,773 | 1/1994 | Knauer et al. | 395/27 |
| 5,324,991 | 6/1994 | Furuta et al. | 307/201 |
| 5,350,953 | 9/1994 | Swenson et al. | 395/27 |
| 5,353,383 | 10/1994 | Uchimura et al. | 395/24 |
| 5,384,896 | 1/1995 | Sakaue et al. | 395/24 |
| 5,408,585 | 4/1995 | Burel | 395/21 |
| 5,440,671 | 8/1995 | Shiratani et al. | 395/25 |
| 5,450,528 | 9/1995 | Chung et al. | 395/27 |
| 5,467,429 | 11/1995 | Uchimura et al. | 395/24 |
| 5,473,730 | 12/1995 | Simard | 395/27 |
| 5,473,731 | 12/1995 | Seligson | 395/27 |
| 5,481,646 | 1/1996 | Furuta et al. | 395/27 |
| 5,490,164 | 2/1996 | Shimura | 395/22 |
| 5,519,813 | 5/1996 | Furuta et al. | 395/27 |

OTHER PUBLICATIONS

IEEE Journal of Solid–State Circuit, vol. 27, No. 12, 1 Dec. 1992, pp. 1862–1867, XP 000329038, Kuniharu Uchimura et al., "A High–Speed Digital Neural Network Chip with Low–Power Chain–Reaction Architecture".

Neural Information Processing Systems, Editor D. Anderson, American Institute of Physics, 1987 Denver, pp. 573–583, Murray "Bit–Serial Neural Networks", p. 576, line 8, p. 578, line 13, Figures 3–5.

*Primary Examiner*—Robert W. Downs
*Assistant Examiner*—Jeffrey Smith
*Attorney, Agent, or Firm*—Banner & Witcoff, Ltd.

[57] ABSTRACT

A neural network circuit and a processing scheme using the neural network circuit in which a synapse calculation for each input value and a corresponding synapse weight of each input value which are expressed by binary bit sequences is carried out by using a sequentially specified bit of the corresponding synapse weight, a summation calculation for sequentially summing synapse calculation results for the input values is carried out to obtain a summation value, a prescribed nonlinear processing is applied to the obtained summation value so as to determine the output value, whether the obtained summation value reached to a saturation region of a transfer characteristic of the prescribed nonlinear processing is judged, the synapse calculation and the summation calculation are controlled to sequentially carry out the synapse calculation from upper bits of the corresponding synapse weight, and to stop the synapse calculation and the summation calculation whenever it is judged that the obtained summation value reached to the saturation region.

42 Claims, 34 Drawing Sheets

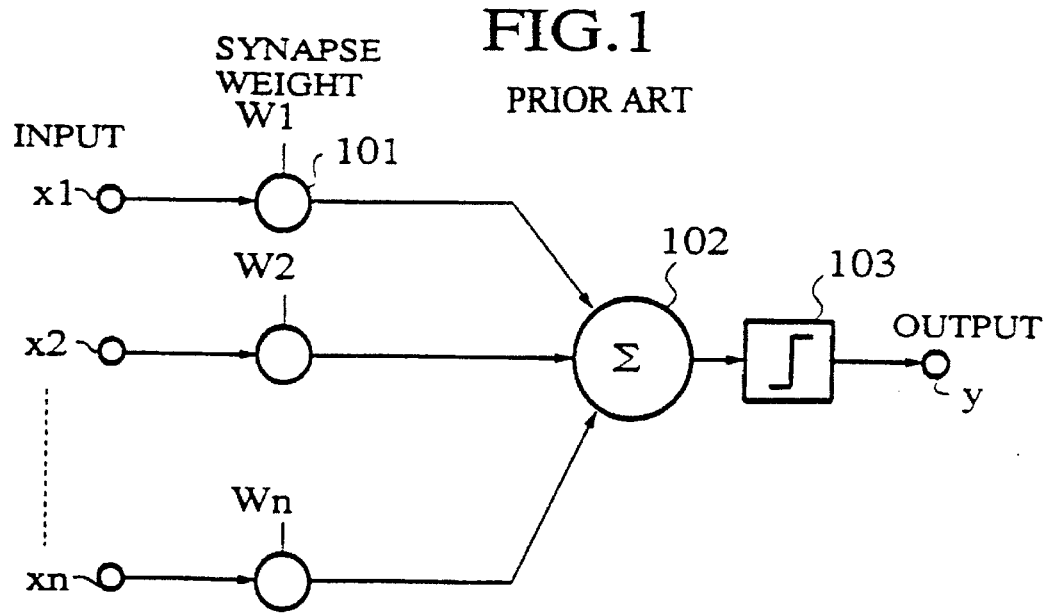
FIG. 1 PRIOR ART
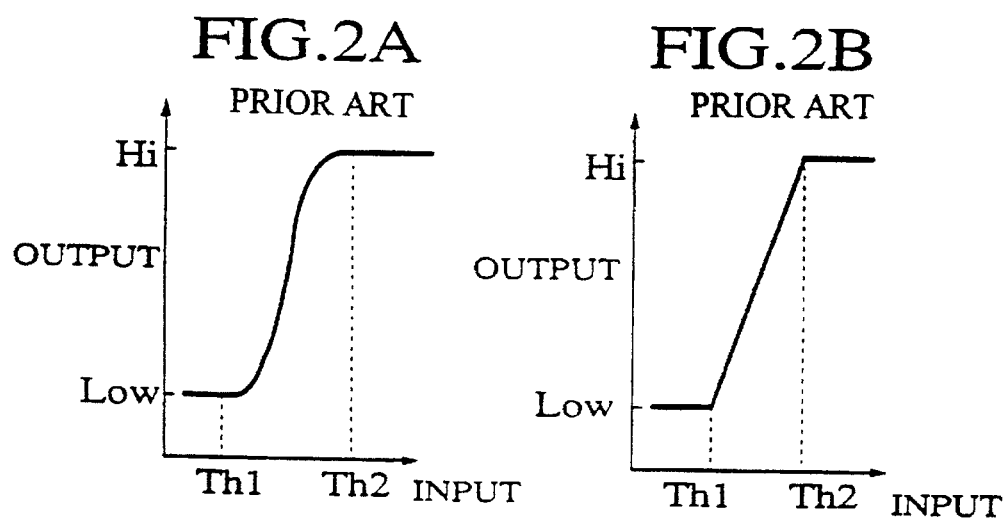
FIG. 2A PRIOR ART
FIG. 2B PRIOR ART
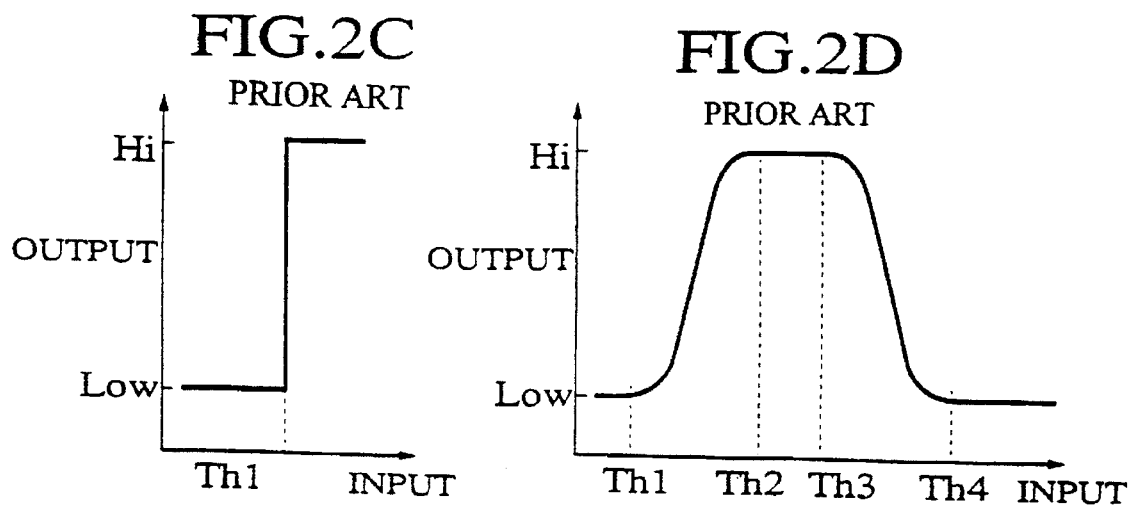
FIG. 2C PRIOR ART
FIG. 2D PRIOR ART

FIG.6

EXAMPLE : 11 × (−13) = −143

```
      1011
  ×   1101
  ───────
      1011
     00000
    101100
   1011000
```

CALCULATION RESULT FOR ABSOLUTE VALUES

↓

```
   10100
  000000
 1010011
10100111
```

CONVERSION INTO NEGATIVE VALUE BY 1'S COMPLIMENTARY EXPRESSION

TOTAL OF THESE IS INITIAL VALUE OF SUMMATION VALUE →

$$\begin{pmatrix} -15 & +4 \\ 0 & \\ -63 & +16+2+1 \\ -127 & +32+4+2+1 \end{pmatrix}$$

= −11
= 0
= −44
= −88

TOTAL −143

| | 1ST SUMMATION VALUE | 2ND SUMMATION VALUE |
|---|---|---|
| INITIAL VALUE | 0000000 | 1010001 |
| (1) | 1101111=0000000−10000 | |
| (2) | 1100111=1101111−1000 | |
| (3) | | 1011001=1010001+1000 |
| (4) | | 1011101=1011001+100 |
| (5) | 1100011=1100111−100 | |
| (6) | 1100001=1100011−10 | |
| (7) | | 1011111=1011101+10 |
| (8) | | 1100000=1011111+1 |
| (9) | | 1100001=1100000+1 |
| FINAL VALUE | 1100001 | 1100001 |

FIG. 27

EXAMPLE : (-5) × 6 = -30

- INPUT VALUE CONVERTED 2'S COMPLEMENTARY EXPRESSIONS AS SYNAPSE WEIGHT IS NEGATIVE
- MAX OF NEGATIVE VALUE IN 4 DIGITS 2'S COMPLEMENTARY EXPRESSION IS "-8"="1000"
- MIN OF NEGATIVE VALUE IN 4 DIGITS 2'S COMPLEMENTARY EXPRESSION IS "-1"="1111"

INITIAL VALUE OF SUMMATION VALUE FOR MONOTONOUSLY INCREASING CALCULATIONS IS "-40"

BIT CALCULATIONS OF SUMMATION VALUE FOR MONOTONOUSLY INCREASING CALCULATIONS $$\begin{array}{r}1011\\ \times)\ 1000\\ \hline 1011000\end{array}$$

(1) (2) (3)
$-40 + 0 + 10 + 0 = -30$

SYNAPSE WEIGHT  0   1   0

ORDERS OF SERIAL CALCULATIONS $$\begin{array}{r}1011\\ \times)\ 0001\\ \hline 1011\end{array}$$

$-5 - 20 - 0 - 5 = -30$
(1) (2) (3)

INITIAL VALUE OF SUMMATION VALUE FOR MONOTONOUSLY DECREASING CALCULATIONS IS "-5"

BIT CALCULATIONS OF SUMMATION VALUE FOR MONOTONOUSLY DECREASING CALCULATIONS

CONVERTED TO BE MONOTONOUSLY INCREASING CALCULATIONS

|  | SUMMATION VALUE FOR MONOTONOUSLY INCREASING CALCULATIONS | SUMMATION VALUE FOR MONOTONOUSLY DECREASING CALCULATIONS |
|---|---|---|
| INITIAL VALUE | 1011000 | 0000101 |
| (1) (2) (3) | 1100010 = 1011000 + 0001010 | 0011001 = 0000101 + 0010100<br>0011110 = 0011001 + 0000101 |
| FINAL VALUE | 1100010 | 0011110 |

METHOD AND APPARATUS FOR PROCESSING USING NEURAL NETWORK WITH REDUCED CALCULATION AMOUNT

BACKGROUND OF THE INVENTION

1. Field of the Invention

The present invention relates to a neural network circuit constructed by connecting a multiplicity of neuron circuits formed by synapse calculation circuits, summation circuits, and nonlinear units, and a processing scheme using such a neural network circuit.

2. Description of the Background Art

A neural network circuit generally comprises a multiplicity of neuron circuits connected together, where each neuron circuit is a circuit with a plurality of inputs ($x1, x2, \ldots, xn$) and one output ($y$) as shown in FIG. 1. In this neuron circuit of FIG. 1, a plurality of synapse weights ($w1, w2, \ldots, wn$) are provided in correspondence to a plurality of inputs, and each synapse calculation circuit 101 carries out a calculation for obtaining a product of each input value and each synapse weight value, an absolute value of a difference between each input value and each synapse weight value, or a square of a difference between each input value and each synapse weight value, etc., while a summation circuit 102 sums calculation results obtained by all the synapse calculation units 101, and then a nonlinear unit 103 determines an output value according to a size of a summation result obtained by the summation circuit 102.

Here, the nonlinear unit 103 which finally determines the output value has one of transfer characteristics as shown in FIGS. 2A to 2D. Among them, the sigmoid function form of FIG. 2A has the most general applicability, but it is also possible to use the simplified forms such as a polygonal line form as shown in FIG. 2B or a step function form as shown in FIG. 2C for the purpose of simplifying the calculations, or a non-monotonic form as shown in FIG. 2D for the purpose of improving the functionality of the neural network circuit. In FIGS. 2A to 2D, symbols Th, Th1, Th2, Th3, and Th4 indicate saturation region boundary values in the respective figures which separate the saturation regions in which the output is constant at either Hi or Low level and transient regions in which the output changes according to the input.

The specific structure of the neural network circuit is determined by the connections of such neuron circuits. The most generally used structure is a triple layer structure shown in FIG. 3, which comprises an input layer formed by a plurality of input terminals x1 to xn, a hidden layer formed by a plurality of neuron circuits 111, and an output layer formed by a plurality of neuron circuits 112. The signal entered from the input terminals x1 to xn are entered into all the neuron circuits 111 of the hidden layer in parallel and processed in parallel, while the outputs of all the neuron circuits 111 of the hidden layer are entered into all the neuron circuits 112 of the output layer in parallel and processed in parallel. Whenever the input signal is entered, the specific neuron circuits react to the entered input signal and realize the processing such as that of the recognition.

Conventionally, in a case of realizing a large scale neural network circuit having the above described function, it has been customary to construct the neural network circuit by combining a micro-processor 121 and RAMs 122 through a bus 123 as shown in FIG. 4. In such a configuration, the synapse calculations, the summation, and the nonlinear processing are carried out by the micro-processor 121, and the synapse weights are stored in the RAMs 122. During the calculations at the micro-processor 121, whenever the synapse weights become necessary, the accesses to the RAMs 122 are made to read out the necessary synapse weights.

In such a configuration, the scale of the realizable neural network circuit can be enlarged by increasing a number of RAMs 122, and the calculation algorithm can be changed easily by changing the program installed on the micro-processor 121.

However, in this conventional configuration, the processing speed is restricted by the access speed with respect to the synapse weights in the RAMs 122. In addition, the amount of calculations for the synapse calculations and the summation increases as the scale of the neural network circuit becomes larger, and this in turn restricts the processing speed for the following reason. Namely, in this conventional configuration, the synapse calculations with respect to all bits of the input value and all bits of the synapse weight for all synapse connections as well as the summation of all the synapse calculation results must be carried out, so that the amount of calculations can be quite enormous and the accesses to the synapse weights in the RAMs 122 associated with these calculations can also take considerable amount of time.

In order to cope with this problem concerning the amount of calculations required in each neuron circuit, the following two propositions have been made conventionally.

(1) A scheme disclosed in Japanese Patent Application Laid Open No. 4-112362 (1992) and U.S. Pat. No. 5,166,539 in which a difference or a distance between each input and each synapse weight, or a weight value due to each synapse weight is obtained as a weight calculation value of a single polarity by a weight calculation circuit, and all the weight calculation values are summed, and then the nonlinear processing is applied to this summation result to obtain an appropriate output, where an intermediate result of the summation calculation and the saturation region boundary values of the nonlinear unit are compared to judge whether or not to continue the calculations for the remaining inputs such that the summation calculations for the remaining inputs can be omitted whenever the intermediate result reached to the saturation region, while the intermediate result requiring the further summation calculations is selected by a selective control circuit, so as to reduce the circuit scale and the power consumption of the summation circuit. This scheme, however, is applicable only to a case in which the weight calculation result of the input and the synapse weight takes a positive value, so that its applicability is rather limited.

(2) A scheme disclosed in Y. Kondo, et al.: "A 1.2GFLOPS Neural Network Chip Exhibiting Fast Convergence", 1994 IEEE International Solid-State Circuit Conference, Digests of Technical Papers, pp. 218–219, February, 1994, in which the weight calculation using the synapse weight with a value less than a certain prescribed value is omitted in order to increase the processing speed. This scheme, however, is associated with a problem that the accurate summation calculation result may not be obtainable due to the accumulation of small errors due to the omitted weight calculations when the weight calculation values are summed.

SUMMARY OF THE INVENTION

It is therefore an object of the present invention to provide a neural network circuit and a processing scheme using the neural network circuit which are capable of reducing an amount of calculations required for the synapse calculations and the summation as well as a number of accesses to the synapse weights, so as to realize a large scale neural network circuit with a high processing speed for obtaining an accurate final result regardless of values taken by the input values and the synapse weights.

According to one aspect of the present invention there is provided a neural network circuit receiving a plurality of input values and outputting one output value, comprising: calculation means for carrying out a synapse calculation for each input value and a corresponding synapse weight of each input value which are expressed by binary bit sequences, by using a sequentially specified bit of the corresponding synapse weight, and a summation calculation for sequentially summing synapse calculation results for the input values to obtain a summation value; synapse weight memory circuit for storing a plurality of synapse weights; memory read out circuit for selectively reading out a specified bit of a specified synapse weight from the synapse weight memory circuit to the calculation means; a nonlinear unit for applying a prescribed nonlinear processing to the summation value obtained by the calculation means so as to determine the output value; judging means for judging whether the summation value obtained by the calculation means reached to a saturation region of a transfer characteristic of the nonlinear unit; and control means for controlling the memory read out circuit and the calculation means to sequentially carry out the synapse calculation from upper bits of the corresponding synapse weight, and to stop the synapse calculation and the summation calculation whenever the judging means judges that the summation value obtained by the calculation means reached to the saturation region.

According to another aspect of the present invention there is provided a neural network system, comprising: a plurality of neural network circuits which are independently operating with respect to each other, each neural network circuit receives a plurality of input values and outputs one output value, and includes: calculation means for carrying out a synapse calculation for each input value and a corresponding synapse weight of each input value which are expressed by binary bit sequences, by using all bits of each input value and each one bit of the corresponding synapse weight sequentially specified from upper bits to obtain a partial synapse calculation result for said each one bit and adding each partial synapse calculation result for said each one bit with previous partial synapse calculation results for upper bits of said each one bit, and a summation calculation for sequentially summing synapse calculation results for the input values to obtain a summation value; synapse weight memory circuit for storing a plurality of synapse weights; memory read out circuit for selectively reading out a specified bit of a specified synapse weight from the synapse weight memory circuit to the calculation means; a nonlinear unit for applying a prescribed nonlinear processing to the summation value obtained by the calculation means so as to determine the output value; judging means for judging whether the summation value obtained by the calculation means reached to a saturation region of a transfer characteristic of the nonlinear unit; and control means for controlling the memory read out circuit and the calculation means to sequentially carry out the synapse calculation from upper bits of the corresponding synapse weight, and to stop the synapse calculation and the summation calculation whenever the judging means judges that the summation value obtained by the calculation means reached to the saturation region; and a common input value register for sequentially supplying said plurality of input values to each neural network circuit such that an identical one of said plurality of input values is supplied to all of said plurality of neural network circuits simultaneously.

According to another aspect of the present invention there is provided a neural network circuit receiving a plurality of input values and outputting one output value, comprising: reference input value register means for storing a plurality of reference input values in correspondence to said plurality of input values; subtractor means for calculating a difference between each input value and a corresponding one of said plurality of reference input values to obtain an input difference for each input value; calculation means for carrying out a synapse calculation for each input difference and a corresponding synapse weight of each input value and a summation calculation for summing synapse calculation results to obtain a summation value; synapse weight memory circuit for storing a plurality of synapse weights; memory read out circuit for selectively reading out the corresponding synapse weight from the synapse weight memory circuit to the calculation means; a nonlinear unit for applying a prescribed nonlinear processing to the summation value obtained by the calculation means so as to determine the output value; coincidence detection means for detecting a coincidence of each input value and the corresponding one of said plurality of reference input values; reference output value register means for storing a reference output value corresponding to said plurality of reference input values; switch means for selectively outputting one of the output value obtained by the nonlinear unit and the reference output value stored in the reference output value register means; and control means for controlling the calculation means and the switch means according to the coincidence detected by the coincidence detection means such that the calculation means stops the synapse calculation and the summation calculation while the switch means selectively outputs the reference output value stored in the reference output value register means whenever the coincidence detection means detects the coincidence, whereas the calculation means carries out the synapse calculation and the summation calculation while the switch means selectively outputs the output value obtained by the nonlinear unit otherwise.

According to another aspect of the present invention there is provided a processing scheme using a neural network circuit receiving a plurality of input values and outputting one output value, comprising the steps of: (a) carrying out a synapse calculation for each input value and a corresponding synapse weight of each input value which are expressed by binary bit sequences, by using a sequentially specified bit of the corresponding synapse weight, and a summation calculation for sequentially summing synapse calculation results for the input values to obtain a summation value; (b) applying a prescribed nonlinear processing to the summation value obtained at the step (a) so as to determine the output value; (c) judging whether the summation value obtained at the step (a) reached to a saturation region of a transfer characteristic of the prescribed nonlinear processing applied at the step (b); and (d) controlling the step (a) to sequentially carry out the synapse calculation from upper bits of the corresponding synapse weight, and to stop the synapse calculation and the summation calculation whenever the step (c) judges that the summation value obtained at the step (a) reached to the saturation region.

According to another aspect of the present invention there is provided a processing scheme using a neural network system, comprising the steps of: (a) independently operating a plurality of neural network circuits with respect to each other, by operating each neural network circuit which receives a plurality of input values and outputs one output value by the steps of: (a1) carrying out a synapse calculation for each input value and a corresponding synapse weight of each input value which are expressed by binary bit sequences, by using all bits of each input value and each one bit of the corresponding synapse weight sequentially specified from upper bits to obtain a partial synapse calculation result for said each one bit and adding each partial synapse calculation result for said each one bit with previous partial synapse calculation results for upper bits of said each one bit, and a summation calculation for sequentially summing synapse calculation results for the input values to obtain a summation value; (a2) applying a prescribed nonlinear processing to the summation value obtained at the step (a1) so as to determine the output value; (a3) judging whether the summation value obtained at the step (a1) reached to a saturation region of a transfer characteristic of the prescribed nonlinear processing applied at the step (a2); and (a4) controlling the step (a1) to sequentially carry out the synapse calculation from upper bits of the corresponding synapse weight, and to stop the synapse calculation and the summation calculation whenever the step (a3) judges that the summation value obtained at the step (a1) reached to the saturation region; and (b) sequentially supplying said plurality of input values to each neural network circuit such that an identical one of said plurality of input values is supplied to all of said plurality of neural network circuits simultaneously.

According to another aspect of the present invention there is provided a processing scheme using a neural network circuit receiving a plurality of input values and outputting one output value, comprising the steps of: (a) storing in advance a plurality of reference input values in correspondence to said plurality of input values; (b) calculating a difference between each input value and a corresponding one of said plurality of reference input values to obtain an input difference for each input value; (c) carrying out a synapse calculation for each input difference and a corresponding synapse weight of each input value and a summation calculation for summing synapse calculation results to obtain a summation value; (d) applying a prescribed nonlinear processing to the summation value obtained at the step (c) so as to determine the output value; (e) detecting a coincidence of each input value and the corresponding one of said plurality of reference input values; (f) storing in advance a reference output value corresponding to said plurality of reference input values; (g) selectively outputting one of the output value obtained at the step (d) and the reference output value stored at the step (f); and (h) controlling the steps (c) and (g) according to the coincidence detected at the step (e) such that the step (c) stops the synapse calculation and the summation calculation while the step (g) selectively outputs the reference output value stored at the step (f) whenever the step (e) detects the coincidence, whereas the step (c) carries out the synapse calculation and the summation calculation while the step (g) selectively outputs the output value obtained at the step (d) otherwise.

Other features and advantages of the present invention will become apparent from the following description taken in conjunction with the accompanying drawings.

BRIEF DESCRIPTION OF THE DRAWINGS

FIG. 1 is a schematic diagram of a conventional neuron circuit for a conventional neural network circuit.

FIGS. 2A to 2D are graphs showing typical transfer characteristics of a nonlinear unit used in a neuron circuit of a neural network circuit.

FIG. 6 is a diagrammatic illustration of an exemplary calculation for obtaining an initial value of a summation value in the neuron circuit of FIG. 5.

FIG. 27 is a diagrammatic illustration of an exemplary calculation for obtaining initial values of summation values in the neuron circuit of FIG. 22 for another case.

DETAILED DESCRIPTION OF THE PREFERRED EMBODIMENTS

Referring now to FIGS. 5 to 8, the first embodiment of a neural network circuit and a processing scheme using the neural network circuit according to the present invention will be described in detail.

Figure 3:
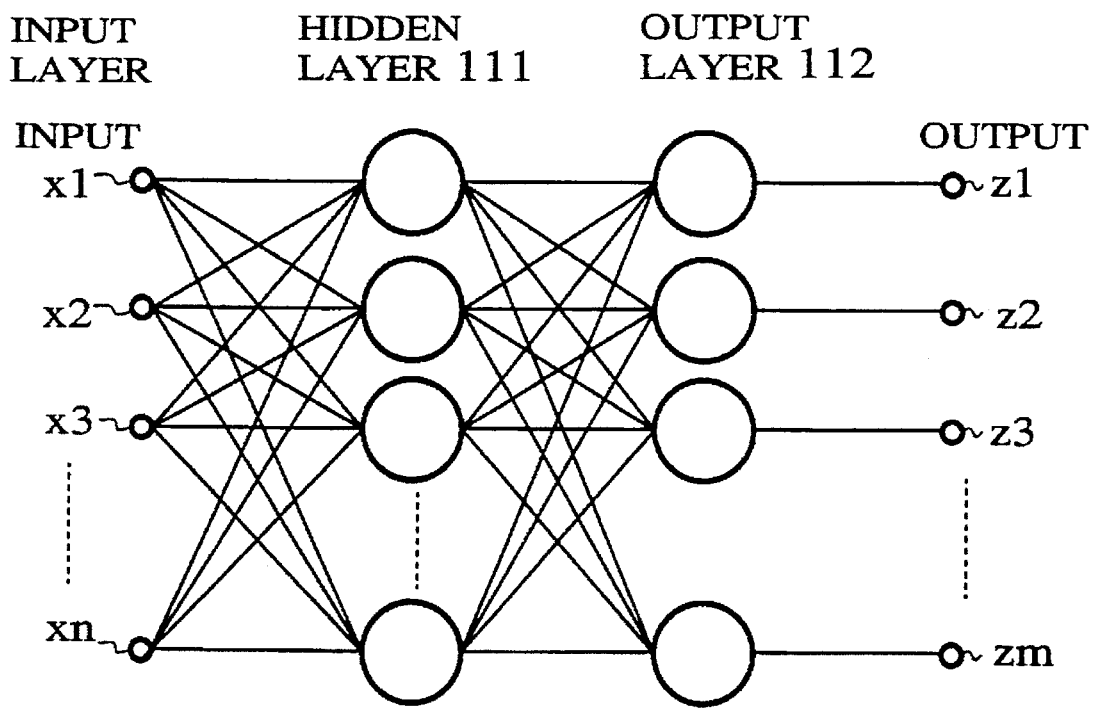
FIG. 3 is a schematic diagram of a triple layer structure for a neural network circuit.
Figure 4:
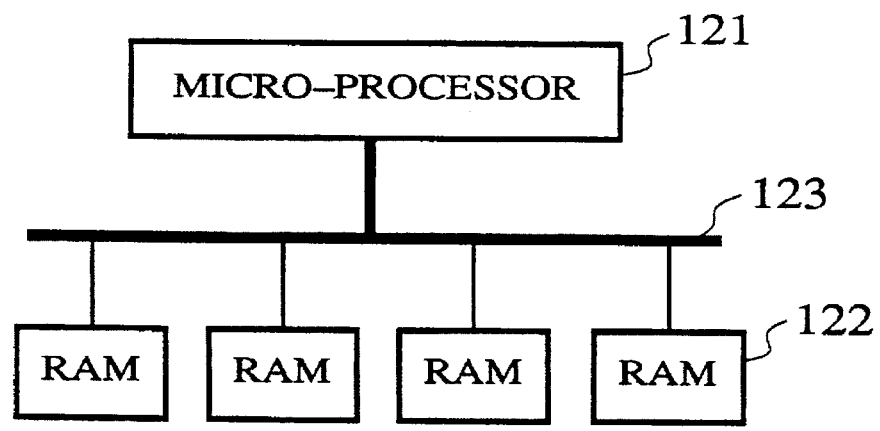
FIG. 4 is a schematic diagram of a conventional circuit configuration for realizing a large scale neural network circuit.

In this first embodiment, the neural network circuit has an overall structure similar to the conventional neural network circuit which generally comprises a multiplicity of neuron circuits connected together, as in the triple layer structure of FIG. 3 described above for example. Here, each neuron circuit has a configuration as shown in FIG. 5, which comprises: a plurality of synapse calculation circuits 1-1 to 1-n in correspondence to input 1 to input n for making synapse calculations with respect to the respective inputs; a synapse weight memory circuit 2 for storing synapse weights to be supplied to the synapse calculation circuits 1-1 to 1-n; a memory read out circuit 3 for reading out the synapse weights from the synapse weight memory circuit 2 to the synapse calculation units 1-1 to 1-n; a summation circuit 4 for summing outputs of all the synapse calculation circuits 1-1 to 1-n; a nonlinear unit 5 for carrying out a nonlinear processing with respect to an output of the summation circuit 4 to obtain an output of this neuron circuit; first and second saturation region boundary value registers 8-1 and 8-2 for storing first and second saturation region boundary values of the nonlinear unit 5, respectively; comparators 6-1 and 6-2 for comparing the output of the summation circuit 4 with the first and second saturation region boundary values registered in the first and second saturation region boundary value registers 8-1 and 8-2, respectively; and a control circuit 7 for controlling operations of the synapse calculation circuits 1-1 to 1-n and the memory read out circuit 3 according to outputs of the comparators 6-1 and 6-2.

Here, the first and second saturation region boundary values indicate boundaries of a transient region and the saturation regions in a transfer characteristic of the nonlinear unit 5, where the first saturation region boundary value indicates the lower boundary while the second saturation region boundary value indicates the upper boundary. In a case the transfer characteristic of the nonlinear unit 5 has more than one transient regions as in a case of FIG. 2D described above, additional saturation region boundary value registers and corresponding comparators will be necessary. In the following, for the sake of simplicity, only a case of the nonlinear unit 5 with the transfer characteristic having one transient region alone will be described.

Figure 5:
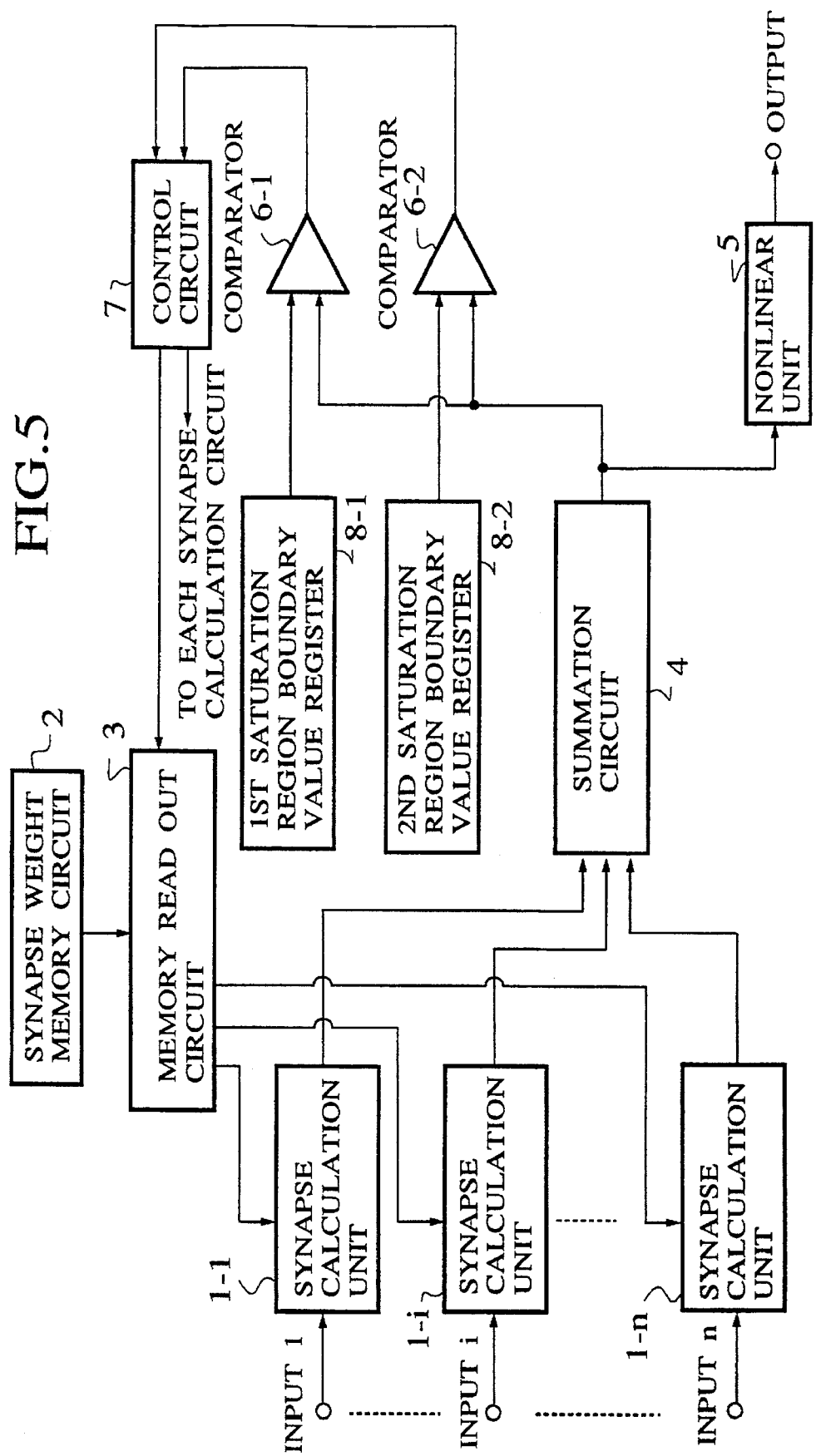
FIG. 5 is a block diagram of a neuron circuit for the first embodiment of a neural network circuit and a processing scheme according to the present invention.

In this configuration of FIG. 5, there are n sets of the synapse calculation circuits 1-1 to 1-n which are connected with corresponding input terminals entering input 1 to input n, as well as with the synapse weight memory circuit 2 through the memory read out circuit 3. Outputs of the synapse calculation circuits 1-1 to 1-n are connected to an input of the summation circuit 4, and an output of the summation circuit 4 is connected to inputs of the nonlinear unit 5 and the comparators 6-1 and 6-2, while an output of the nonlinear unit 5 is connected to an output terminal of this neuron circuit. The first saturation region boundary value register 8-1 is connected to another input of the comparator 6-1 while the second saturation region boundary value register 8-2 is connected to another input of the comparator 6-2. Outputs of the comparators 6-1 and 6-2 are connected to an input of the control circuit 7, while an output of the control circuit 7 is connected to the memory read out circuit 3 and the synapse calculation circuits 1-1 to 1-n.

With this configuration, the following processing is carried out so as to realize the calculation for obtaining the accurate final result gradually from an approximated value by sequentially carrying out calculations from upper bits of binary bit sequences representing the synapse weight value and the input value.

(1) In order to carry out the calculation from the upper bits at the synapse calculation circuits 1, necessary bits of the input value and the synapse weight value are sequentially transferred to each synapse calculation circuit 1 under the control of the control circuit 7.

(2) The calculation results of all the synapse calculation circuits 1 are summed at the summation circuit 4.

(3) The summation result obtained at (2) is compared with the first and second saturation region boundary values at the comparators 6, and the calculations of (1) and (2) are repeated until the summation result obtained at (2) is in the saturation region. When the summation result obtained at (2) reaches to the saturation region, that summation result is determined as the final summation result and the calculations at the synapse calculation circuits 1 are immediately stopped by a signal from the control circuit 7 such that the subsequent calculations and the memory accesses can be omitted.

Now, in order to carry out the synapse calculation and the summation from the upper bits, compare the summation result with the first and second saturation region boundary values, and stop the calculations at a time the summation result reaches to the saturation region as described above, it is necessary for the summation result to be monotonously increasing or decreasing as the calculations progress.

However, it is possible for each of the input value and the synapse weight value to take either a positive or negative value, so that in a case of carrying out the multiplication of the input value and the synapse weight value as the synapse calculation, it is impossible to realize the monotonously increasing or decreasing function as the summation result by using the conventional synapse calculation and summation scheme. For this reason, in this first embodiment, the following calculation scheme is used.

(1) The synapse calculation is carried out in terms of the binary expressions of the input value and the synapse weight value, each in a form of "sign+absolute value". Here, a word length (bit length) of an absolute value portion of each value is set to be L, and a sequential bit number of an absolute value portion from the least significant bit is set to be i.

(2) in order to realize the monotonously increasing summation, the initial value of the summation value is set up as follows.

A sign of the synapse calculation result is evaluated from sign bits of the input value and the synapse weight value, and the initial value is set to be 0 when the sign is positive.

On the other hand, when the sign of the synapse calculation result is negative, the initial value is obtained by the following steps.

(a) A setting value of 0 is used when the i-th bit of the absolute value portion of the input value is binary "0".

(b) A setting value of $-2^{(i+L-1)}+1$ is used when the i-th bit of the absolute value portion of the input value is binary "1".

(c) All the setting values given by (a) and (b) with respect to all bits of the absolute value portion of the input value for each synapse calculation is summed together, and a total of all the sums for all the synapses connected to this neuron circuit is set as the initial value.

In this manner, it is possible to determine the initial value of the summation value only from the input values in this first embodiment.

As an illustrative example, a manner of obtaining the initial value of the summation value for an exemplary case in which the word length L of the absolute value portion of each value is 4 bits, the synapse weight value is "11", and the input value is "−13" will be described with reference to FIG. 6. In this case, the synapse calculation result of the synapse weight value and the input value is negative. Here, an operation for calculating a product of binary expressions of absolute values of these values ("1011" and "1101", respectively) can be decomposed into operations for adding sequentially shifted results of the multiplication of the synapse weight value and the i-th bit of the input value for all i. In these operations, as indicated in FIG. 6, the missing digits at the lower bits in each bit sequence are supplemented by additional "0", and each supplemented bit sequence is converted into a negative value by using 1's complementary expression with a variable bit length according to a number of figures of each supplemented bit sequence. Here, the 1's complementary expression corresponding to each bit sequence is to be interpreted as a sum of the 1's complement of a number represented by a top figure which is a negative value and positive values represented by the remaining figures. Thus, for example, for a bit sequence "1011", its 1's complementary expression "10100" is interpreted as a sum of 1's complement of a top figure "10000"=16 which is −15, and a positive value represented by the remaining "100"=4, so that this "10100" represents a negative value −11 in the 1's complementary expression. Then, a total of top negative portions of all these 1's complementary expressions for all figures is set as the initial value of the summation value.

(3) The calculation of the product of the input value and the synapse weight value is carried out bit by bit from the upper bits of their absolute value portions, and sequentially progressed in a descending order of a magnitude of the multiplication result. In a case the i-th bit of the input value is "0", it is apparent that the synapse calculation result for that i-th bit is "0", so that the calculation for this i-th bit of the input value and the synapse weight value is omitted.

(4) The summation calculation is carried out by adding the absolute value portions in the 1's complementary expressions when the synapse calculation result is negative, so that it can be realized by the addition of positive values alone.

Figure 7:
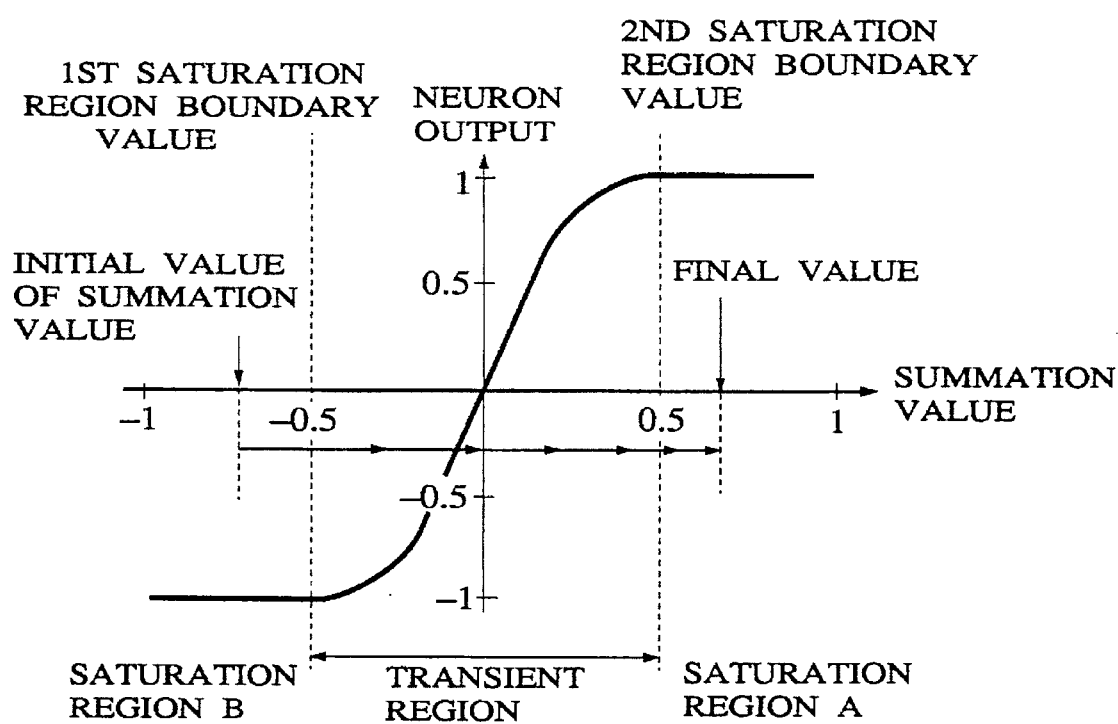
FIG. 7 is a graph of a transfer characteristic of a nonlinear unit in the neuron circuit of FIG. 5, showing a manner of obtaining a final summation value in one saturation region by the neuron circuit of FIG. 5.

By means of this processing, as indicated in FIG. 7, the summation gradually converges from the initial value of the summation value to the final value as the calculation progresses. In this case, the calculation of the synapse calculation result to be summed proceeds from the upper bits, so that the the synapse calculation result changes from that with a larger absolute value to that with a smaller absolute value as the calculation progresses. In other words, the summation value gradually approaches from the approximated value to the accurate value. Then, when the summation value exceeds the second saturation region boundary value, it can be ascertained that the summation result has reached the saturation region A, so that the subsequent calculations can be omitted.

Figure 8:
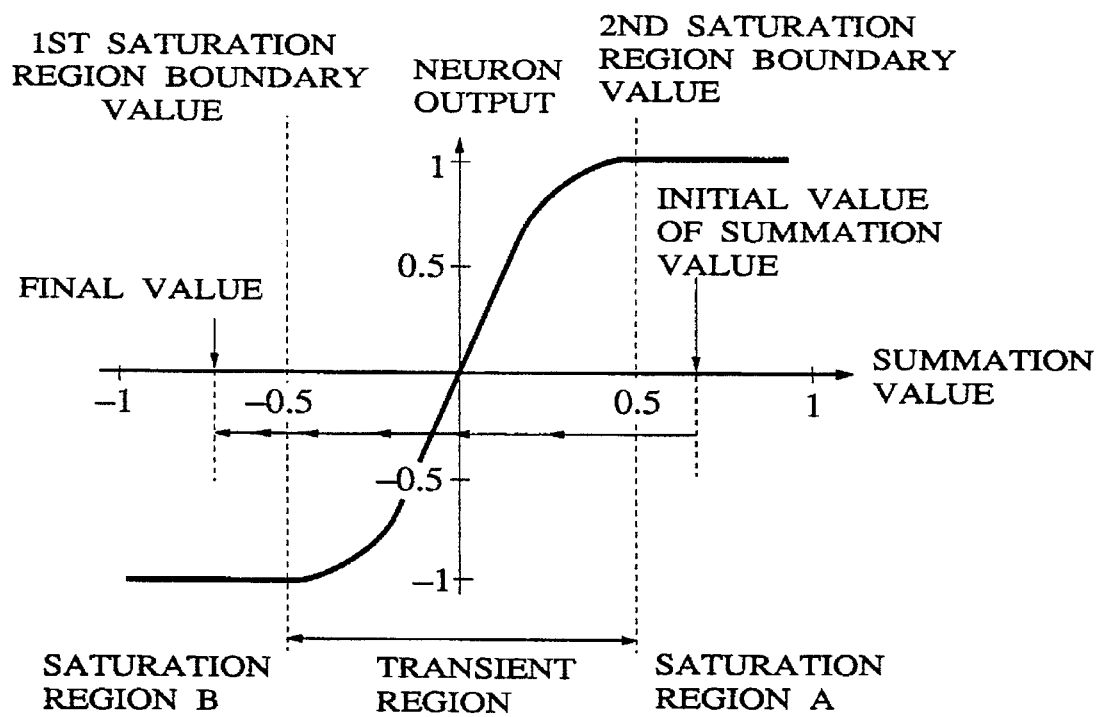
FIG. 8 is a graph of a transfer characteristic of a nonlinear unit in the neuron circuit of FIG. 5, showing a manner of obtaining a final summation value in another saturation region by the neuron circuit of FIG. 5.

It is to be noted that, a case of convergence of the summation result to the saturation region B can be handled by the similar manner as described above, except for reversing the polarity in the above described processing, as indicated in FIG. 8, where the similar omission of the subsequent calculations can be made after the summation result has reached the saturation region B.

Figure 9:
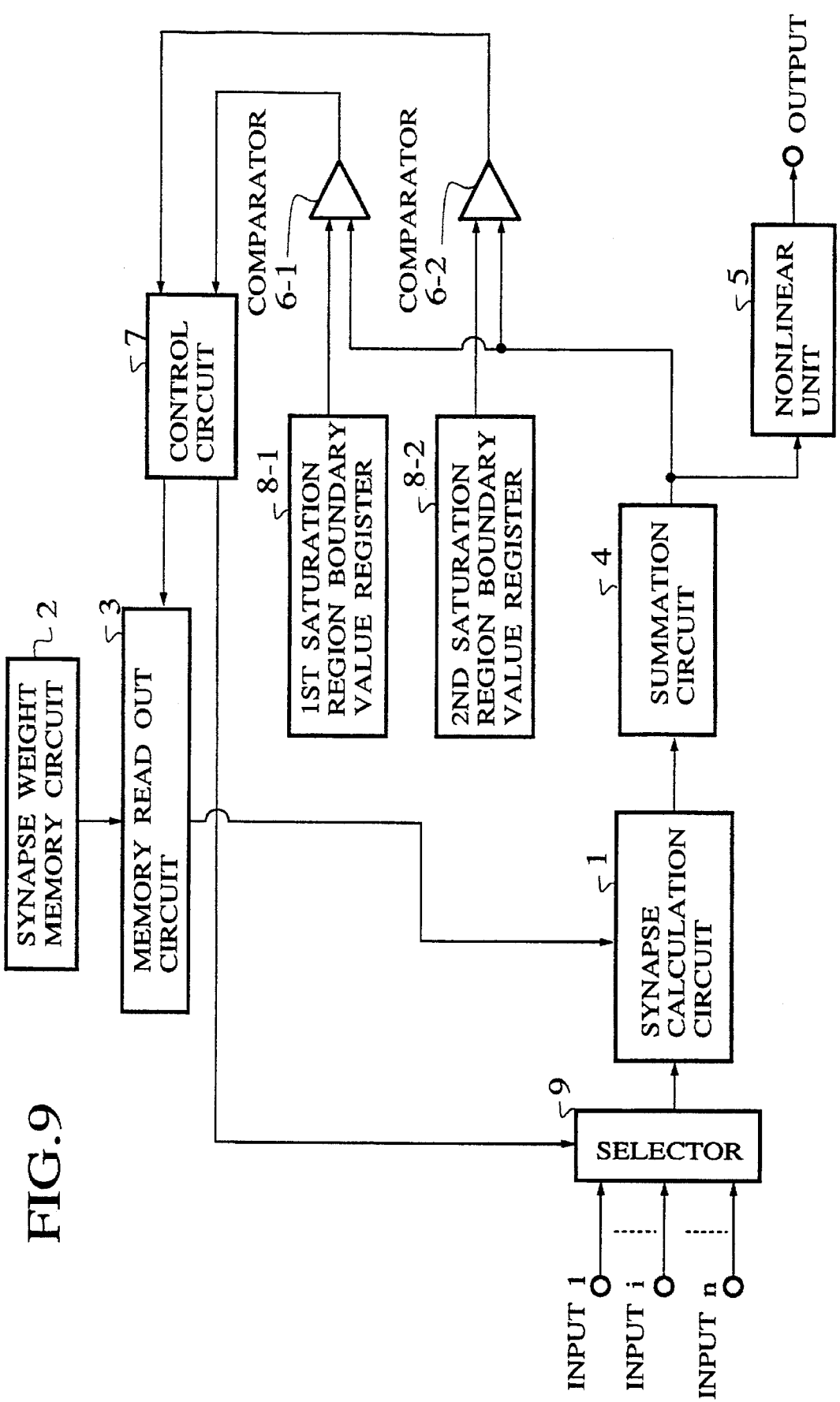
FIG. 9 is a block diagram of a neuron circuit for the second embodiment of a neural network circuit and a processing scheme according to the present invention.

Referring now to FIG. 9, the second embodiment of a neural network circuit and a processing scheme using the neural network circuit according to the present invention will be described in detail. Here, those elements which are substantially similar to the corresponding elements in the first embodiment described above will be given the same reference numerals in the figure and their description will be omitted.

In this second embodiment, each neuron circuit of the neural network circuit has a configuration as shown in FIG. 9, which differs from that of FIG. 5 in that there is only one synapse calculation circuit 1, and there is provided a selector 9 which is provided between the input terminals and the synapse calculation circuit 1 and controlled by the control circuit 7, such that the synapse weight and the input value to be used in the synapse calculation at the synapse calculation unit 1 are selectively supplied from the memory read out circuit 3 and the selector 9 under the control of the control circuit 7.

In this configuration, a single synapse calculation circuit 1 is used for all the synapse calculations, so that there is an additional advantage of the reduction of the circuit scale, in addition to all the advantages of the first embodiment described above.

Figure 10:
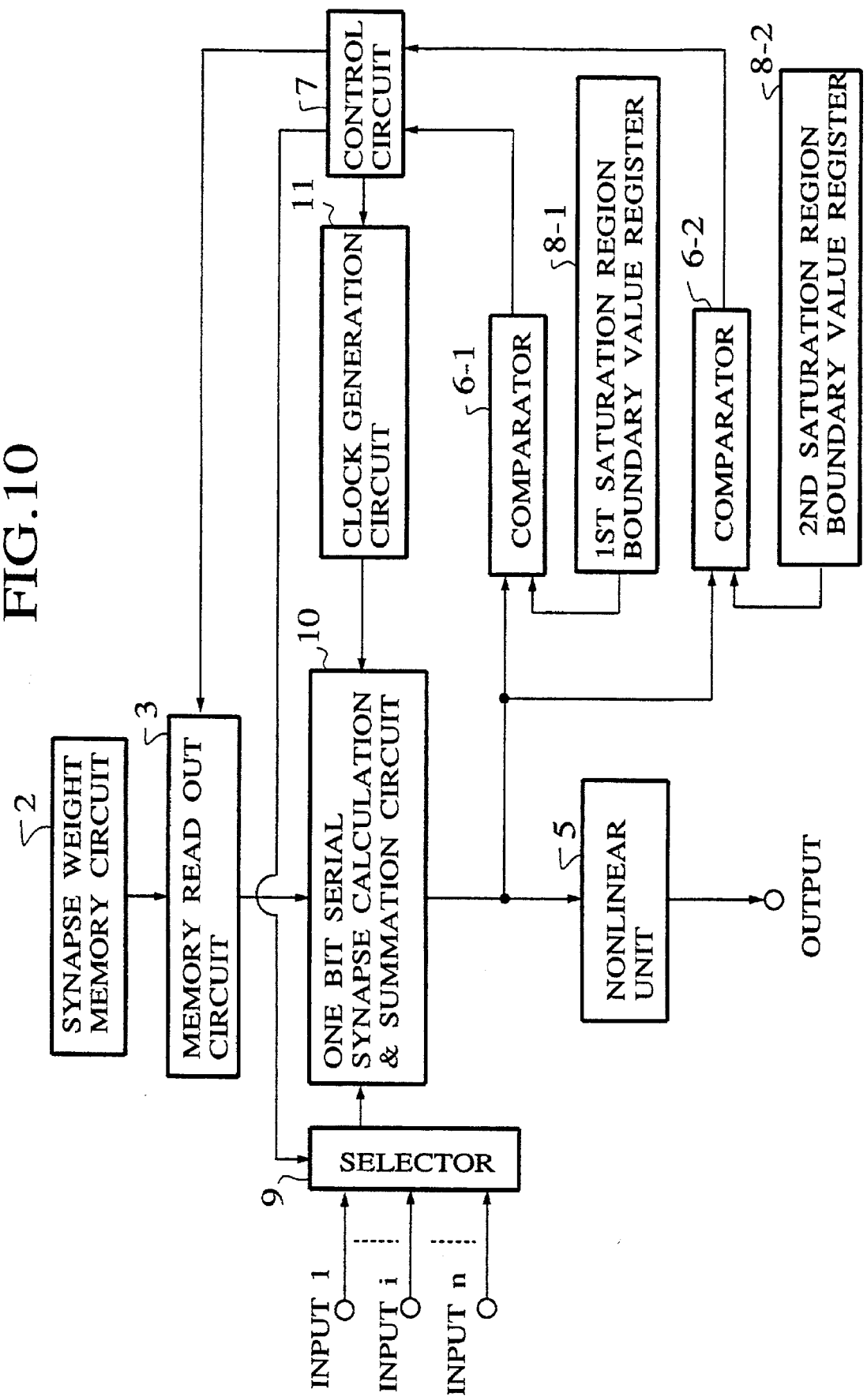
FIG. 10 is a block diagram of a neuron circuit for the third embodiment of a neural network circuit and a processing scheme according to the present invention.
Figure 11:
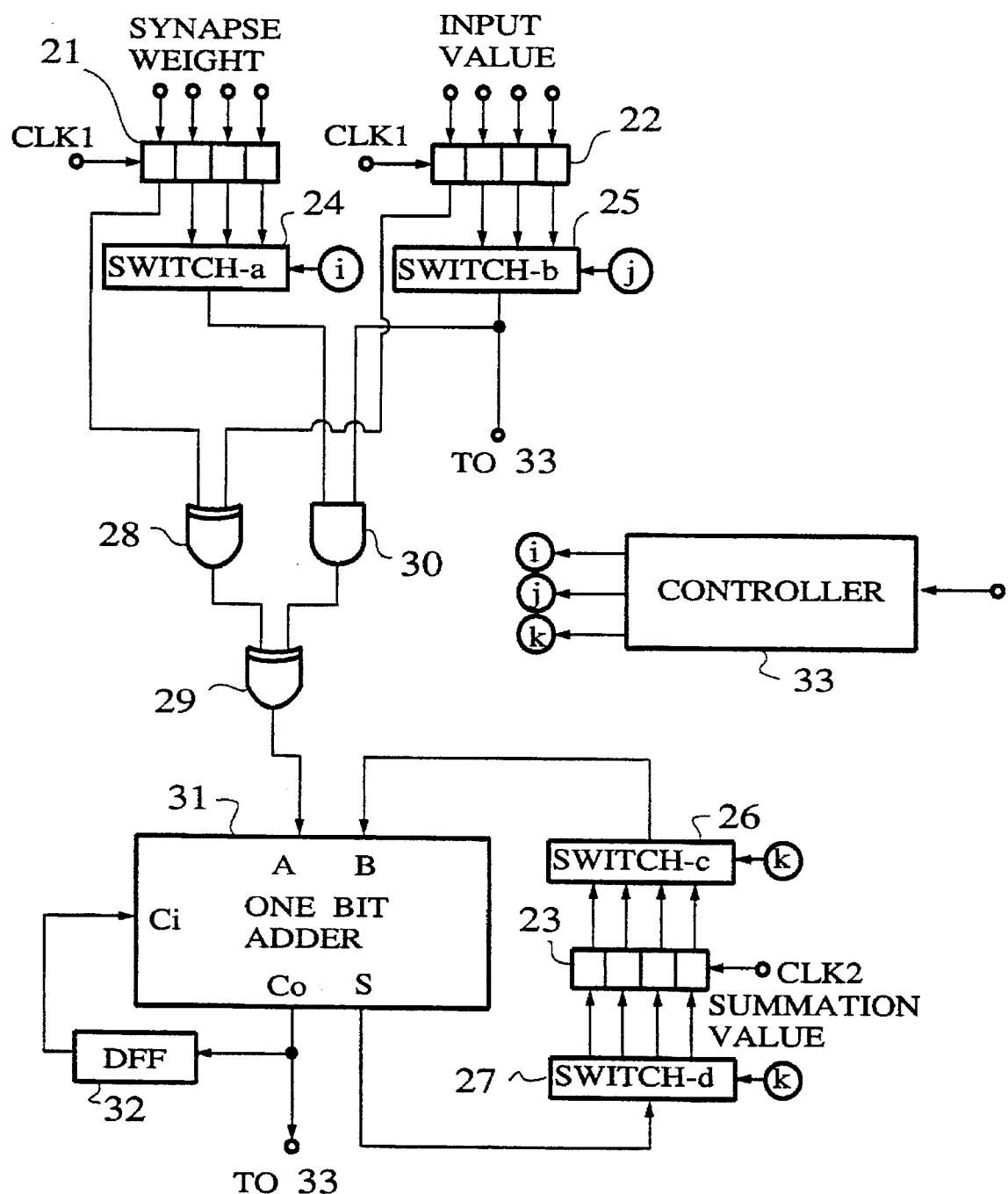
FIG. 11 is a block diagram of a one bit serial synapse calculation and summation circuit in the neuron circuit of FIG. 10.
Figure 12:
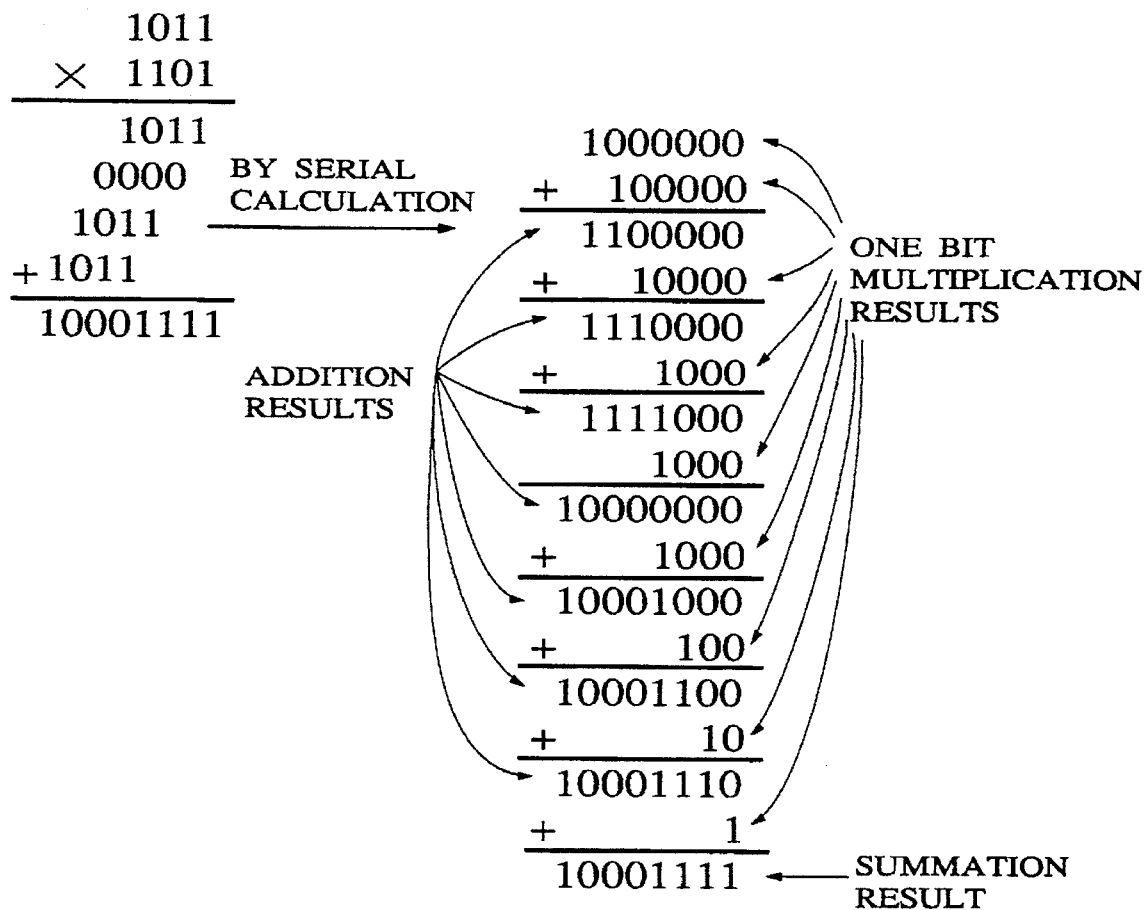
FIG. 12 is a diagrammatic illustration of an exemplary calculation in the one bit serial synapse calculation and summation circuit of FIG. 11.

Referring now to FIGS. 10 to 12, the third embodiment of a neural network circuit and a processing scheme using the neural network circuit according to the present invention will be described in detail. Here, those elements which are substantially similar to the corresponding elements in the first and second embodiments described above will be given the same reference numerals in the figure and their description will be omitted.

In this third embodiment, each neuron circuit of the neural network circuit has a configuration as shown in FIG. 10, which differs from that of FIG. 9 in that the synapse calculation circuit 1 and the summation circuit 4 of FIG. 9 is replaced by a one bit serial synapse calculation and summation circuit 10, and there is provided a clock generation circuit 11 between the control circuit 7 and this one bit serial synapse calculation and summation circuit 10. The one bit serial synapse calculation and summation circuit 10 receives the synapse weight and the input value from the memory read out circuit 3 and the selector 9 under the control of the control circuit 7, and outputs the calculated summation result of the synapse calculations to the nonlinear unit 5 as well as the comparators 6-1 and 6-2. The control circuit 7 also supplies a reset signal to the clock generation circuit 11, and the clock generation circuit 11 supplies the clock signals to the one bit serial synapse calculation and summation circuit 10 according to the reset signal from the control circuit 7.

The one bit serial synapse calculation and summation circuit 10 has a detailed configuration as shown in FIG. 11, which comprises a synapse weight register 21 for registering the received synapse weight, an input value register 22 for registering the received input value, a switch-a 24 and a switch-b 25 for selectively outputting a specified bit of the absolute value bits from the registers 21 and 22, respectively, an EX-OR circuit 28 receiving sign bits of the registers 21 and 22 as its inputs, an AND circuit 30 receiving outputs of the switch-a 24 and the switch-b 25 as its inputs, an EX-OR circuit 29 receiving outputs of the EX-OR circuit 28 and the AND circuit 30 as its inputs, a one bit adder 31 receiving an output of the EX-OR circuit 29 as its A terminal input, a D-type flip flop 32 connected between Co and Ci terminals of the one bit adder 31, a summation register 23 for registering a current summation value, a switch-c 26 for selectively outputting a specified bit of the current summation value from the summation register 23 as a B terminal input of the one bit adder 31, a switch-d 27 for selectively storing an S terminal output (addition result) of the one bit adder 31 in the summation register 23, and a controller 33 receiving an output of the switch-b 25 and a Co terminal output (carry signal) of the one bit adder 31.

Here, the controller 33 supplies a control input i indicating a sequential bit number from the least significant bit of an access bit in the synapse weight register 21 to the switch-a 24, a control input j indicating a sequential bit number from the least significant bit of an access bit in the input value register 22 to the switch-b 25, and a control input k indicating a sequential bit number from the least significant bit of an access bit in the summation register 23 to the switch-c 26 and the switch-d 27, so as to control bits to be selectively outputted or stored by the switches 24, 25, 26, and 27. In addition, the synapse weight register 21 and the input value register 22 are operated according to the first clock signal CLK1 from the clock generation circuit 11, while the summation register 23 is operated according to the second clock signal CLK2 from the clock generation circuit 11.

With this configuration, the one bit adder 31 is used for both the addition part of the synapse calculation and the addition part of the summation, so that there is an additional advantage of the reduction of the circuit scale, in addition to all the advantages of the first and second embodiments described above. Moreover, as the serial calculation is carried out, when a bit of the input value is "0", it is apparent that the serial synapse calculation result for that bit is "0", so that the calculation for this bit of the input value and the synapse weight value can be omitted to reduce the amount of calculations.

Here, the one bit adder 31 can be shared among the addition part of the synapse calculation and the addition part of the summation for the following reason. Namely, in a case of carrying out the serial multiplication as the synapse calculation, as indicated in FIG. 12 for an exemplary case of 11 times 13, the multiplication can be decomposed into the one bit multiplications and the sequential additions of the one bit multiplication results. Consequently, by using such a serial calculation, it is possible to integrally form the addition calculation in the synapse calculation operation and the addition calculation in the summation operation, and thereby there is an additional advantage of the reduction of the circuit scale.

More specifically, in this third embodiment, the following processing is carried out.

(1) The initial value of the summation value is set up as in the first embodiment described above.

(2) Whether the j-th bit of the input value supplied from the switch-b 25 is "0" or not is judged at the controller 33, and when it is "0", the synapse calculation using this j-th bit of the input value is omitted while also omitting a memory access for the synapse weight to be used in that omitted synapse calculation, and the controller 33 proceeds to output new values of i, j, and k in order to carry out the next synapse calculation.

(3) The sign bit of the synapse weight and the sign bit of the input value are sent to the EX-OR circuit 28, and a sign of the multiplication result of the synapse weight and the input value is obtained.

(4) The i-th bit of the synapse weight and the j-th bit of the input value are sent from the switch-a 24 and the switch-b 25 to the AND circuit 30, and the one bit multiplication using these bits is carried out.

(5) The calculation results of (3) and (4) are sent to the EX-OR circuit 29 to evaluate the value to be summed.

More specifically, when the sign of the multiplication result is positive and the multiplication result is "0" or when the sign of the multiplication result is negative and the multiplication result is "1", the value to be summed is set to be "0".

Also, when the sign of the multiplication result is positive and the multiplication result is "1", or when the sign of the multiplication result is negative and the multiplication result is "0", the value to be summed is set to be "1".

(6) At the one bit adder 31, the value to be summed entered from the EX-OR circuit 29 and the k-th bit of the current summation value entered from the switch-c 26 are added together, and outputted as the S terminal output which is then stored into the k-th bit of the summation result in the summation register 23 by the switch-d 27.

(7) At this point, if the carry signal is 1, i.e., when the carrying of the figure is to be made, the carry signal and the (k+1)-th bit of the current summation value are added together at the one bit adder 31.

This processing is repeated until the carrying of the figure stops occurring, so as to obtain the final summation value.

Referring now to FIGS. 13 to 17, the fourth embodiment of a neural network circuit and a processing scheme using the neural network circuit according to the present invention will be described in detail. Here, those elements which are substantially similar to the corresponding elements in the first to third embodiments described above will be given the same reference numerals in the figure and their description will be omitted.

Figure 13:
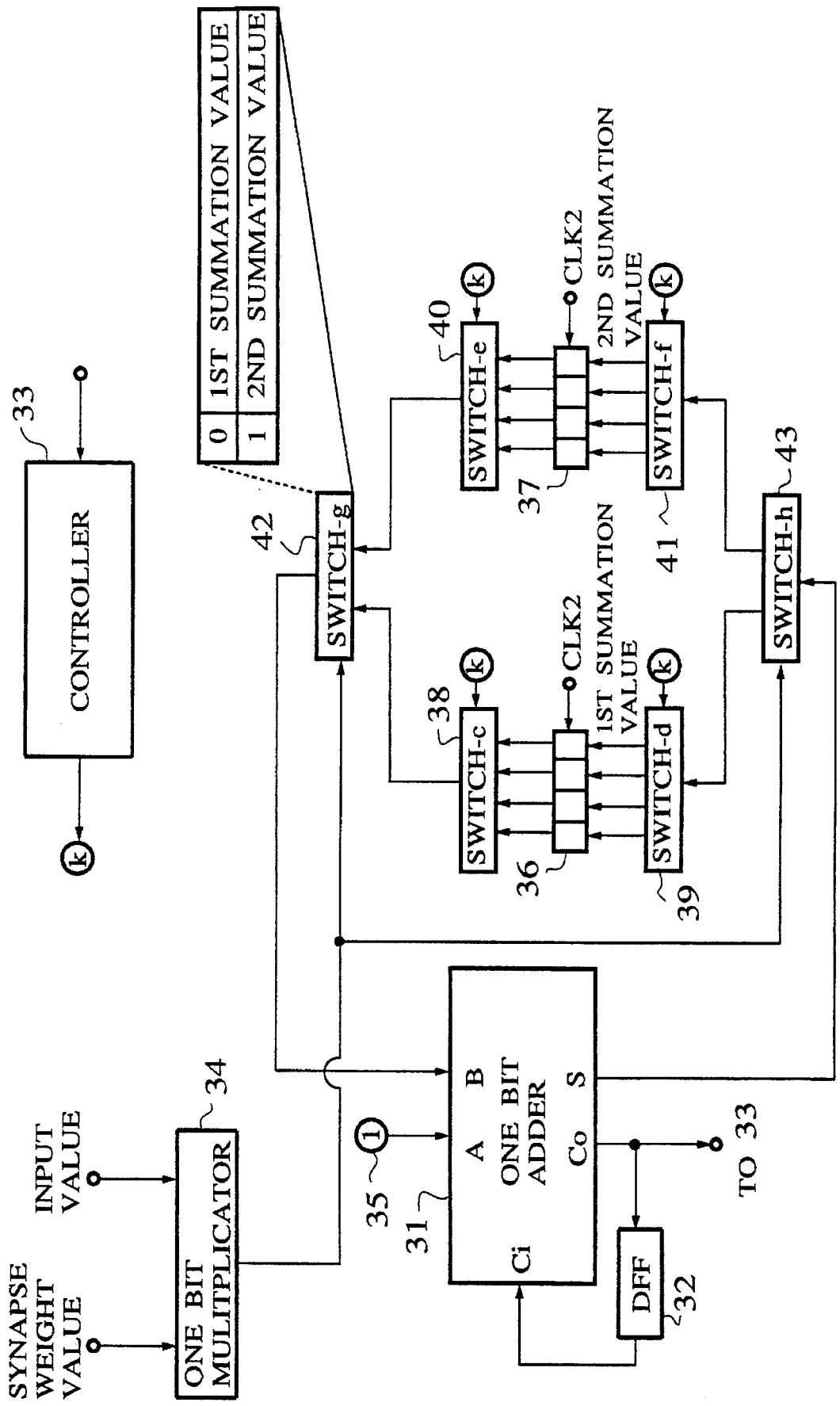
FIG. 13 is a block diagram of a one bit serial synapse calculation and summation circuit in a neuron circuit for the fourth embodiment of a neural network circuit and a processing scheme according to the present invention.

In this fourth embodiment, a detailed configuration of the one bit serial synapse calculation and summation circuit 10 in the neuron circuit of FIG. 10 described above is replaced from that of FIG. 11 to an alternative configuration shown in FIG. 13 for the following reason.

Namely, in the first to third embodiments described above, in order to make judgements for both of the saturation regions A and B, it is necessary to provide two sets of the synapse calculation circuit and the summation circuit (or synapse calculation and summation circuit) so as to make a judgement for the saturation region A by carrying out the calculations with the monotonously increasing summation value in one set (as indicated in FIG. 7) and to make a judgement for the saturation region B by carrying out the calculations with the monotonously decreasing summation value in another set (as indicated in FIG. 8).

In contrast, by using the configuration of the one bit serial synapse calculation and summation circuit 10 as shown in FIG. 13 which utilizes the characteristic properties of the serial calculations between the synapse weight and the input value, it becomes possible to make judgements for both of the saturation regions A and B by only one set of the synapse calculation and summation circuit.

Figure 14:
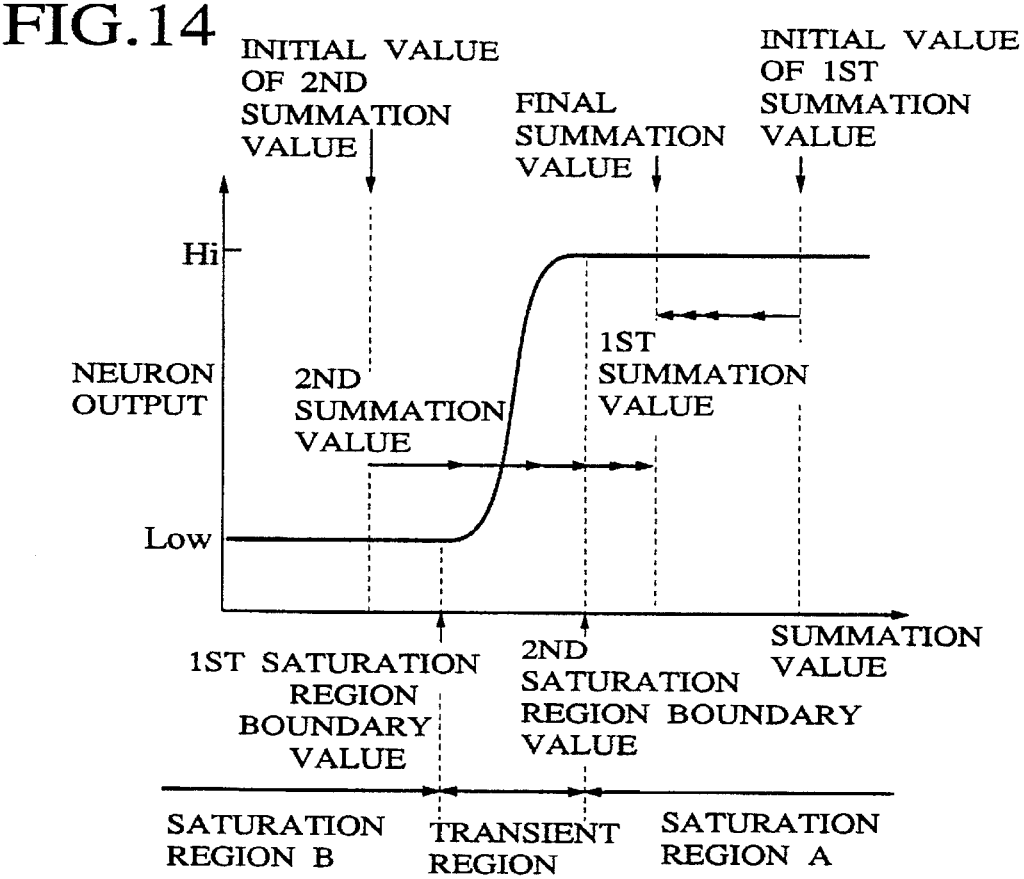
FIG. 14 is a graph of a transfer characteristic of a nonlinear unit in the neuron circuit of the fourth embodiment, showing a manner of obtaining a final summation value in one saturation region by the fourth embodiment.
Figure 15:
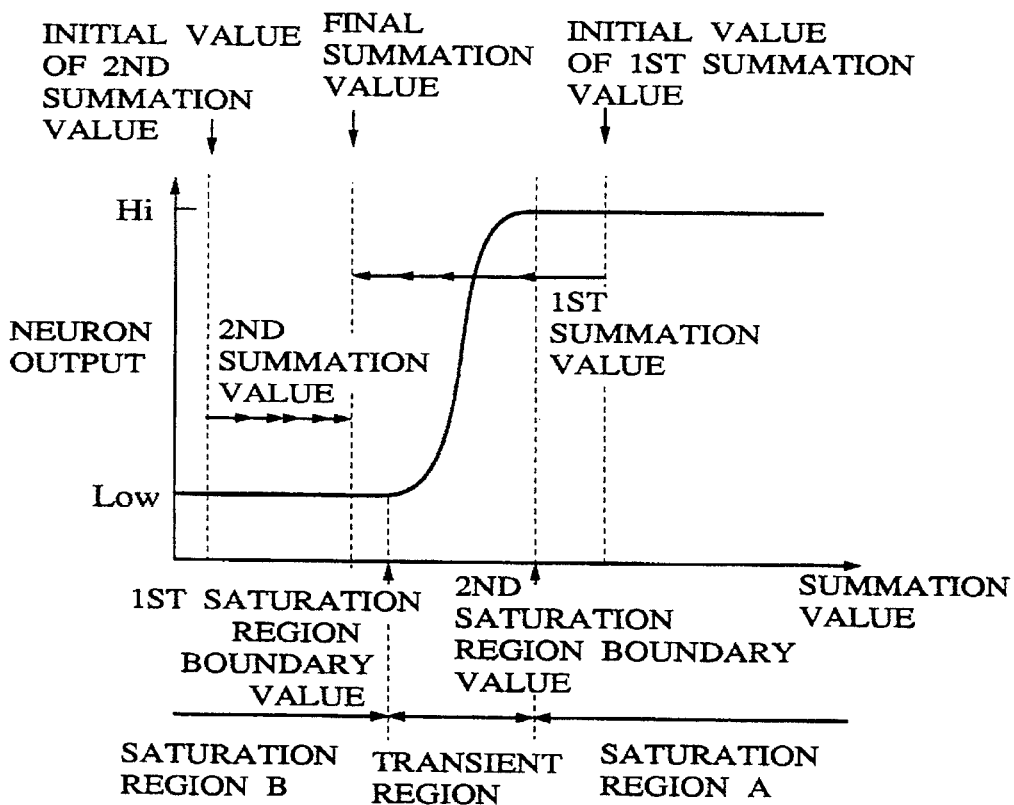
FIG. 15 is a graph of a transfer characteristic of a nonlinear unit in the neuron circuit of the fourth embodiment, showing a manner of obtaining a final summation value in another saturation region by the fourth embodiment.

More specifically, the outline of the calculation and the characteristic properties of the serial calculations between the synapse weight and the input value will now be explained with references to FIGS. 14 to 17. In this fourth embodiment, the calculations for the first summation value which gradually approaches to the final summation value in a monotonously decreasing manner and the calculations for the second summation value which gradually approaches to the final summation value in a monotonously increasing manner are simultaneously carried out by the common synapse calculation and summation circuit 10 of FIG. 13 as indicated in FIGS. 14 and 15.

In this case, the initial values for the first and second summation values are set up as follows.

(1) A case in which the synapse calculation result between the synapse weight and the input value is positive (as illustrated by an example shown in FIG. 16):

<Initial value of the first summation value>

(a) A setting value of "0" is used when the i-th bit from the least significant bit of the absolute value portion of the input value is "0".

(b) A setting value of $2^{(i+L-1)}-1$ is used when the i-th bit from the least significant bit of the absolute value portion of the input value is "1", where L is a word length (bit length) of the absolute value portion of each value.

(c) A total of all the setting values given by (a) and (b) with respect to all bits of the absolute value portion of the input value is set as the initial value of the first summation value.

Figure 16:
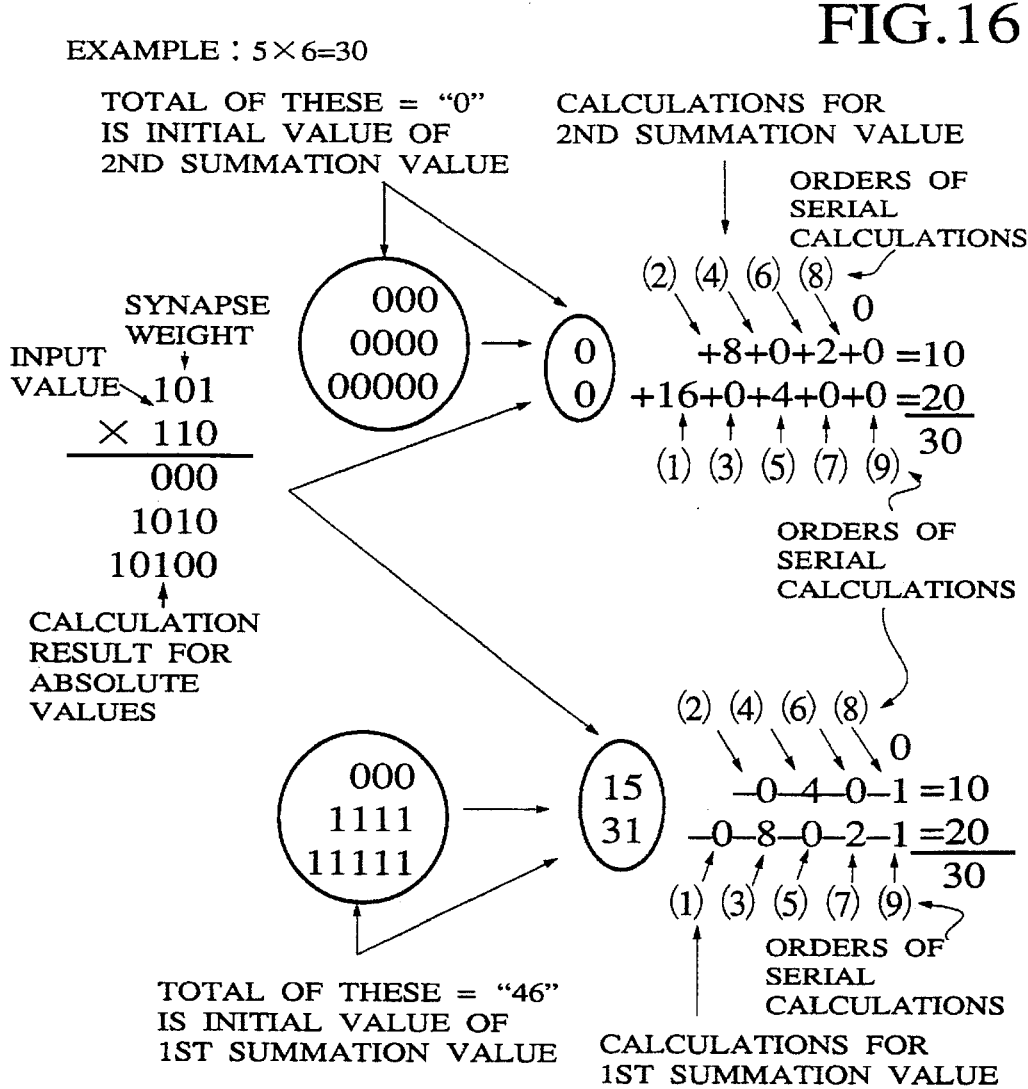
FIG. 16 is a diagrammatic illustration of an exemplary calculation for obtaining initial values of first and second summation values in the fourth embodiment for one case.

This initial value of the first summation value has the following significance. Here, as indicated in FIG. 16, the multiplication of the absolute value of the synapse weight and the absolute value of the input value is handled in a decomposed form of "partial products of all bits of the absolute value portion of the synapse weight and each bit of the input value+summation of partial products". Then, when it is assumed that, among the bit sequences for the partial products between all bits of the absolute value portion of the synapse weight and each bit of the input value, those bit sequences which correspond to the input bit "1". In the input value are entirely composed of "1" in all bits, a total value of the bit sequences for all the partial products is set as the initial value of the first summation value.

<Initial value of the second summation value>

The initial value of the second summation value is set to be "0".

This initial value of the second summation value has the following significance. Namely, as indicated in FIG. 16, when it is assumed that all the bit sequences for the partial products between all bits of the absolute value portion of the synapse weight and each bit of the input value are entirely composed of "0" in all bits, a total value of the bit sequences for all the partial products is set as the initial value of the second summation value.

(2) A case in which the synapse calculation result between the synapse weight and the input value is negative (as illustrated by an example shown in FIG. 17):

<Initial value of the first summation value>

The initial value of the first summation value is set to be "0".

Figure 17:
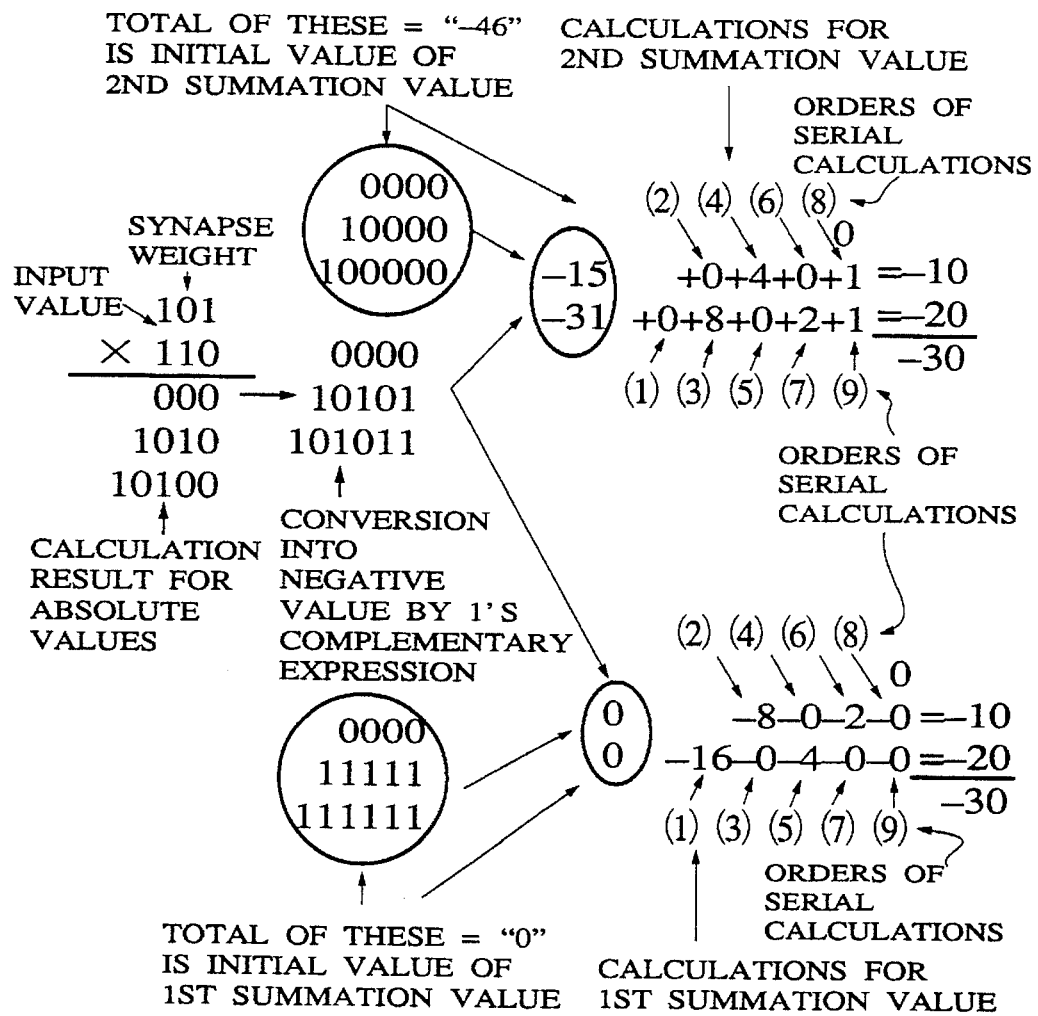
FIG. 17 is a diagrammatic illustration of an exemplary calculation for obtaining initial values of first and second summation values in the fourth embodiment for another case.

This initial value of the first summation value has the following significance. Here, as indicated in FIG. 17, the multiplication of the absolute value of the synapse weight and the absolute value of the input value is handled in a decomposed form of "partial products of all bits of the absolute value portion of the synapse weight and each bit of the input value+summation of partial products". Then, the bit sequences for the partial products between all bits of the absolute value portion of the synapse weight and each bit of the input value are converted into negative values by the 1's complementary expressions. Then, when it is assumed that all the bit sequences as converted into the 1's complementary expressions are entirely composed of "1" in all bits, a total value of all these bit sequences as converted into the negative values is set as the initial value of the first summation value.

<Initial value of the second summation value>

(a) A setting value of "0" is used when the i-th bit from the least significant bit of the absolute value portion of the input value is "0".

(b) A setting value of $-2^{(i+L-1)}+1$ is used when the i-th bit from the least significant bit of the absolute value portion of the input value is "1".

(c) A total of all the setting values given by (a) and (b) with respect to all bits of the absolute value portion of the input value is set as the initial value of the second summation value.

This initial value of the second summation value has the following significance. Namely, the bit sequences for the partial products between all bits of the absolute value portion of the synapse weight and each bit of the input value are converted into negative values by the 1's complementary expressions. Then, when it is assumed that, among the bit sequences as converted into the 1's complementary expressions, those bit sequences which correspond to the input bit "1" in the input value are entirely composed of "0" except for the most significant bits, a total value of all these bit sequences as converted into the negative values is set as the initial value of the second summation value.

In this fourth embodiment, the summation is carried out as follows.

Namely, the one bit multiplication between the synapse weight and the input value is carried out from the upper bits. As a result, when a bit which is added at a time of setting the initial value of the first summation value is judged as actually "0", this added bit is subtracted from the first summation value (as in the serial calculations (3), (4), (7), (8), and (9) in FIG. 16, or the serial calculations (1), (2), (5) and (6) in FIG. 17).

On the other hand, as a result of the one bit multiplication between the synapse weight and the input value, when a bit which is not added at a time of setting the initial value of the second summation value is judged as actually not "0", the result of the one bit multiplication is added to the second summation value (as in the serial calculations (1), (2), (5), and (6) in FIG. 16, or the serial calculations (3), (4), (7), (8), and (9) in FIG. 17).

In this summation operation, as should be apparent from the calculation procedures shown in FIGS. 16 and 17, the subtraction from the first summation value and the addition to the second summation value which are to be executed after the one bit multiplication of the synapse weight and the input value have a mutually complementary relationship, such that only either one of these calculations is carried out in any given serial calculation timing.

Consequently, the calculations using the monotonously increasing second summation value for making a judgement for the saturation region A and the calculations using the monotonously decreasing first summation value for making a judgement for the saturation region B can be carried out simultaneously by using the common synapse calculation and summation circuit 10 which operates by sequentially switching the register for registering the first summation value and the register for registering the second summation value.

To this end, the one bit serial synapse calculation and summation circuit of FIG. 13 comprises a one bit multiplicator 34 receiving the synapse weight and the input value specified from the control circuit 7, a switch-g 42 receiving the output of the one bit multiplicator 34 as a control input and supplying the B terminal input of the one bit adder 31, a switch-h 43 receiving the output of the one bit multiplicator 34 as the control input and the S terminal output of the one bit adder 31 as its input, a first summation value register 36 for registering a current first summation value, a switch-c 38 for selectively outputting a specified bit of the current first summation value from the first summation value register 36 as the B terminal input of the one bit adder 31 through the switch-g 42, a switch-d 39 for selectively storing the S terminal output (addition result) of the one bit adder 31 in the first summation value register 36 through the switch-h 43, a second summation value register 37 for registering a current second summation value, a switch-e 40 for selectively outputting a specified bit of the current second summation value from the second summation value register 37 as the B terminal input of the one bit adder 31 through the switch-g 42, a switch-f 41 for selectively storing the S terminal output (addition result) of the one bit adder 31 in the second summation value register 37 through the switch-h 43, a constant register 35 for storing a constant "1" to be supplied as the A terminal input of the one bit adder 31, the D-type flip flop 32 connected between Co and Ci terminals of the one bit adder 31, and the controller 33 receiving the Co terminal output (carry signal) of the one bit adder 31.

Here, the controller 33 supplies a control input k indicating a sequential bit number from the least significant bit of an access bit in the first summation value register 36 or the second summation value register 37 to the switch-c 38 and the switch-d 39 or the switch-e 40 and the switch-f 41, so as to control bits to be selectively outputted or stored by these switches 38, 39, 40, and 41. In addition, the first summation value register 36 and the second summation value register 37 are operated according to the clock signal CLK2 from the clock generation circuit 11.

More specifically, in this fourth embodiment, the following processing is carried out.

(1) The initial values of the first and second summation values are set up as described above.

(2) The multiplication of the synapse weight and the input value is carried out at the one bit multiplicator 34, and the multiplication result and its sign are obtained. The multiplication result and its sign are sent to the control inputs of the switch-g 42 and the switch-h 43 bit by bit, and the switching between the first summation value and the second summation value is carried out according to the following table 1.

TABLE 1

| | multiplication result | |
|---|---|---|
| sign of multiplication result | 0 | 1 |
| positive | 1st summation value | 2nd summation value |
| negative | 2nd summation value | 1st summation value |

(3) At the one bit adder 31, the addition of a constant "1" supplied from the constant register 35 and the k-th bit from the least significant bit of the summation value selected at (2) and supplied from the appropriate register 36 or 37 through the switch-g 42 is carried out, and the S terminal output is stored into the k-th bit from the least significant bit of the summation value selected at (2) in the appropriate register 36 or 37 through the switch-h 43.

(4) At this point, if the carry signal is 1, i.e., when the carrying of the figure is to be made, the carry signal and the (k+1)-th bit of the current summation value are added together at the one bit adder 31.

This processing is repeated until the carrying of the figure stops occurring, so as to obtain the final summation value.

(5) The outputs of the first summation value register 36 and the second summation value register 37 are compared with the first and second saturation region boundary values at the comparators 6-1 and 6-2 in the configuration of FIG. 10, so as to make judgements for the saturation regions A and B.

Figure 18:
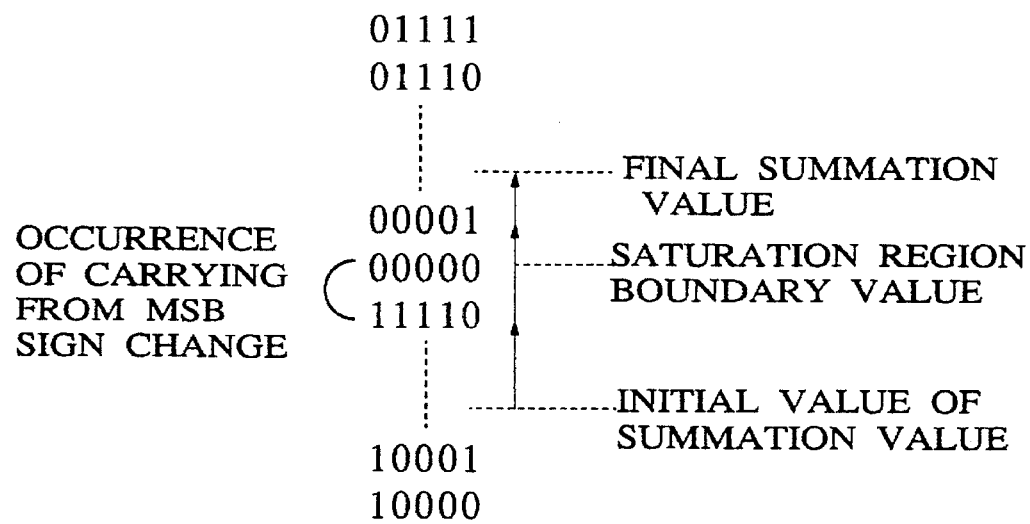
FIG. 18 is a diagrammatic illustration of an exemplary setting of an initial value of a summation value in a neuron circuit for the fifth embodiment of a neural network circuit and a processing scheme according to the present invention.
Figure 19:
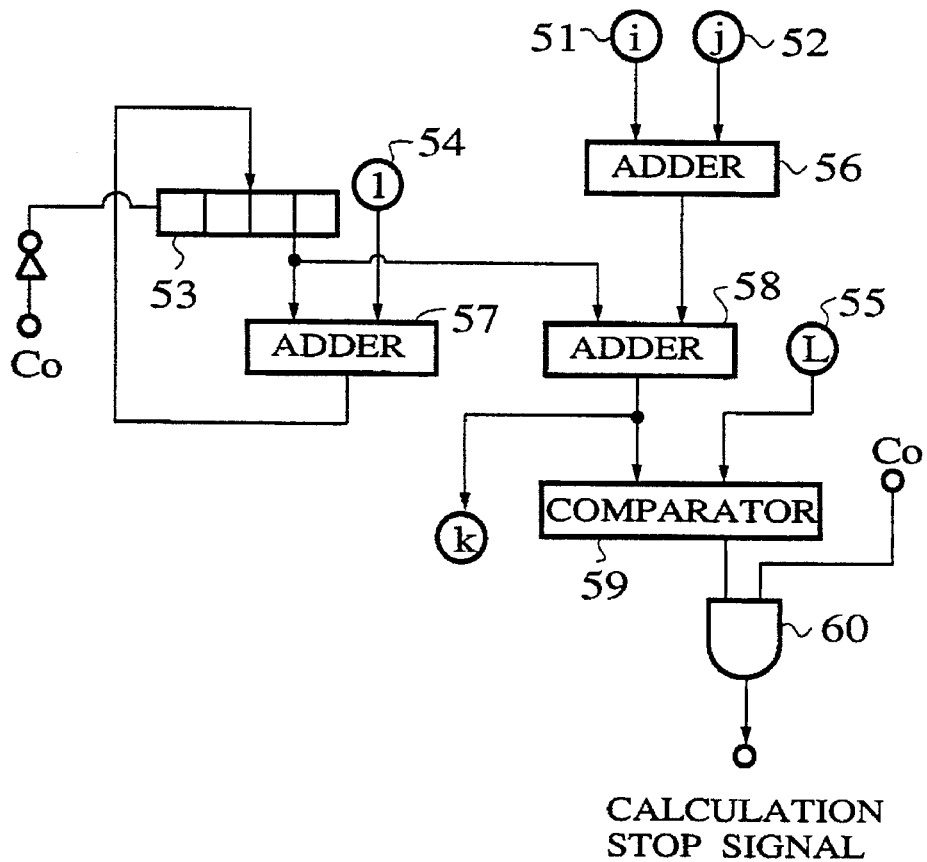
FIG. 19 is a block diagram of a partial configuration for a controller in a one bit serial synapse calculation and summation circuit of a neuron circuit for the fifth embodiment.

Referring now to FIGS. 18 and 19, the fifth embodiment of a neural network circuit and a processing scheme using the neural network circuit according to the present invention will be described in detail. Here, those elements which are substantially similar to the corresponding elements in the first to fourth embodiments described above will be given the same reference numerals in the figure and their description will be omitted.

In the first to fourth embodiments described above, whether or not to continue the calculations has been judged by evaluating the size relationship of the summation value and the saturation region boundary values at the comparators. In contrast, in this fifth embodiment, whether or not to continue the calculations is judged solely by detecting the carry signal for the most significant bit of the summation value as follows, so as to have an additional advantage that the judgement of the calculation stopping can be realized by a simpler processing.

In this fifth embodiment, when the summation value takes a negative value, it is expressed by the 1's complementary expression. Here, the initial value of the summation value is set up such that the summation value gradually changes as the summation calculation progresses, and becomes "0" when it has reached the saturation region boundary value, as illustrated in FIG. 18. With this initial value setting, when the summation value has reached the saturation region boundary value, i.e., when the summation value becomes "0", the carry signal from the most significant bit of the summation value is going to be issued, so that the saturation region can be judged and the calculation can be stopped by detecting this carry signal.

In the following, a case in which there is only one transient region in the transfer characteristic of the nonlinear unit 5 and the summation is realized by the serial calculations will be described.

In this case, the above described function can be realized by the following processing.

(1) The initial values of the first and second summation values are set up as follows:
  the initial value of the first summation value=the initial value of the first summation value in the third embodiment+the first saturation region boundary value; and
  the initial value of the second summation value=the initial value of the second summation value in the third embodiment−the second saturation region boundary value.

(2) The calculations similar to those in the fourth embodiment are carried out. Then, during the calculation, whenever the carry signal from the most significant bit occurs, the subsequent calculations are omitted.

To this end, the controller 33 of the one bit serial synapse calculation and summation circuit 10 in the configuration of FIG. 11 or FIG. 13 includes a partial configuration as shown in FIG. 19, which comprises a register 51 for storing a bit length i from the least significant bit of the synapse weight, a register 52 for storing a bit length j from the least significant bit of the input value, a register 53 for registering a variable which is controlled by the carry signal from the summation circuit, a register 54 for registering a constant "1", a register 55 for registering a constant L representing a word length of the absolute value portion of each value, an adder 56 for adding the outputs of the registers 51 and 52, an adder 57 for adding the outputs of the registers 53 and 54 and feeding back the result into the register 53, an adder 58 for adding the outputs of the register 53 and the adder 56 and outputting the control input k of the switches, a comparator 59 for comparing the outputs of the adder 58 and the register 55, and an AND circuit 60 receiving the outputs of the comparator 59 and the carry signal from the summation circuit and outputting the calculation stop signal.

In this configuration of FIG. 19, the following processing is carried out.

(1) The control inputs i and j are added, and the result of this addition and the variable are added, so as to evaluate the control input k for indicating which figure is currently calculated. Here, the initial value of the variable is set to be −L where L is the word length of the absolute value portion of each value. Also, the variable is increased by one whenever the carrying occurs at the summation circuit, or reset to the initial value whenever the carrying does not occur at the summation circuit.

(2) The control input value k is sent to the comparator 59 and compared with the constant L there, so as to judge whether the current calculation is for the most significant bit or not.

(3) By taking AND of the output of the comparator 59 and the carry signal from the summation circuit, whether the carrying has occurred in the calculation for the most significant bit or not is judged. Then, in a case the carrying has occurred in the calculation for the most significant bit, the calculation stop signal for stopping the calculations is issued, so as to omit the subsequent calculations.

In this manner, the stopping of the calculations can be realized by simply detecting the carry signal for the most significant bit of the summation value in this fifth embodiment.

Next, the sixth embodiment of a neural network circuit and a processing scheme using the neural network circuit according to the present invention will be described in detail.

In the first to fifth embodiments described above, a case of using the multiplication of the synapse weight and the input value as the synapse calculations has been described, but these embodiments can be made applicable to a case of using the absolute value or the square of the difference between the synapse weight and the input value as the synapse calculations by introducing the following modifications.

<Case of using the absolute value of the difference between the synapse weight and the input value>

(1) The initial value of the summation value is always set to be "0".

(2) The absolute value of the difference between the synapse weight and the input value always takes a positive value, so that the synapse calculation is carried out from the upper bits first, and then summation calculation is carried out.

<Case of using the square of the difference between the synapse weight and the input value>

(1) The initial value of the summation value is always set to be "0".

(2) The square of the difference between the synapse weight and the input value always takes a positive value, so that the synapse calculation is carried out from the upper bits first, and then summation calculation is carried out.

For example, when the difference between the synapse weight value and the input value can be expressed as $(a \times 2^3 + b \times 2^2 + c \times 2 + d)$, the square of this difference is rigorously given by:

$$\underline{a^2} \times 2^6 + 2abx2^5 + \underline{b^2} \times 2^4 + 2acx2^4 + 2bcx2^3 + \underline{c^2} \times 2^2 + 2bdx2^2 + 2cdx2 + \underline{d^2}$$

but in the processing described above, only the factors underlined in the above expression will be calculated, and the result will be smaller than the actual value. Here, however, it suffices to be able to judge whether the summation result reaches to the saturation region or not, so that the above processing can be applied to a case of using the square of the difference between the synapse weight and the input value as well.

Now, with references to FIGS. 20 and 21, the simulation result indicating the effects of the omission of calculations and the reduction of the memory accesses to the synapse weight memory circuit according to the first to sixth embodiments of the present invention will be described.

Figure 20:
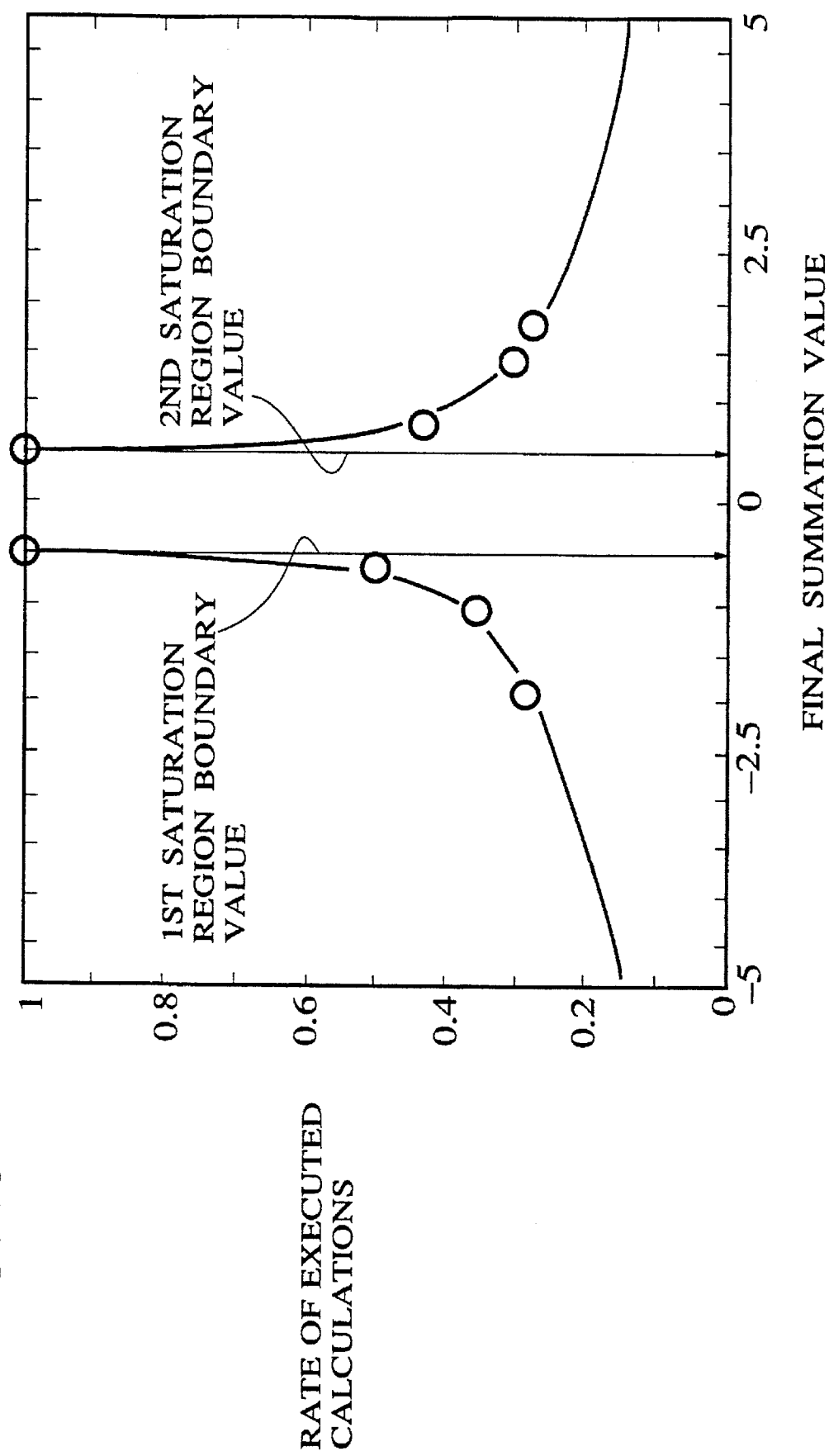
FIG. 20 is a graph of a rate of executed calculations versus a final summation value showing the effect of the omission of calculations in the first to sixth embodiments of a neural network circuit and a processing scheme according to the present invention.

FIG. 20 shows a relationship between the final summation value and the rate of executed calculations (i.e., a ratio of a number of calculations required in the system of the present invention with respect to a number of calculations required in the system of the prior art) for calculations at one neuron with respect to all the synapse connections in an exemplary case of using 16 inputs where each of the synapse weight and the input value comprises 16 bits including the sign bit and the absolute value portion. It can be seen from this FIG. 20 that the effect of the omission of calculations becomes noticeable for the final summation values which are more distanced from the saturation region boundary values.

Figure 21:
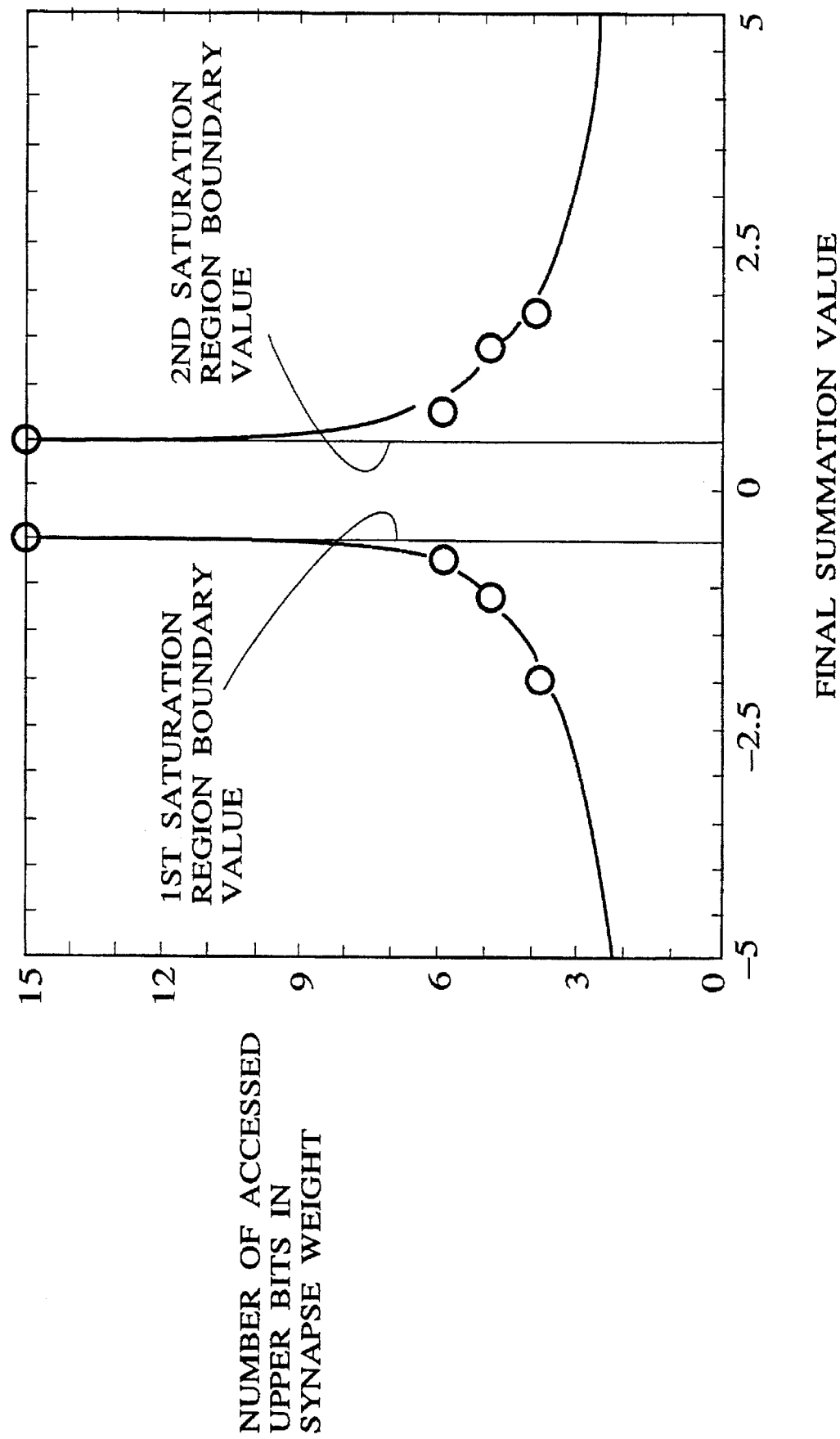
FIG. 21 is a graph of a number of accessed upper bits in synapse weight versus a final summation value showing the effect of the reduction of memory accesses in the first to sixth embodiments of a neural network circuit and a processing scheme according to the present invention.

On the other hand, FIG. 21 shows a relationship between the final summation value and the number of accessed upper bits in the synapse weight for the same exemplary case. It can be seen from this FIG. 21 that the effect of the reduction of memory accesses to the synapse weight memory circuit also becomes noticeable for the final summation value which are more distanced from the saturation region boundary values.

More specifically, these effects can be estimated quantitatively as follows. First, assuming that a rate by which the input value bit sequences are occupied by "1" bits is 50%, the omission of calculations for "0" bits in the input value bit sequences amounts to 50% reduction of the calculations. Moreover, assuming that a possibility for the final summation value to be in the saturation region is 90%, a possibility for the final summation value to be in the transient region to be 10%, and the average rate of executed calculations when the final summation value is in the saturation region is 20% in accordance with FIG. 20, it is possible to reduce the amount of calculations to be approximately 28%. Consequently, in total, the amount of calculations can be reduced to approximately 14%.

Similarly, assuming that a possibility for the final summation value to be in the saturation region is 90%, a possibility for the final summation value to be in the transient region to be 10%, and the average number of accessed upper bits in the synapse weight when the final summation value is in the saturation region is 3.2 bits in accordance with FIG. 21, it is possible to reduce the number of memory accesses to be approximately 28%.

Thus, according to the first to sixth embodiments described above, it is possible to reduce the amount of calculations required for the synapse calculations and the summation as well as a number of memory accesses to the synapse weights, such that the processing speed of the synapse calculations can be increased while the power consumption required for the calculations can be reduced, and as a consequence, it becomes possible to realize a large scale neural network circuit with a high processing speed which can obtain the accurate final result regardless of values taken by the input values and the synapse weights.

Referring now to FIGS. 22 to 28, the seventh embodiment of a neural network circuit and a processing scheme using the neural network circuit according to the present invention will be described in detail. Here, those elements which are substantially similar to the corresponding elements in the first to sixth embodiments described above will be given the same reference numerals in the figure and their description will be omitted.

Figure 22:
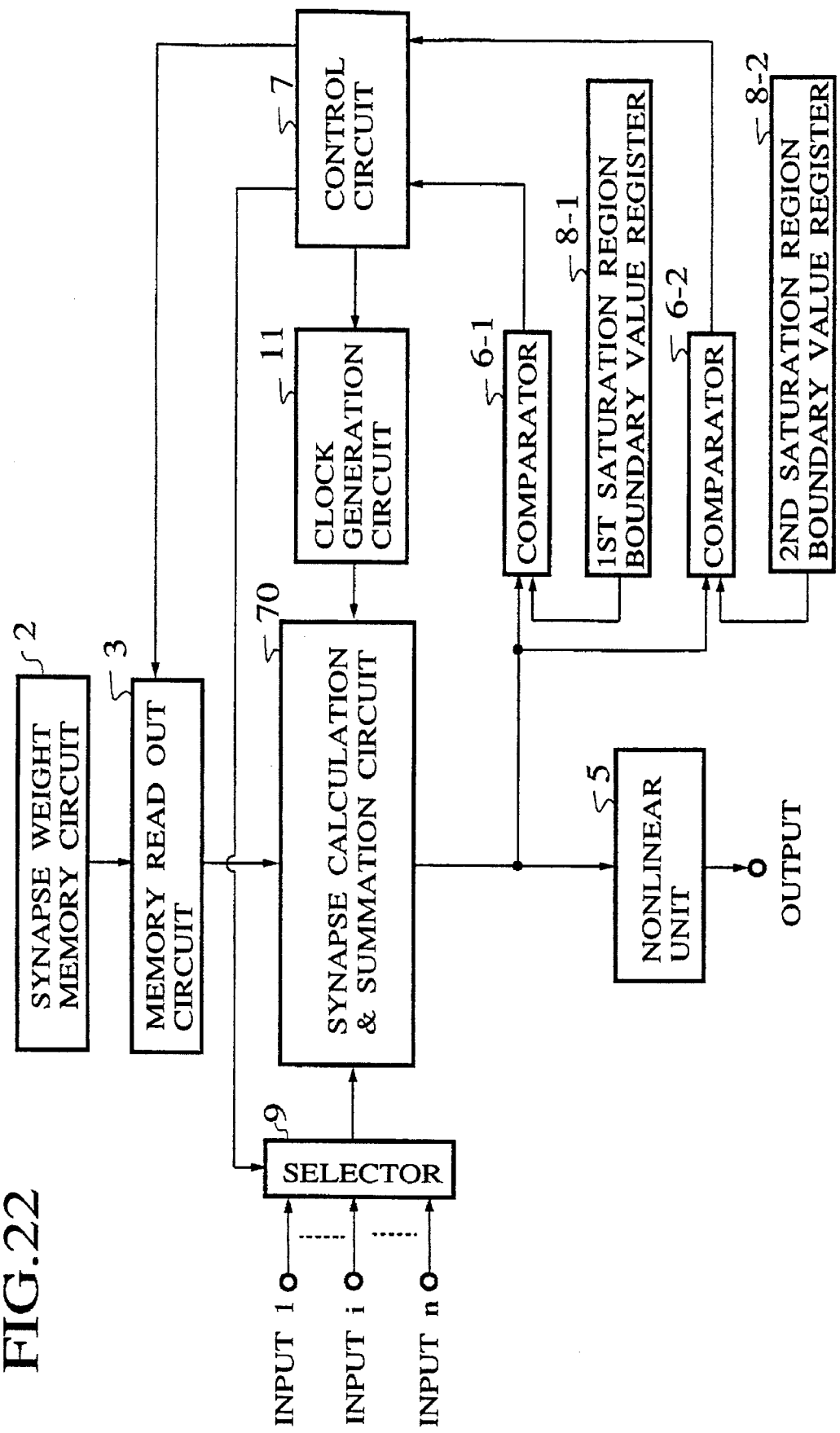
FIG. 22 is a block diagram of a neuron circuit for the seventh embodiment of a neural network circuit and a processing scheme according to the present invention.

In this seventh embodiment, each neuron circuit of the neural network circuit has a configuration as shown in FIG. 22, which differs from that of FIG. 10 for the third embodiment described above in that the one bit serial synapse calculation and summation circuit 10 of FIG. 10 is replaced by a synapse calculation and summation circuit 70. This synapse calculation and summation circuit 70 receives the synapse weight and the input value from the memory read out circuit 3 and the selector 9 as well as the clock signals from the clock generation circuit 11 under the control of the control circuit 7, and outputs the calculated summation result of the synapse calculations to the nonlinear unit 5 as well as the comparators 6-1 and 6-2.

Figure 23:
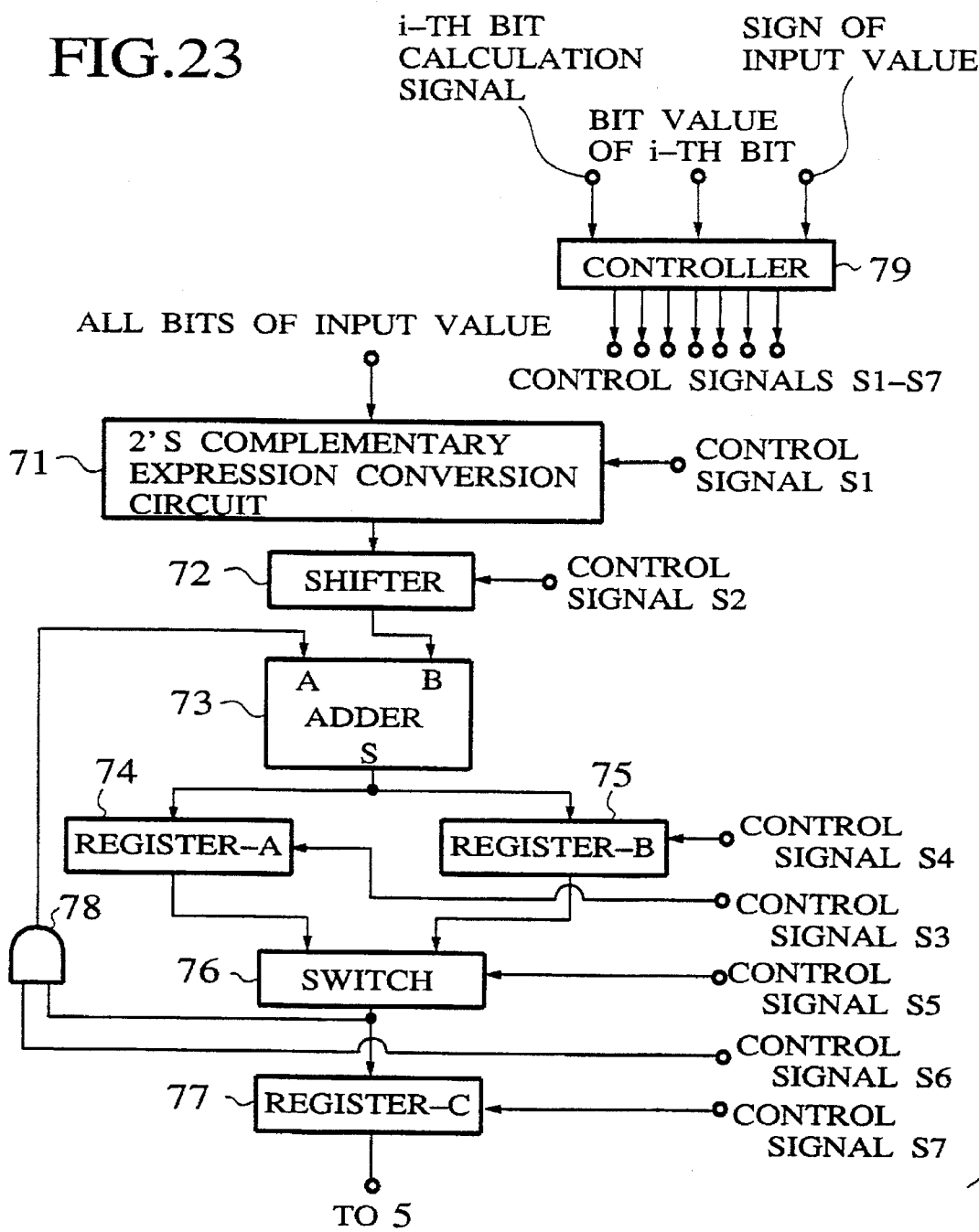
FIG. 23 is a block diagram of a synapse calculation and summation circuit in the neuron circuit of FIG. 22.

The synapse calculation and summation circuit 70 has a detailed configuration as shown in FIG. 23, which comprises a 2's complementary expression conversion circuit 71 receiving all bits of the input value, a shifter 72 receiving an output of the 2's complementary expression conversion circuit 71, an adder 73 receiving an output of the shifter 72 as its B terminal input, a register-A 74 and a register-B 75 for receiving an S terminal output of the adder 73, a switch 76 receiving outputs of the register-A (register for monotonously increasing summation value) 74 and the register-B (register for monotonously decreasing summation value) 75, a register-C (register for output summation value) 77 for receiving an output of the switch 76 and supplying its output to the nonlinear unit 5, an AND circuit 78 receiving the output of the switch 76 and supplying its output to the adder 73 as an A terminal input, and a controller 79 for supplying control signals S1 to S7 to the 2's complementary expression conversion circuit 71, the shifter 72, the register-A 74, the register-B 75, the switch 76, another input of the AND circuit 78, and the register-C 77, respectively.

The controller 79 receives an i-th bit calculation signal indicating that the calculation using the i-th bit is currently executed from the control circuit 7, a bit value of the i-th bit from the least significant bit in the synapse weight from the memory read out circuit 3, and a sign of the input value from the selector 9.

In general, the complementary expression can be given by the 2's complementary expression, the 1's complementary expression, etc., but a case of using the 2's complementary expression will be described as an example here. Consequently, the 2's complementary expression in the following description may be replaced by the 1's complementary expression if desired.

Figure 24:
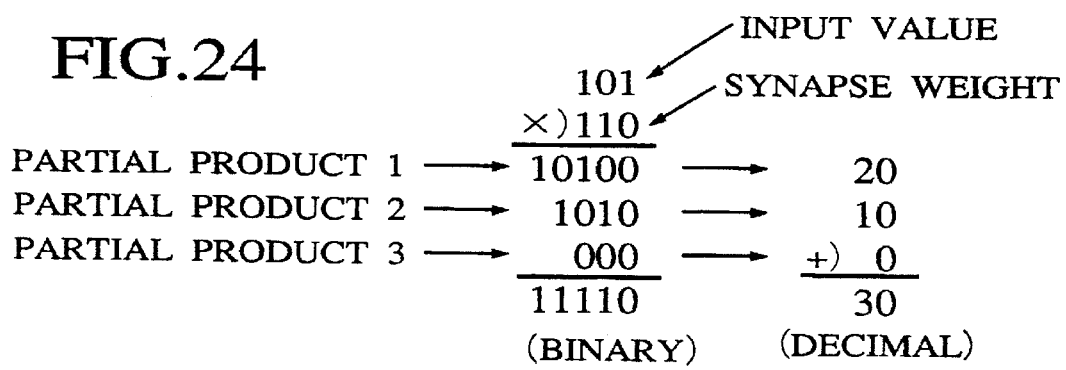
FIG. 24 is a diagrammatic illustration of an exemplary calculation in the synapse calculation and summation circuit of FIG. 23.

In this synapse calculation and summation circuit 70 of FIG. 23, partial products of all the bits of the input value and each one bit of the synapse weight are calculated, and then these partial products are added together to obtain the summation result, as indicated in FIG. 24, by means of the following processing.

(1) In order to carry out the calculation from the upper bit of the synapse weight, all the bits of the input value to be used in the calculation are transferred to the 2's complementary expression conversion circuit 71 while a necessary bit of the synapse weight is transferred to the controller 79.

(2) According to the i-th bit calculation signal, the bit value of the i-th bit, and the sign of the input value, the controller 79 determines whether or not to apply the 2's complementary expression conversion with respect to the input value, and accordingly controls the conversion operation of the 2's complementary expression conversion circuit 71 by the control signal S1. Here, it is to be noted that the i-th bit is counted by assigning i=0 for the first bit.

(3) According to the i-th bit calculation signal, the controller 79 determines how many bits of shifting is necessary, and accordingly controls the shifting operation of the shifter 72 by the control signal S2.

(4) According to the i-th bit calculation signal, the bit value of the i-th bit, and the sign of the input value, the controller 79 determines which one of the value registered in the register-A 74 and the value registered in the register-B 75 is to be added with the output of the shifter 72, and accordingly controls the switch 76 by the control signal S5 to selectively output either one of the value registered in the register-A 74 and the value registered in the register-B 75.

(5) The controller 29 also controls the AND circuit 78 according to whether or not the value selectively outputted from the switch 76 should be added with the output of the shifter 72. In a case of initially registering the output of the shifter 72 as it is into either one of the register-A 74 or the register-B 75, the control signal S6 is set to be "0" such that the AND circuit 78 outputs "0" for this purpose.

(6) The adder 73 carries out the addition of the output of the shifter 72 and the output of the AND circuit 28.

(7) According to the i-th bit calculation signal, the bit value of the i-th bit, and the sign of the input value, the controller 79 determines which one of the register-A 74 and the register-B 75 should the addition result be stored, and accordingly controls the storing of the addition result into one of the register-A 74 and the register-B 75 by using the control signals S3 and S4 as trigger.

(8) The controller 29 also controls the register-C 77 by the control signal S7 according to whether or not the value outputted from the switch 76 should be outputted to the nonlinear unit 5.

Now, the initial value setting scheme and the bit calculation scheme used in this synapse calculation and summation circuit 70 of FIG. 23 will be described.

(1) Data of the input value and the synapse weight are all given to the synapse calculation and summation circuit 70 in the 2's complementary expressions. Here, a word length (bit length) of each value is set to be L, and a sequential bit number of an absolute value portion from the least significant bit is set to be i.

(2) According to the input value and the sign bit of the synapse weight (which is the most significant bit in the 2's complementary expression), the initial values of the summation value for monotonously increasing calculations (second summation value) and the summation value for monotonously decreasing calculations (first summation value) are set up as follows.

(a) When the input value and the synapse weight are both positive:

The minimum value of the positive synapse weight expressed by an L digits 2's complementary expression is "0", and the maximum value of the positive synapse weight expressed by an L digits 2's complementary expression is "$2^{(L-1)}-1$". Therefore, the minimum value that can possibly be taken by the synapse calculation result is "0", and the maximum value that can possibly be taken by the synapse calculation result is "input value×$\{2^{(L-1)}-1\}$". For this reason, the initial value of the summation value for the monotonously increasing calculations is set to be the minimum value that can possibly be taken by the synapse calculation result while the initial value of the summation value for the monotonously decreasing calculations is set to be −(the maximum value that can possibly be taken by the synapse calculation result).

Here, it is to be noted that the monotonously decreasing calculations is going to be converted into the monotonously increasing calculations by means of the 2's complementary expression, so that the initial value of the summation value for the monotonously decreasing calculations is going to have a minus sign in front of the maximum value.

Figure 25:
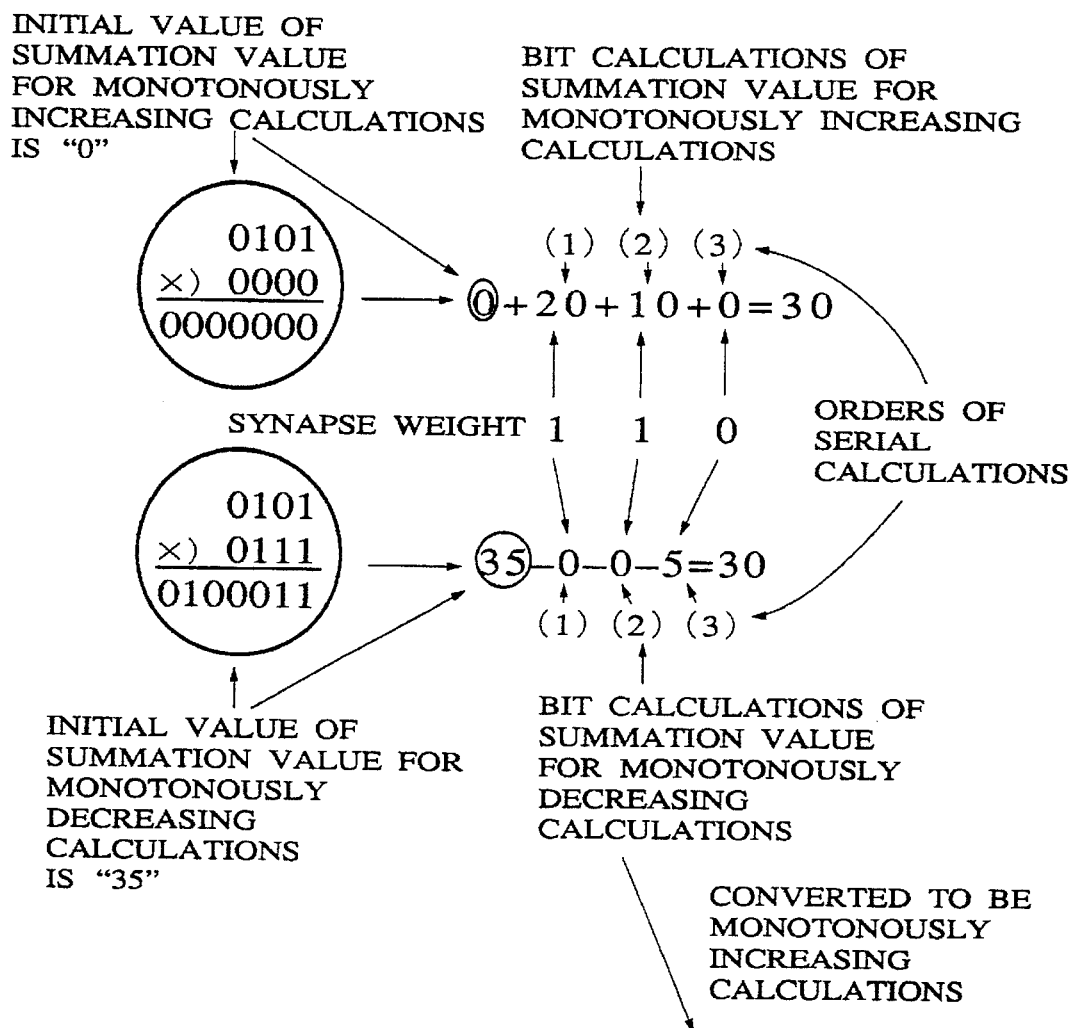
FIG. 25 is a diagrammatic illustration of an exemplary calculation for obtaining initial values of summation values in the neuron circuit of FIG. 22 for one case.

As an illustrative example, an exemplary case of using "5" as the input value and "6" as the synapse weight in which the input value and the synapse weight are expressed by 4 bits 2's complementary expressions will be described according to FIG. 25. In this case, the minimum value that can possibly be taken by the synapse weight is "0" while the maximum value that can possibly be taken by the synapse weight is "7", so that the minimum value that can possibly be taken by the synapse calculation result is going to be "0", and the maximum value that can possibly be taken by the synapse calculation result is going to be "35". Consequently, the initial value of the summation value for the monotonously increasing calculations is set to be "0" while the initial value of the summation value for the monotonously decreasing calculations is set to be "−35".

(b) When the input value is negative but the synapse weight is positive:

The minimum value of the positive synapse weight expressed by an L digits 2's complementary expression is "0", and the maximum value of the positive synapse weight expressed by an L digits 2's complementary expression is "$2^{(L-1)}-1$". Therefore, the minimum value that can possibly be taken by the synapse calculation result is "input value×$\{2^{(L-1)}-1\}$", and the maximum value that can possibly be taken by the synapse calculation result is "0". For this reason, the initial value of the summation value for the monotonously increasing calculations is set to be the minimum value that can possibly be taken by the synapse calculation result while the initial value of the summation value for the monotonously decreasing calculations is set to be −(the maximum value that can possibly be taken by the synapse calculation result).

Here, again, the monotonously decreasing calculations is going to be converted into the monotonously increasing calculations by means of the 2's complementary expression, so that the initial value of the summation value for the monotonously decreasing calculations is going to have a minus sign in front of the maximum value.

Figure 26:
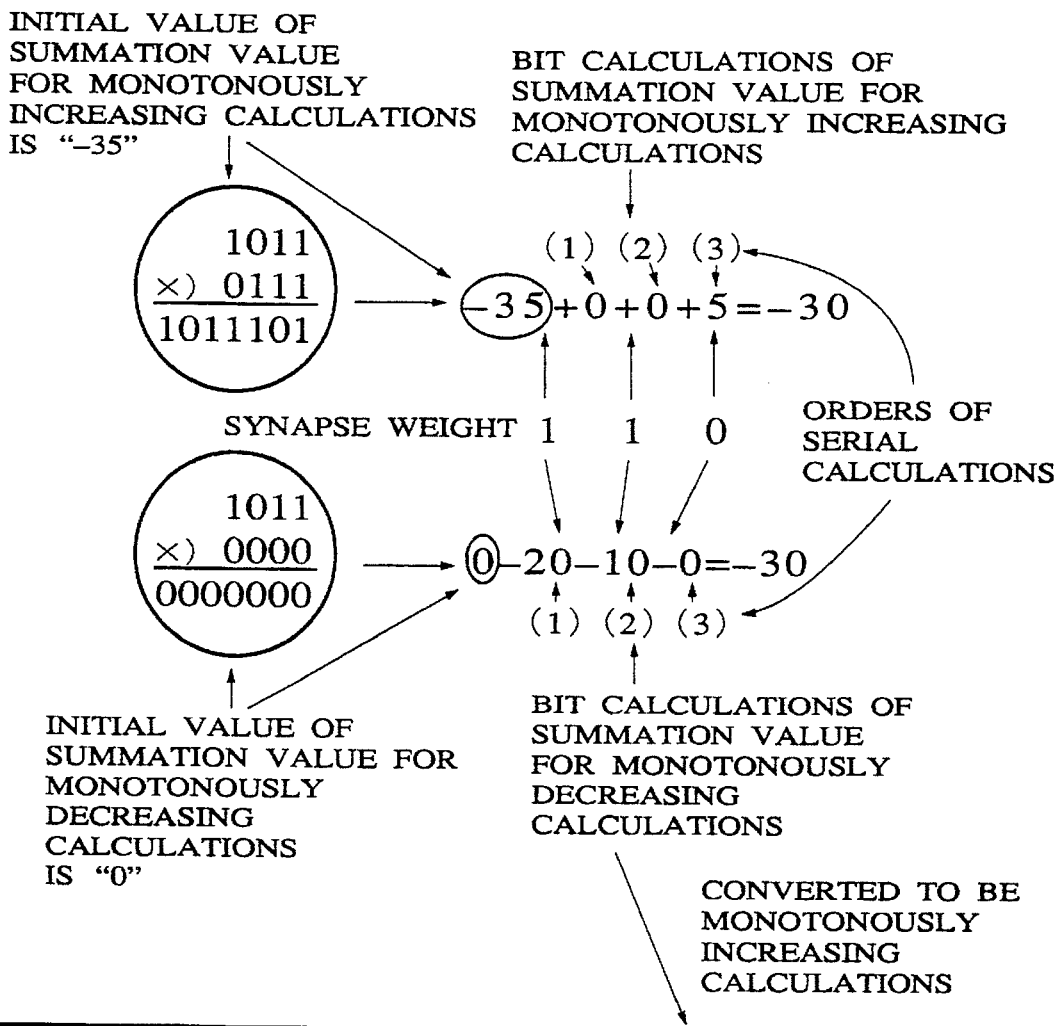
FIG. 26 is a diagrammatic illustration of an exemplary calculation for obtaining initial values of summation values in the neuron circuit of FIG. 22 for another case.

As an illustrative example, an exemplary case of using "−5" as the input value and "6" as the synapse weight in which the input value and the synapse weight are expressed by 4 bits 2's complementary expressions will be described according to FIG. 26. In this case, the minimum value that can possibly be taken by the synapse weight is "0" while the maximum value that can possibly be taken by the synapse weight is "7", so that the minimum value that can possibly be taken by the synapse calculation result is going to be "−35", and the maximum value that can possibly be taken by the synapse calculation result is going to be "0". Consequently, the initial value of the summation value for the monotonously increasing calculations is set to be "−35" while the initial value of the summation value for the monotonously decreasing calculations is set to be "0".

(c) When the input value is positive but the synapse weight is negative:

The minimum value of the negative synapse weight expressed by an L digits 2's complementary expression is "$-(2^{(L-1)})$", and the maximum value of the negative synapse weight expressed by an L digits 2's complementary expression is "−1". Therefore, the minimum value that can possibly be taken by the synapse calculation result is "input value×$\{-(2^{(L-1)})\}$", and the maximum value that can possibly be taken by the synapse calculation result is "−(input value)". For this reason, the initial value of the summation value for the monotonously increasing calculations is set to be the minimum value that can possibly be taken by the synapse calculation result while the initial value of the summation value for the monotonously decreasing calculations is set to be −(the maximum value that can possibly be taken by the synapse calculation result).

Here, again, the monotonously decreasing calculations is going to be converted into the monotonously increasing calculations by means of the 2's complementary expression, so that the initial value of the summation value for the monotonously decreasing calculations is going to have a minus sign in front of the maximum value.

As an illustrative example, an exemplary case of using "5" as the input value and "−6" as the synapse weight in which the input value and the synapse weight are expressed by 4 bits 2's complementary expressions will be described according to FIG. 27. In this case, the minimum value that can possibly be taken by the synapse weight is "−8" while the maximum value that can possibly be taken by the synapse weight is "−1", so that the minimum value that can possibly be taken by the synapse calculation result is going to be "−40", and the maximum value that can possibly be taken by the synapse calculation result is going to be "−5". Consequently, the initial value of the summation value for the monotonously increasing calculations is set to be "−40" while the initial value of the summation value for the monotonously decreasing calculations is set to be "5".

(d) When the input value and the synapse weight are both negative:

The minimum value of the negative synapse weight expressed by an L digits 2's complementary expression is "$-(2^{(L-1)})$", and the maximum value of the negative synapse weight expressed by an L digits 2's complementary expression is "−1". Therefore, the minimum value that can possibly be taken by the synapse calculation result is "−(input value)", and the maximum value that can possibly be taken by the synapse calculation result is "input value×$\{-(2^{(L-1)})\}$". For this reason, the initial value of the summation value for the monotonously increasing calculations is set to be the minimum value that can possibly be taken by the synapse calculation result while the initial value of the summation value for the monotonously decreasing calculations is set to be −(the maximum value that can possibly be taken by the synapse calculation result).

Here, again, the monotonously decreasing calculations is going to be converted into the monotonously increasing calculations by means of the 2's complementary expression, so that the initial value of the summation value for the monotonously decreasing calculations is going to have a minus sign in front of the maximum value.

Figure 28:
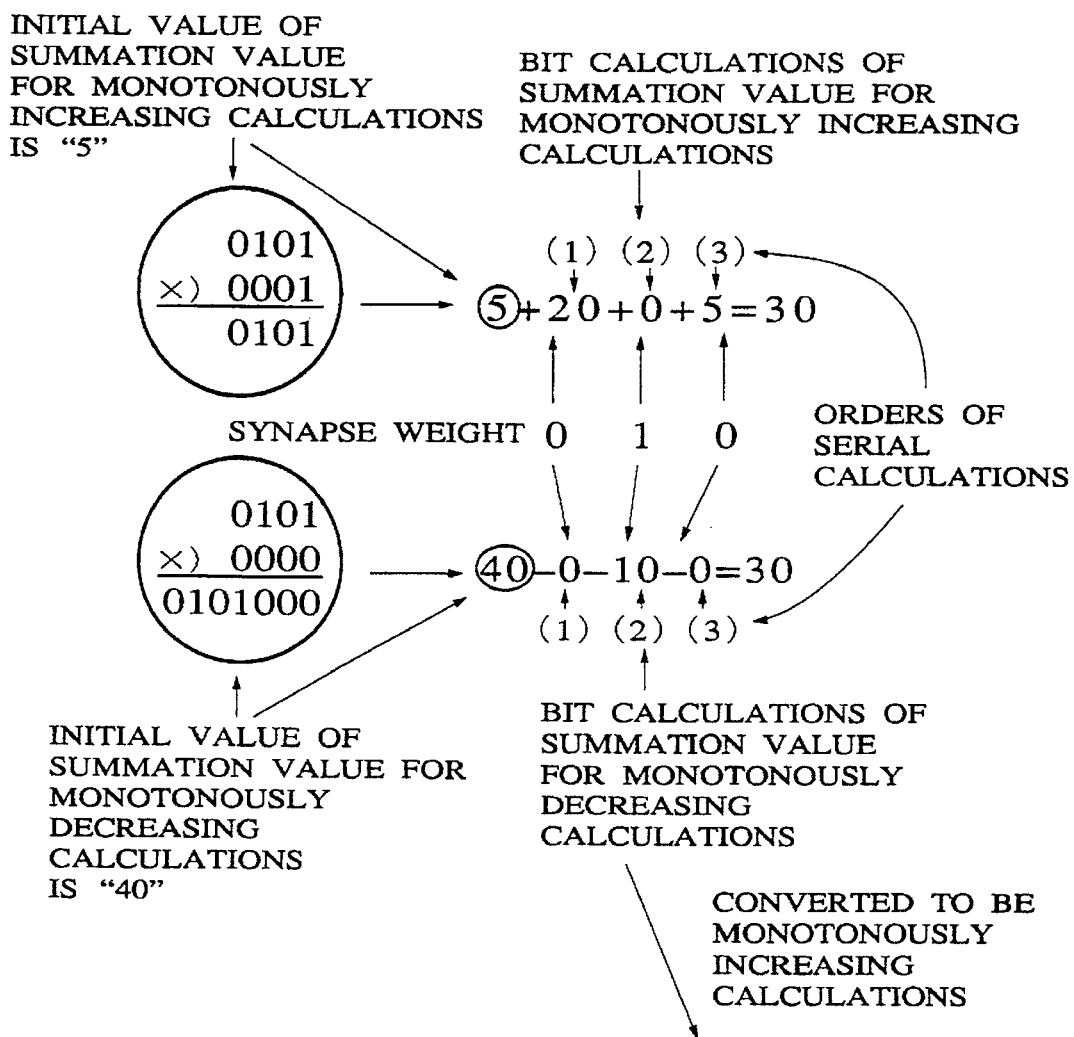
FIG. 28 is a diagrammatic illustration of an exemplary calculation for obtaining initial values of summation values in the neuron circuit of FIG. 22 for another case.

As an illustrative example, an exemplary case of using "−5" as the input value and "−6" as the synapse weight in which the input value and the synapse weight are expressed by 4 bits 2's complementary expressions will be described according to FIG. 28. In this case, the minimum value that can possibly be taken by the synapse weight is "−8" while the maximum value that can possibly be taken by the synapse weight is "−1", so that the minimum value that can possibly be taken by the synapse calculation result is going to be "5", and the maximum value that can possibly be taken by the synapse calculation result is going to be "40". Consequently, the initial value of the summation value for the monotonously increasing calculations is set to be "5" while the initial value of the summation value for the monotonously decreasing calculations is set to be "−40".

(3) According to the input value and the bit value of the i-th bit from the least significant bit in the synapse weight, the following bit calculation is carried out, as indicated in FIGS. 25 to 28.

(a) When the input value is positive and the bit value of the i-th bit of the synapse weight is "1":

A value "input value×$2^i$" is added to the summation value for the monotonously increasing calculations.

(b) When the input value is positive and the bit value of the i-th bit of the synapse weight is "0":

A value "input value×$2^i$" is added to the summation value for the monotonously decreasing calculations.

(c) When the input value is negative and the bit value of the i-th bit of the synapse weight is "1":

A value "2's complementary expression of input value×$2^i$" is added to the summation value for the monotonously decreasing calculations.

(d) When the input value is negative and the bit value of the i-th bit of the synapse weight is "0":

A value "2's complementary expression of input value×$2^i$" is added to the summation value for the monotonously increasing calculations.

By means of this processing, just as indicated in FIGS. 14 and 15 described above, the summation value for the monotonously increasing calculations (second summation value) and the summation value for the monotonously decreasing calculations (first summation value) gradually converge from the initial values to the final values as the calculation progresses. Here, the summation value for the monotonously increasing calculations can make a judgement as to whether it has reached the saturation region A by converging to the final value while monotonously increasing as in FIG. 14, while the summation value for the monotonously decreasing calculations can make a judgement as to whether it has reached the saturation region B by converging to the final value while monotonously decreasing as in FIG. 15. Whenever the summation value has reached to the saturation region A or B, the subsequent calculations are omitted.

It is to be noted that it is possible to modify the above described seventh embodiment to use the initial value setting and the bit calculation in a reversed polarity in which the initial value of the summation value for the monotonously increasing calculations is set to be −(the minimum value that can possibly be taken by the synapse calculation result) while the initial value of the summation value for the monotonously decreasing calculations is set to be the maximum value that can possibly be taken by the synapse calculation result, and the bit calculation is carried out such that a value "2's complementary expression of input value×$2^i$" is added to the summation value for the monotonously increasing calculations when the input value is positive and the bit value of the i-th bit of the synapse weight is "1", a value "2's complementary expression of input value×$2^i$" is added to the summation value for the monotonously decreasing calculations when the input value is positive and the bit value of the i-th bit of the synapse weight is "0", a value "input value×$2^i$" is added to the summation value for the monotonously decreasing calculations when the input value is negative and the bit value of the i-th bit of the synapse weight is "1", and a value "input value×$2^i$" is added to the summation value for the monotonously increasing calculations when the input value is negative and the bit value of the i-th bit of the synapse weight is "0".

Figure 29:
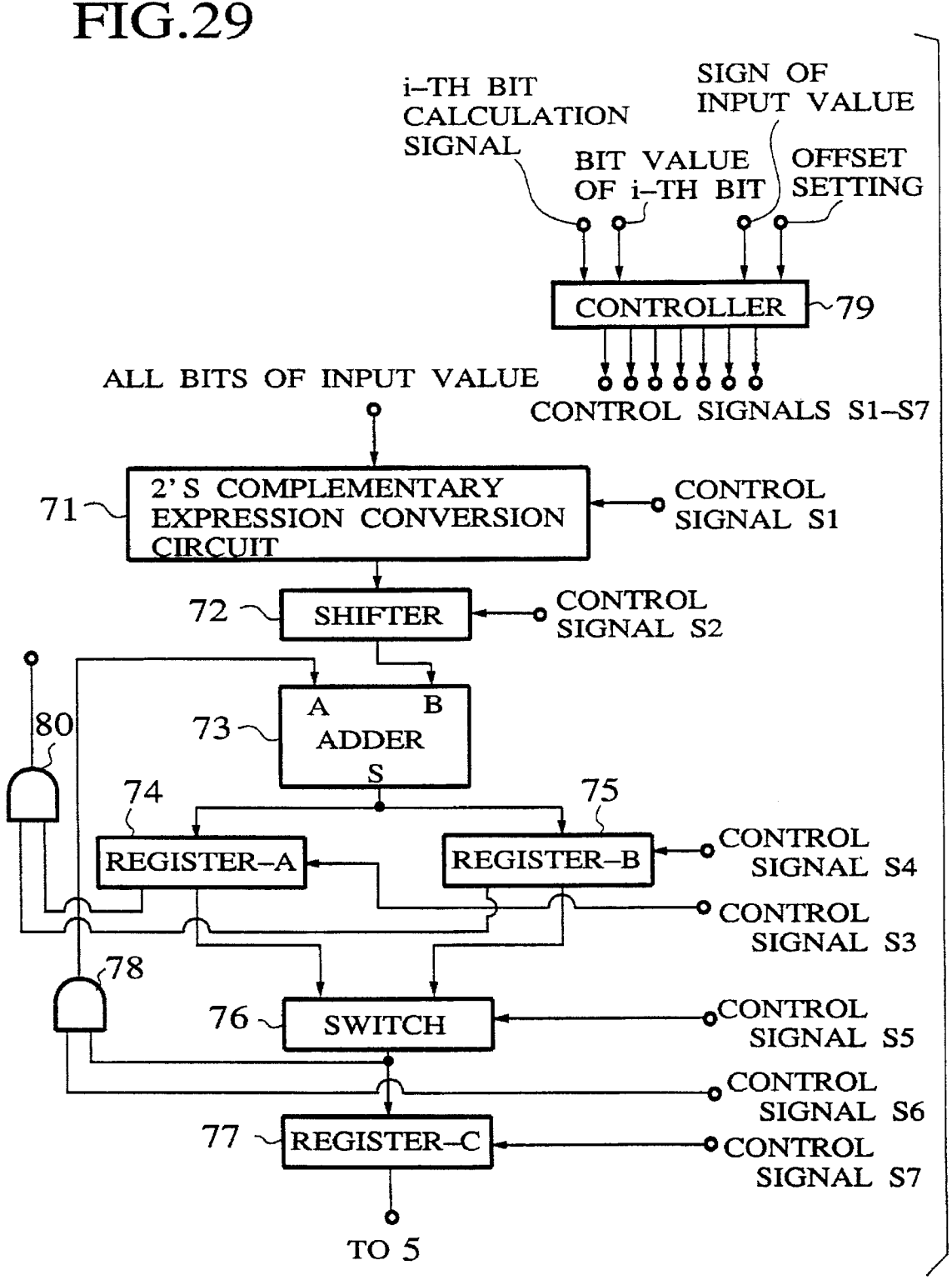
FIG. 29 is a block diagram of a synapse calculation and summation circuit in a neuron circuit for the eighth embodiment of a neural network circuit and a processing scheme according to the present invention.
Figure 30A:
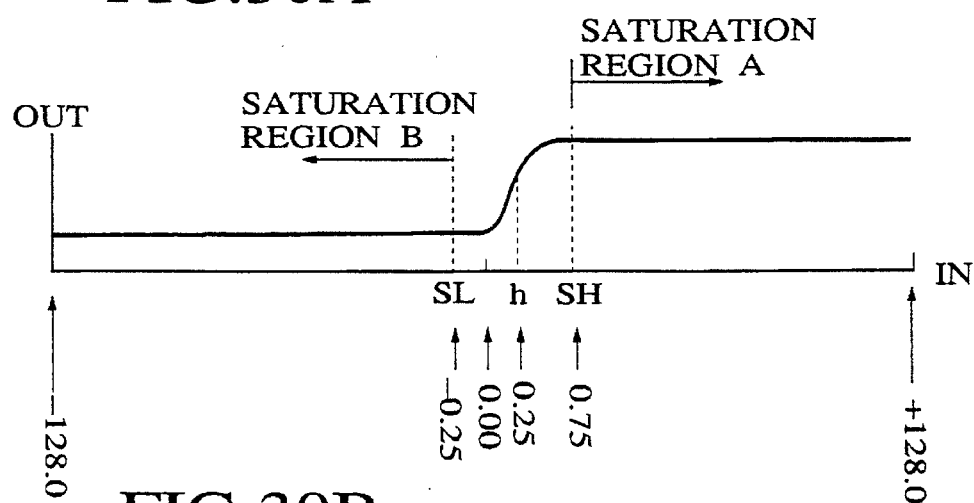
FIGS. 30A, 30B, and 30C are graphs of a transfer characteristic of a nonlinear unit in the neuron circuit of the eighth embodiment, showing a manner of providing offsets in the eighth embodiment.
Figure 30B:
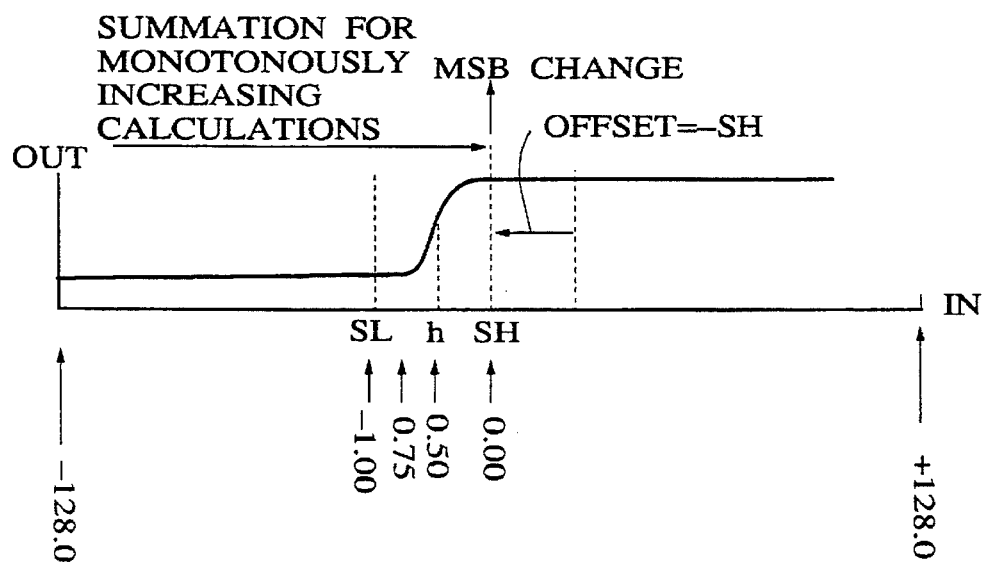
Figure 30C:
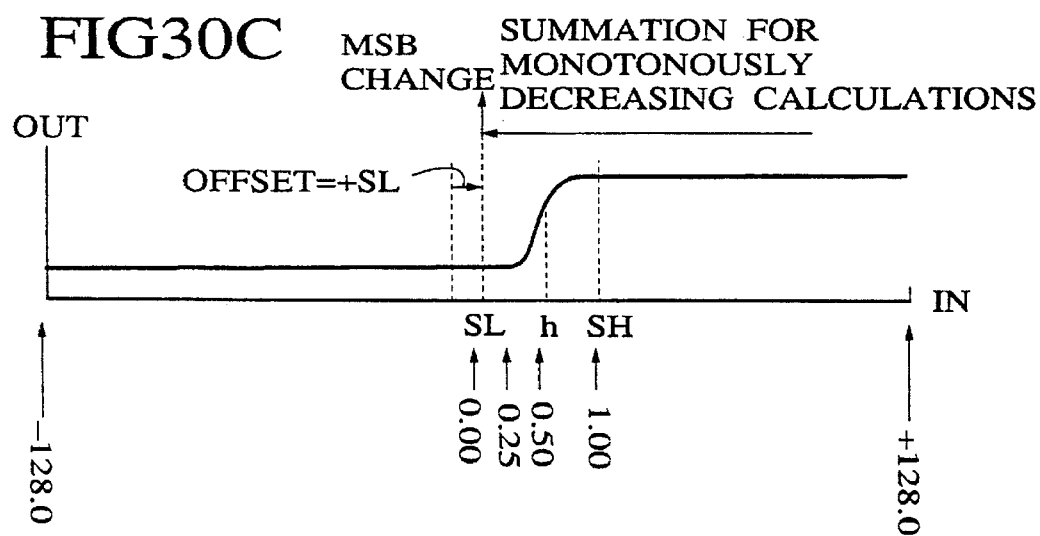

Referring now to FIGS. 29 to 30C, the eighth embodiment of a neural network circuit and a processing scheme using the neural network circuit according to the present invention will be described in detail. Here, those elements which are substantially similar to the corresponding elements in the seventh embodiment described above will be given the same reference numerals in the figure and their description will be omitted.

In this eighth embodiment, the detailed configuration of the synapse calculation and summation circuit in the seventh embodiment described above is modified such that a judgement as to whether or not the summation value has reached to the saturation region can be made easier. Namely, in this eighth embodiment, the synapse calculation and summation circuit has a detailed configuration as shown in FIG. 29, which differs from that of FIG. 23 in that an additional AND circuit 80 for carrying out the offset processing which receives the most significant bits of the values registered in the register-A 74 and the register-B 75 and outputs the calculation stop signal is provided, and the offset setting as described below is also supplied to the controller 79 from the control circuit 7.

Now, in order to judge the location of the summation value among the saturation region A, the transient region, and the saturation region B, it suffices to compare the current summation value with the first and second saturation region boundary values, where the first saturation region boundary value indicates the boundary value between the saturation region B and the transient region while the second saturation region boundary value indicates the boundary value between the transient region and the saturation region A. However, in order to carry out this judgement procedure, it is necessary to provide two comparators for determining the size relationships between the summation value and the first saturation region boundary value and between the summation value and the second saturation region boundary value as in the previous embodiments.

In this eighth embodiment, the following processing is carried out in order to omit these comparators.

(1) With respect to the transfer characteristic of the nonlinear unit as shown in FIG. 30A, the second saturation region boundary value SH is subtracted in advance as an offset from the initial value of the summation value for the monotonously increasing calculations which judges the saturation region A as indicated in FIG. 30B, and the first saturation region boundary value SL is added in advance as an offset to the initial value of the summation value for the monotonously decreasing calculations which judges the saturation region B as indicated in FIG. 30C.

(2) With these offset values included, the final summation values would not be the correct values, so that before the nonlinear processing, these offset values are removed from the final summation values.

By means of this processing, it becomes possible to judge that it is the saturation region A whenever the summation value for the monotonously increasing calculations changes its sign from negative to positive, it is the saturation region B whenever the summation value for the monotonously decreasing calculations changes its sign from negative to positive (as the monotonously decreasing calculations are actually carried out by reversing the sign), and it is the transient region as long as both of the summation value for the monotonously increasing calculations and the summation value for the monotonously decreasing calculations remain negative. Thus, by means of this, it becomes possible to judge the timing for stopping the calculations more easily.

Namely, whenever either one of these summation values changes its sign to positive (i.e., the most significant bit becomes "0"), the subsequent calculations are omitted as the final result of the summation becomes apparent at that point, so as to realize the reduction of the amount of calculations and the memory accesses to the synapse weight memory circuit.

Also, in the above described processing, if the signs of the initial values of the summation values for the monotonously increasing and decreasing calculations, the offset values, and the value to be added at a time of the bit calculation are reversed, it is possible to realize an alternative scheme in which, whenever either one of these summation values changes its sign to negative (i.e., the most significant bit becomes "1"), the subsequent calculations are omitted as the final result of the summation becomes apparent at that point, so as to realize the reduction of the amount of calculations and the memory accesses to the synapse weight memory circuit.

Figure 31:
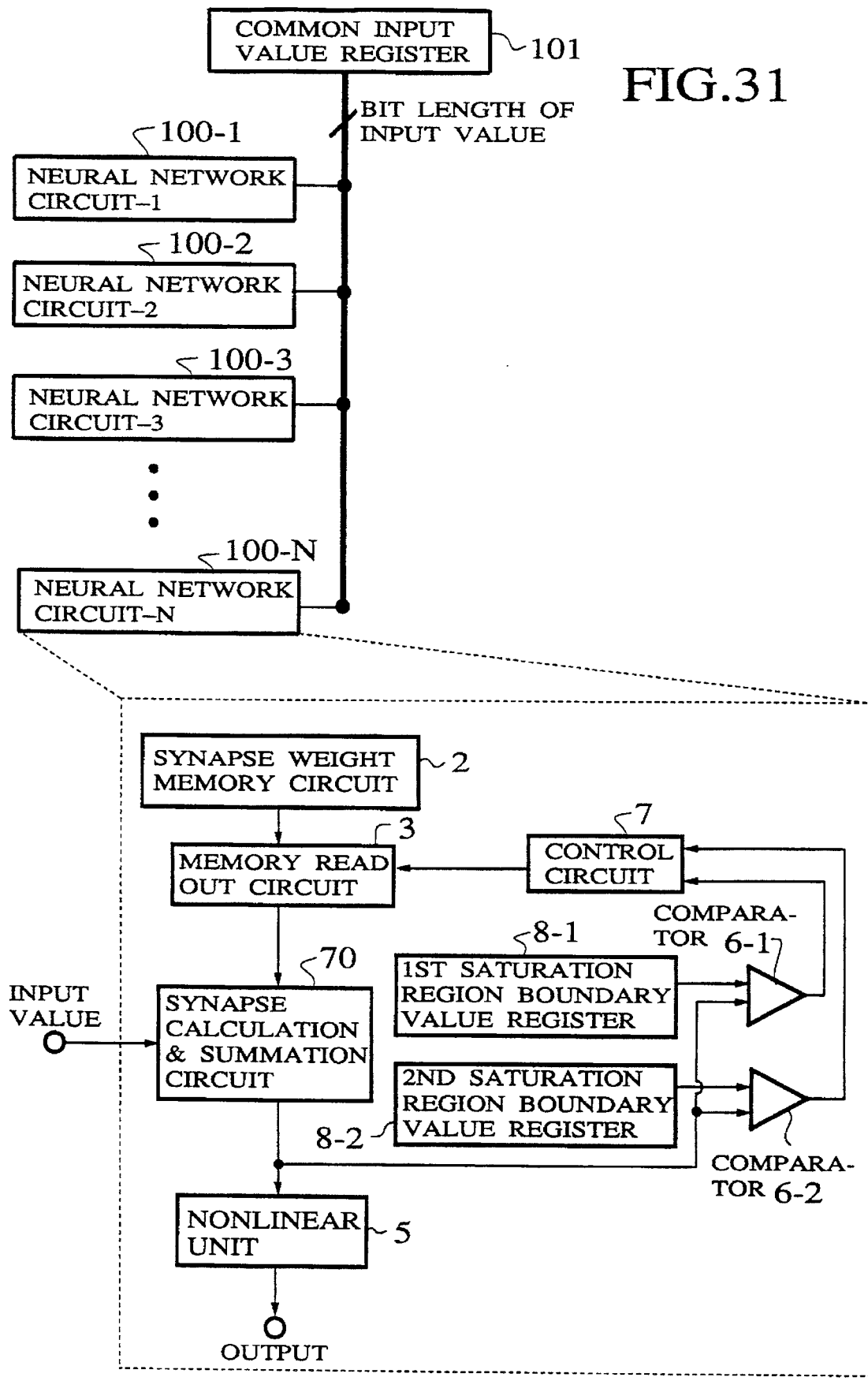
FIG. 31 is a block diagram of a neural network system using the ninth embodiment of a neural network circuit and a processing scheme according to the present invention.
Figure 32:
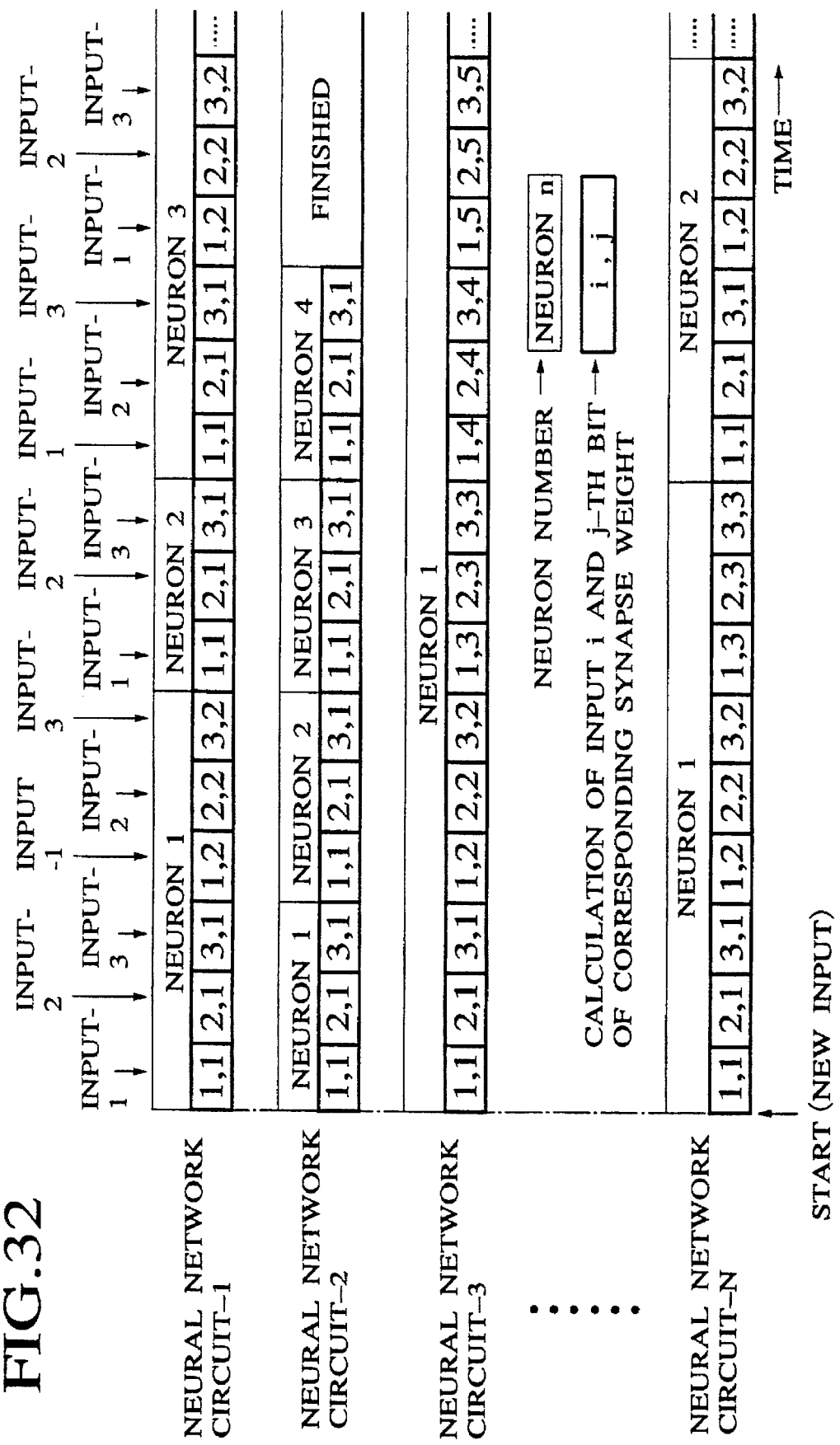
FIG. 32 is a timing chart showing an exemplary progress of calculations at neural network circuits in the neural network system of FIG. 31.

Referring now to FIGS. 31 and 32, the ninth embodiment of a neural network circuit and a processing scheme using the neural network circuit according to the present invention will be described in detail. Here, those elements which are substantially similar to the corresponding elements in the seventh embodiment described above will be given the same reference numerals in the figure and their description will be omitted.

In this ninth embodiment, a neural network system is formed by a plurality of neural network circuits 100-1 to 100-N, where each neural network circuit has a configuration of a neuron circuit similar to that shown in FIG. 22 of the seventh embodiment described above, except that the selector 9 in FIG. 22 is omitted. Here, each neuron circuit configuration of each neural network circuit 100 carries out calculations for a plurality of neurons by itself. In addition, there is provided a common input value register 101 for supplying the identical input values to all the neural network circuits 100-1 to 100-N.

In this case, the input values are supplied from the common input value register 101 to the neural network circuits 100-1 to 100-N as follows. Namely, when there are M input values, each input value is transferred to all the neural network circuits 100-1 to 100-N, one by one from the first input value until the M-th input value. When the transfer of the M-th input value is finished, the transfer of these input values are repeated in the similar manner, until all the neural network circuits 100-1 to 100-N finish the calculations. Here, at a time of transferring each input value, all the bits of each input value are transferred together to each neural network circuit 100.

At each neural network circuit 100, the synapse calculation using all the bits of the transferred input value and one bit of a corresponding synapse weight is sequentially carried out from the upper bits of the synapse weight, and whenever the summation value reaches to the saturation region, the subsequent calculations are omitted, just as in the seventh embodiment described above.

In this manner, in this ninth embodiment, it is possible for each neural network circuit 100 to carry out and stop the calculations, independently from the other neural network circuits 100, in a simple circuit configuration.

More specifically, the calculations at the neural network circuits 100-1 to 100-N can progress as shown in FIG. 32 for an exemplary case in which the number of input values M is 3, and each neural network circuit 100 carries out calculations for four neurons. As indicated in FIG. 32, the input-1, input-2, and input-3 are sequentially and repeatedly transferred to each neural network circuit 100. At each neural network circuit 100, the synapse calculation using all the bits of the transferred input value and one bit of a corresponding synapse weight is sequentially carried out from the upper bits of the synapse weight, sequentially for each one of the four neurons. Whenever the summation value for one neuron reaches to the saturation region in each neural network circuit 100, the calculations for that neuron is finished by omitting the subsequent calculations and the calculations for a next neuron is started in each neural network circuit 100 independently, so that the calculations at each neural network circuit 100 progresses independently from the progresses of calculations in the other neural network circuits 100.

Thus, according to this ninth embodiment, the neural network system with the following advantageous features can be realized.

(1) It suffices to provide a single common input value register 101 for all the neural network circuits 100-1 to 100-N, so that the neural network system can be realized in a compact circuit scale.

(2) Moreover, it suffices to supply the identical input value from the common input value register 101 to all the neural network circuits 100-1 to 100-N, so that the control in the neural network system can be very simple.

(3) Furthermore, the calculation at each neural network circuit 100 is independently controllable as described above.

Now, with references to FIGS. 33 and 34, the simulation result indicating the effects of the omission of calculations and the reduction of the memory accesses to the synapse weight memory circuit according to the seventh to ninth embodiments of the present invention will be described.

Figure 33:
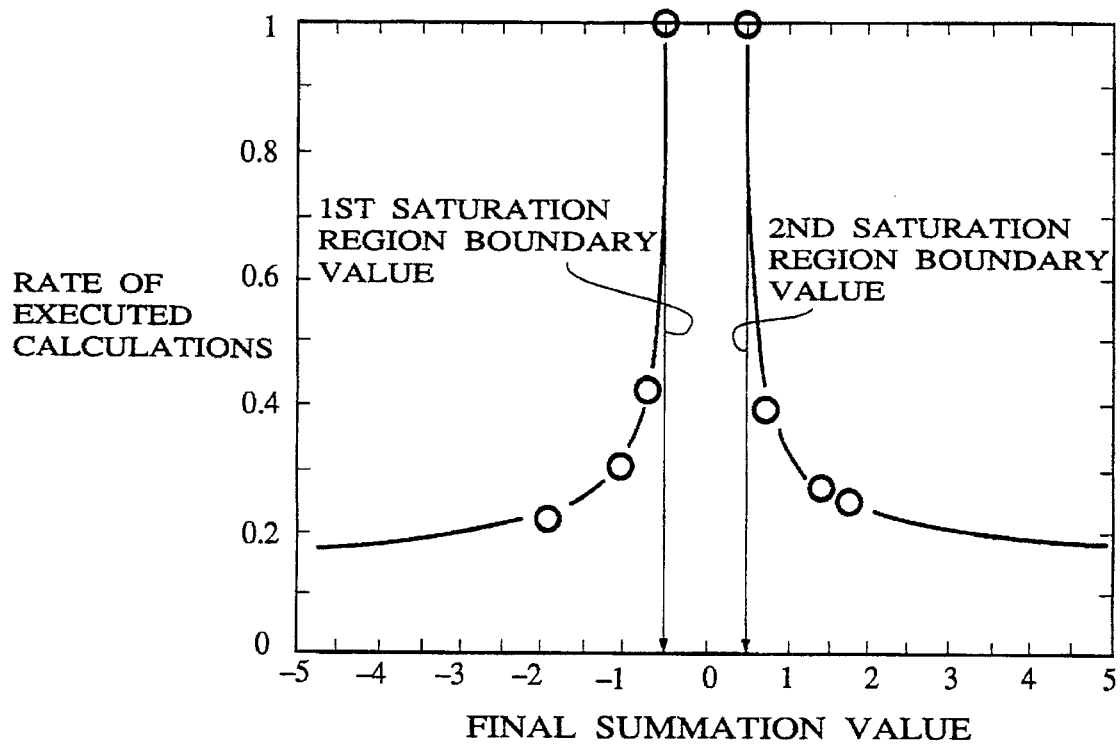
FIG. 33 is a graph of a rate of executed calculations versus a final summation value showing the effect of the omission of calculations in the seventh to ninth embodiments of a neural network circuit and a processing scheme according to the present invention.

FIG. 33 shows a relationship between the final summation value and the rate of executed calculations (i.e., a ratio of a number of calculations required in the system of the present invention with respect to a number of calculations required in the system of the prior art) for calculations at one neuron with respect to all the synapse connections in an exemplary case of using 17 inputs where each of the synapse weight and the input value comprises 16 bits of 2's complementary expressions, the second saturation region boundary value= 0.5, and the first saturation region boundary value=−0.5. It can be seen from this FIG. 33 that there is no effect of the omission of calculations in the transient region as the rigorous summation values are required, but when the final summation values are in the saturation regions, the effect of the omission of calculations becomes noticeable for the final summation values which are more distanced from the saturation region boundary values.

Figure 34:
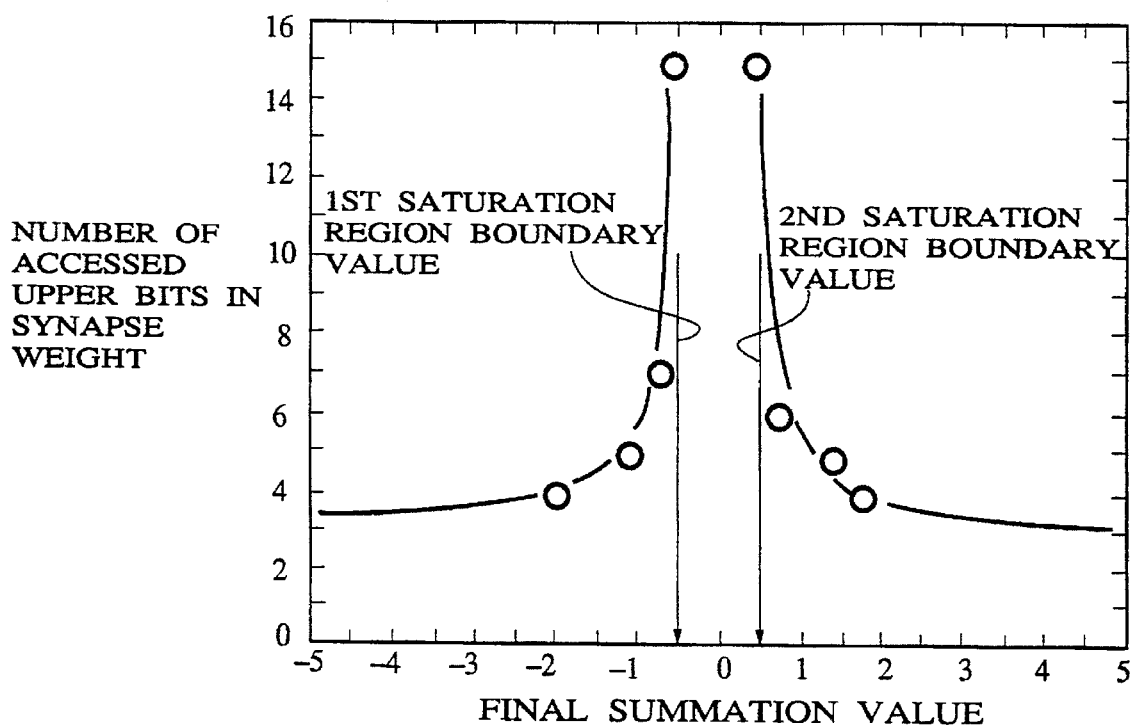
FIG. 34 is a graph of a number of accessed upper bits in synapse weight versus a final summation value showing the effect of the reduction of memory accesses in the seventh to ninth embodiments of a neural network circuit and a processing scheme according to the present invention.

On the other hand, FIG. 34 shows a relationship between the final summation value and the number of accessed upper bits in the synapse weight for the same exemplary case. It can be seen from this FIG. 34 that the effect of the reduction of memory accesses to the synapse weight memory circuit also becomes noticeable for the final summation value which are more distanced from the saturation region boundary values.

More specifically, these effects can be estimated quantitatively as follows. Namely, assuming that a possibility for the final summation value to be in the saturation region is 90%, a possibility for the final summation value to be in the transient region to be 10%, and the average rate of executed calculations when the final summation value is in the saturation region is 20% in accordance with FIG. 33, it is possible to reduce the amount of calculations to be approximately 28%.

Similarly, assuming that a possibility for the final summation value to be in the saturation region is 90%, a possibility for the final summation value to be in the transient region to be 10%, and the average number of accessed upper bits in the synapse weight when the final summation value is in the saturation region is 4 bits in accordance with FIG. 34, it is possible to reduce the number of memory accesses to be approximately 31%.

Thus, according to the seventh to ninth embodiments described above, it is also possible to reduce the amount of calculations required for the synapse calculations and the summation as well as a number of memory accesses to the synapse weights, such that the processing speed of the synapse calculations can be increased while the power consumption required for the calculations can be reduced, and as a consequence, it becomes possible to realize a large scale neural network circuit with a high processing speed which can obtain the accurate final result regardless of values taken by the input values and the synapse weights.

Referring now to FIGS. 35 to 41, the tenth embodiment of a neural network circuit and a processing scheme using the neural network circuit according to the present invention will be described in detail. Here, those elements which are substantially similar to the corresponding elements in the first to ninth embodiment described above will be given the same reference numerals in the figure and their description will be omitted.

In the usual neural network circuit, the synapse calculations for all the synapse connections and the summation for all the neurons are to be carried out by using the input value and the corresponding synapse weight. However, in a case many input signals are to be entered into the neural network continuously, there are cases in which not all of these many input values actually change with respect to each other. For instance, in a case of utilizing the neural network to the pattern recognition, as far as the input signals corresponding to the background are concerned, they are often given by the identical signals continuously. Also, in the often used neural network of the triple layer structure, the outputs of the hidden layer are entered into the output layer, but the majority of the hidden layer neurons often have the output levels in the saturation region, so that their outputs often take constant values. In such a case, the majority of the input values for the neurons of the output layer are going to be not changing from each other.

For this reason, in this tenth embodiment, the utilizable constant values are stored in the memory in advance, and these stored constant values are used as the outputs whenever possible, so as to reduce the amount of calculations as much as possible as well as the number of accesses to the large capacity memory required in conjunction with the calculations.

Figure 35:
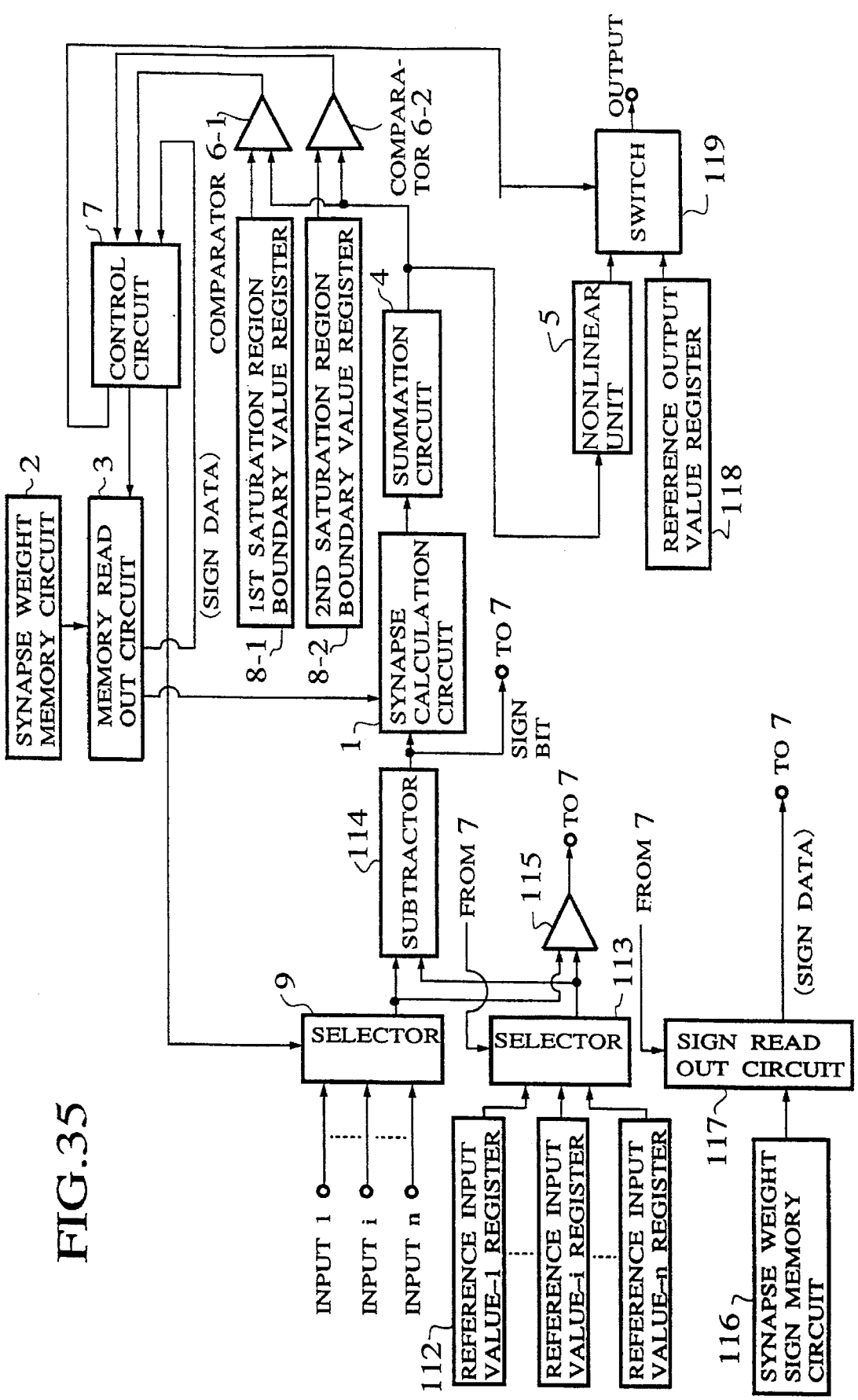
FIG. 35 is a block diagram of a neuron circuit for the tenth embodiment of a neural network circuit and a processing scheme according to the present invention.

To this end, in this tenth embodiment, each neuron circuit of the neural network circuit has a configuration as shown in FIG. 35, which differs from that of FIG. 9 for the second embodiment described above by further comprising: a plurality of reference input value registers 112 for storing a plurality of reference input values in correspondence to input 1 to input n; a selector 113 for selectively entering one of the reference input values from the reference input value registers 112 under the control of the control circuit 7; a subtractor 114 provided between the selector 9 and the synapse calculation circuit 1 for calculating an input difference between the input value entered from the selector 9 and the reference input value entered from the selector 113, and supplying the calculated input difference to the synapse calculation circuit 1 while also supplying a sign bit of the calculated input difference to the control circuit 7; a coincidence circuit 115 for detecting a coincidence of the input value entered from the selector 9 and the reference input value entered from the selector 113 and supplying a coincidence signal to the control circuit 7; a reference output value register 118 for storing a reference output value; and a switch 119 for selectively outputting the output obtained by the nonlinear unit 5 and the reference output value stored in the reference output value register 118 under the control of the control circuit 7.

The control circuit 7 stops calculations whenever the coincidence signal from the coincidence circuit 115 is received, and controls the switch 119 to output the reference output value from the reference output value register 118. In addition, the sign data of the synapse weight read out by the memory read out circuit 3 is supplied to the control circuit 7 along with the sign bit of the input difference from the subtractor 114, and the control circuit 7 judges whether it is necessary to carry out the calculation or not according to these sign data and the sign bit as described in detail below, and accordingly controls the switch 119.

Here, instead of providing the sign data of the synapse weight from the synapse weight memory circuit 2 through the memory read out circuit 3, it is also possible to provide a synapse weight sign memory circuit 116 for separately storing sign data of the synapse weights stored in the synapse weight memory circuit 2, and a sign read out circuit 117 for selectively reading out the sign data of the specified synapse weight to the control circuit 7 under the control of the control circuit 7. This configuration is advantageous because the synapse weight memory circuit 2 is going to be a large capacity external memory in a case of a large scale neural network circuit, and it is possible to increase the speed of the processing using the sign data by separately storing the sign data in the synapse weight sign memory circuit 116 which requires only a small capacity just like a cache memory. By means of this, the sign data required in judging whether it is necessary to carry out the calculation or not can be accessed at high speed, without requiring a time consuming access to the large capacity external memory.

In this configuration of FIG. 35, the synapse calculation circuit 1 carries out the synapse calculation with respect to the input difference calculated by the subtractor 114 and the synapse weight corresponding to the input value in the manner similar to that in the first embodiment described above, starting from the upper bits of the binary bit sequences representing the input difference and the synapse weight, such that the subsequent calculations are omitted whenever the comparators 6-1 and 6-2 indicate that the summation value obtained by the summation circuit 4 reaches to the saturation region.

Figure 36:
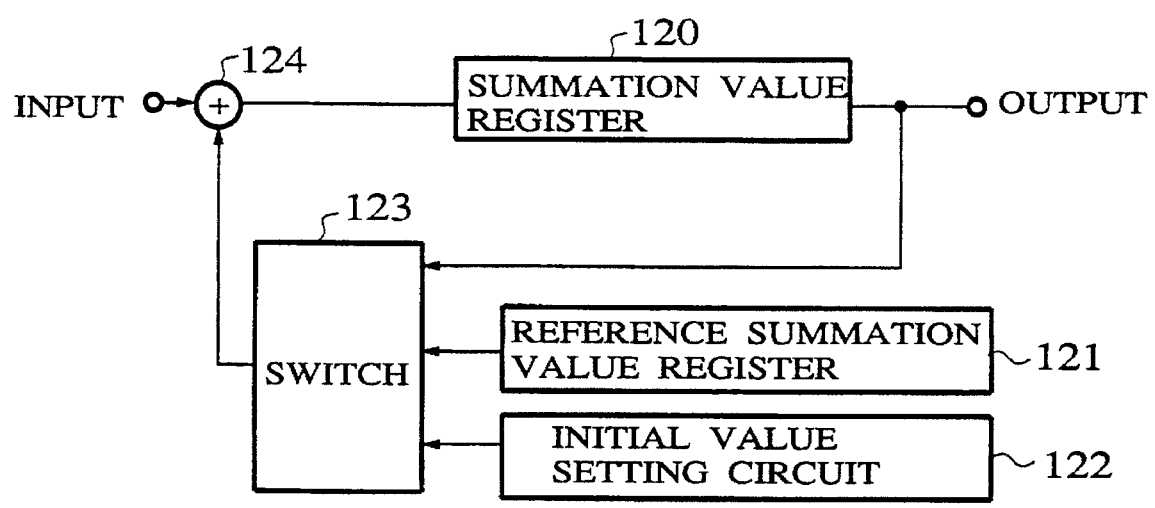
FIG. 36 is a block diagram of a summation circuit in the neuron circuit of FIG. 35.

Here, the summation circuit 4 has a detailed configuration as shown in FIG. 36, which comprises: a summation value register 120 for registering the current summation value to be outputted as an output of the summation circuit 4; a reference summation value register 121 for storing a reference summation value; an initial value setting circuit 122 for setting the initial value of the summation value in a manner described below; a switch 123 for selectively outputting one of the current summation value from the summation value register 120, the reference summation value from the reference summation value register 121, and the initial value from the initial value setting circuit 122; and an adder 124 for adding the output of the switch 123 and the input entered from the synapse calculation circuit 1 and storing the addition result into the summation value register 120. Here, the switch 123 is controlled such that the reference summation value from the reference summation value register 121 or the initial value from the initial value setting circuit 122 is outputted at a time of the initial value setting, and the current summation value from the summation value register 120 is outputted at a time of the calculation.

In this case, the initial value of the summation value is set up by the initial value setting circuit 122 as follows, so as to realize the monotonously increasing summation.

When the sign of the input difference and the sign of the synapse weight are identical, the initial value is set to be the reference summation value from the reference summation value register 121.

On the other hand, when the sign of the input difference and the sign of the synapse weight are different, the initial value is obtained by the following steps.

(a) A setting value of 0 is used when the i-th bit from the least significant bit of the absolute value portion of the input different is "0", where i is a sequential bit number of an absolute value portion from the least significant bit.

(b) A setting value of $-2^{(i+L-1)}+1$ is used when the i-th bit from the least significant bit of the absolute value portion of the input difference is "1", where L is a word length (bit length) of an absolute value portion of each value.

(c) All the setting values given by (a) and (b) with respect to all bits of the absolute value portion of the input difference for each synapse calculation is summed together, and a total of this sum and the reference summation value from the reference summation value register 121 is set as the initial value.

The synapse calculation is carried out in terms of the binary expressions of the input difference and the synapse weight, bit by bit from the upper bits of their absolute value portions. In a case the i-th bit of the input difference is "0", it is apparent that the synapse calculation result for that i-th bit is "0", so that the calculation for this i-th bit of the input difference and the synapse weight is omitted.

By means of this processing, just as in the first embodiment described above, the summation gradually converges from the initial value of the summation to the final value as the calculation progresses, and the calculation of the synapse calculation result to be summed proceeds from the upper bits, so that the the synapse calculation result changes from that with a larger absolute value to that with a smaller absolute value as the calculation progresses. In other words, the summation value gradually approaches from the approximated value to the accurate value. Then, when the summation value exceeds the first or second saturation region boundary value it can be ascertained that the summation result has reached the saturation region B or A, so that the subsequent calculations can be omitted.

In addition, the reference input values, the reference summation value, and the reference output value may be updated only when the current summation value has changed in a direction of approaching to the saturation region boundary value, so as to set new reference input values, reference summation value, and reference output value for judging the necessity of the subsequent calculations. Here, however, the other manner of updating the reference input values, the reference summation value, and the reference output value may be employed according to the input conditions and the application, if desired Now, in this tenth embodiment, the reference input values, the reference summation value, and the reference output value are provided in advance, such that the synapse calculation for the input difference is carried out only when the input value differs from the reference input values, and the final summation value is obtained by adding this synapse calculation result with the reference summation value. Thus, whenever the input value coincides with one of the reference input values, all the synapse calculations for this input value can be omitted, and the reference output value is outputted from the reference output value register 118, such that the amount of calculations as well as the number of accesses to the synapse weight memory circuit 2 which are required in conjunction with the synapse calculations can be reduced considerably.

In addition, in this tenth embodiment, whether the summation value started from the reference summation value is changing in a direction approaching to the saturation region boundary value, or in a direction departing from the saturation region boundary value is judged according to the sign of the input difference and the sign of the synapse weight, and the synapse calculation is carried out only when the summation value is changing in a direction approaching to the saturation region boundary value, so as to omit the calculations and the memory accesses in any other cases.

More specifically, in a case the synapse calculation is a multiplication of the input difference and the synapse weight, this processing is carried out according to the situations as follows.

Figure 37A:
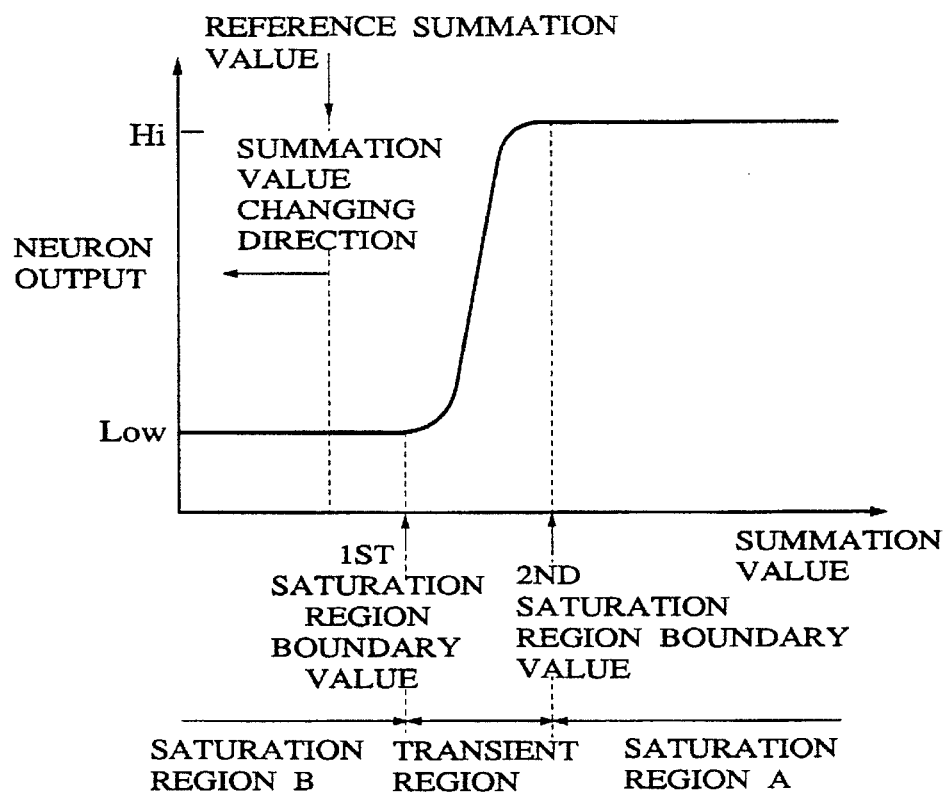
FIGS. 37A and 37B are graphs of a transfer characteristic of a nonlinear unit in the neuron circuit of FIG. 35, showing a manner of determining an omission of calculation in the tenth embodiment for one case.

(1) A case of the reference summation value<the first saturation region boundary value (corresponding to FIG. 37A when the signs of the input difference and the synapse weight are different, and to FIG. 37B when the signs of the input difference and the synapse weight are identical):

(a) When the input value<the reference input value, and the synapse weight value>0, as shown in FIG. 37A, the summation value changes in a direction departing from the first saturation region boundary value, and it is apparent that the next summation value is also going to be in the saturation region B, so that the calculation will be omitted.

Figure 37B:
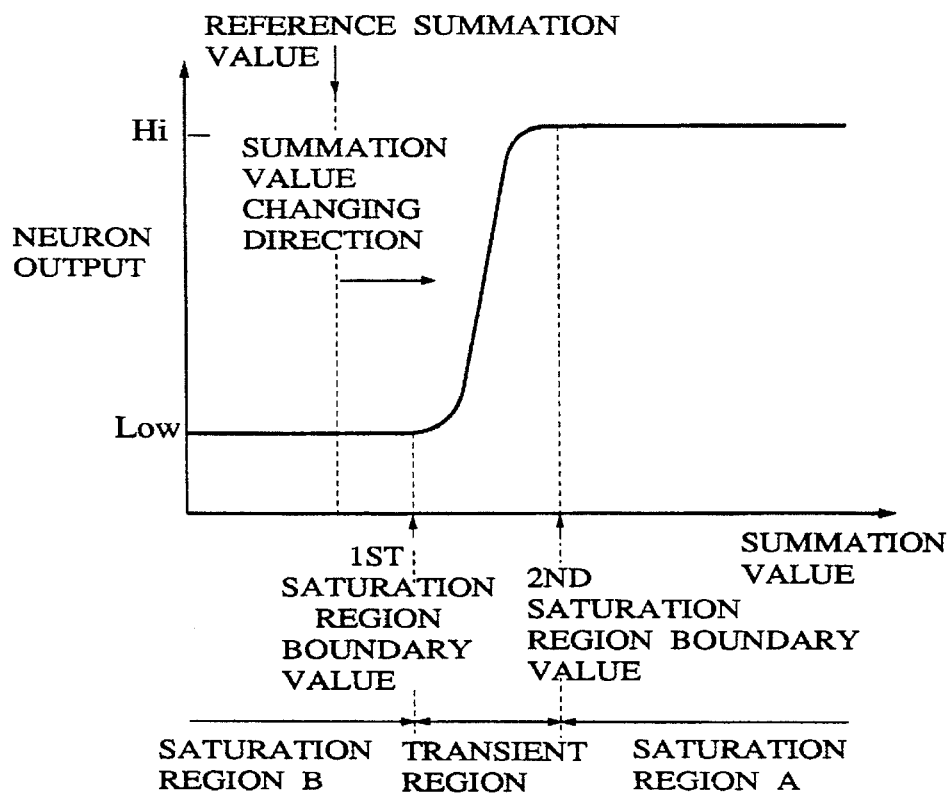

(b) When the input value<the reference input value, and the synapse weight value<0, as shown in FIG. 37B, the summation value changes in a direction approaching to the first saturation region boundary value, and it cannot be judged whether the final summation value is going to be in the saturation region or the transient region at this point, so that the calculation will be executed.

(c) When the input value>the reference input value, and the synapse weight value>0, as shown in FIG. 37B, the summation value changes in a direction approaching to the first saturation region boundary value, and it cannot be judged whether the final summation value is going to be in the saturation region or the transient region at this point, so that the calculation will be executed.

(d) When the input value>the reference input value, and the synapse weight value<0, as shown in FIG. 37A, the summation value changes in a direction departing from the first saturation region boundary value, and it is apparent that the next summation value is also going to be in the saturation region B, so that the calculation will be omitted.

Figure 38A:
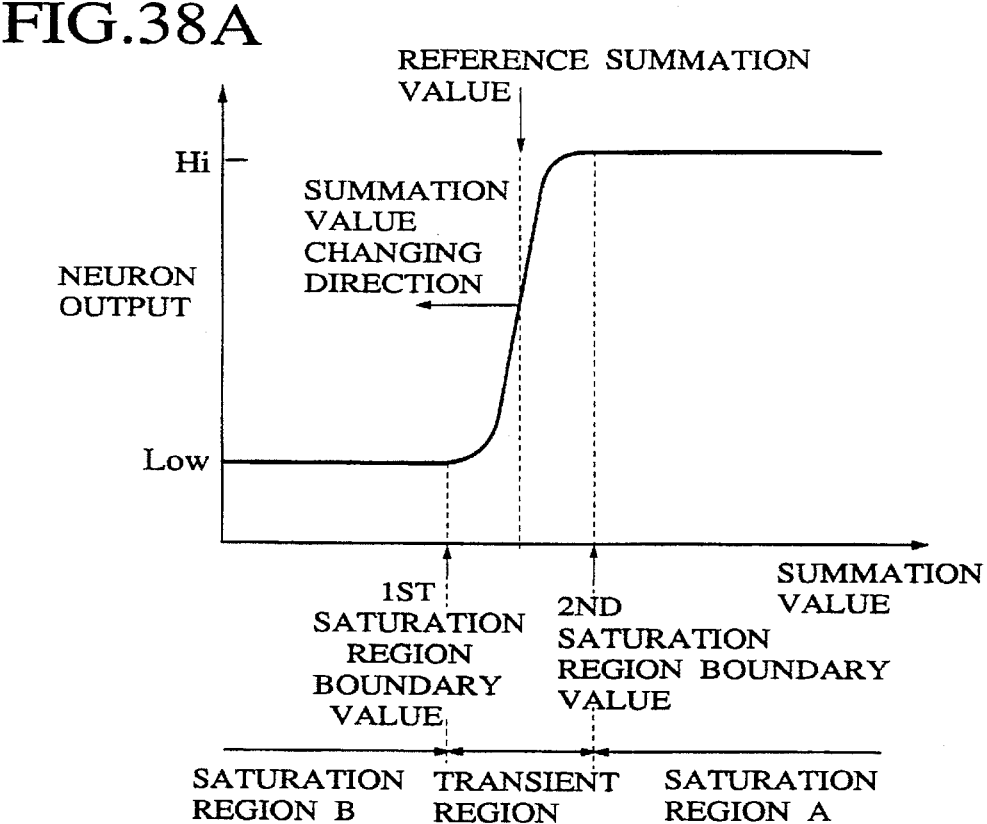
FIGS. 38A and 38B are graphs of a transfer characteristic of a nonlinear unit in the neuron circuit of FIG. 35, showing a manner of determining an omission of calculation in the tenth embodiment for another case.
Figure 38B:
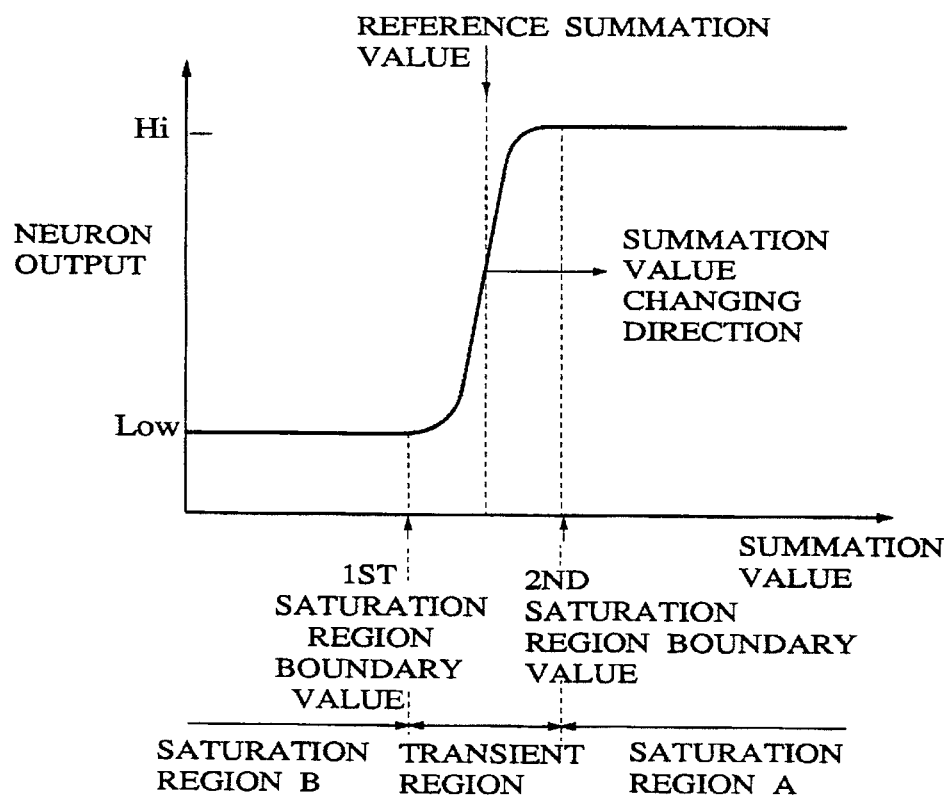

(2) A case of the first saturation region boundary value<the reference summation value<the second saturation region boundary value (corresponding to FIG. 38A when the signs of the input difference and the synapse weight are different, and to FIG. 38B when the signs of the input difference and the synapse weight are identical):

In this case, as shown in FIGS. 38A and 38B, the summation value changes in a direction approaching to either one of the saturation region boundary values regardless of the signs of the input difference and the synapse weight, and it cannot be judged whether the final summation value is going to be in the saturation region or the transient region at this point, so that the calculation will be executed.

Figure 39A:
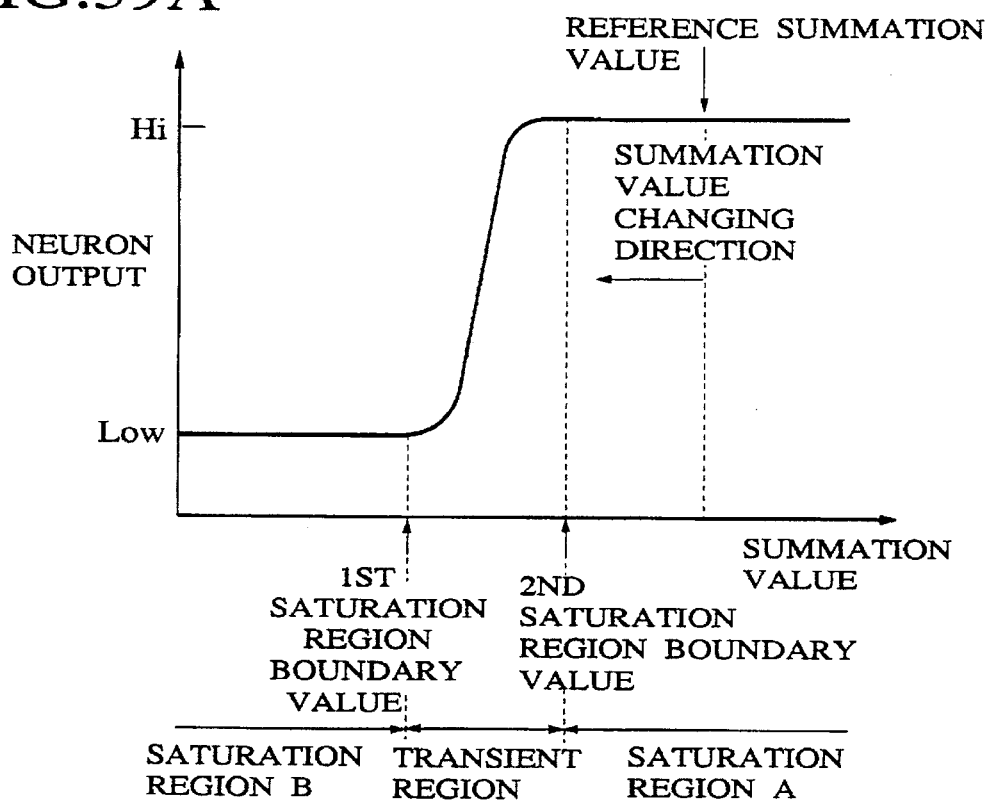
FIGS. 39A and 39B are graphs of a transfer characteristic of a nonlinear unit in the neuron circuit of FIG. 35, showing a manner of determining an omission of calculation in the tenth embodiment for another case.

(3) A case of the second saturation region boundary value<the reference summation value (corresponding to FIG. 39A when the signs of the input difference and the synapse weight are different, and to FIG. 39B when the signs of the input difference and the synapse weight are identical):

(a) When the input value<the reference input value, and the synapse weight value>0, as shown in FIG. 39A, the summation value changes in a direction approaching to the second saturation region boundary value, and it cannot be judged whether the final summation value is going to be in the saturation region or the transient region at this point, so that the calculation will be executed.

Figure 39B:
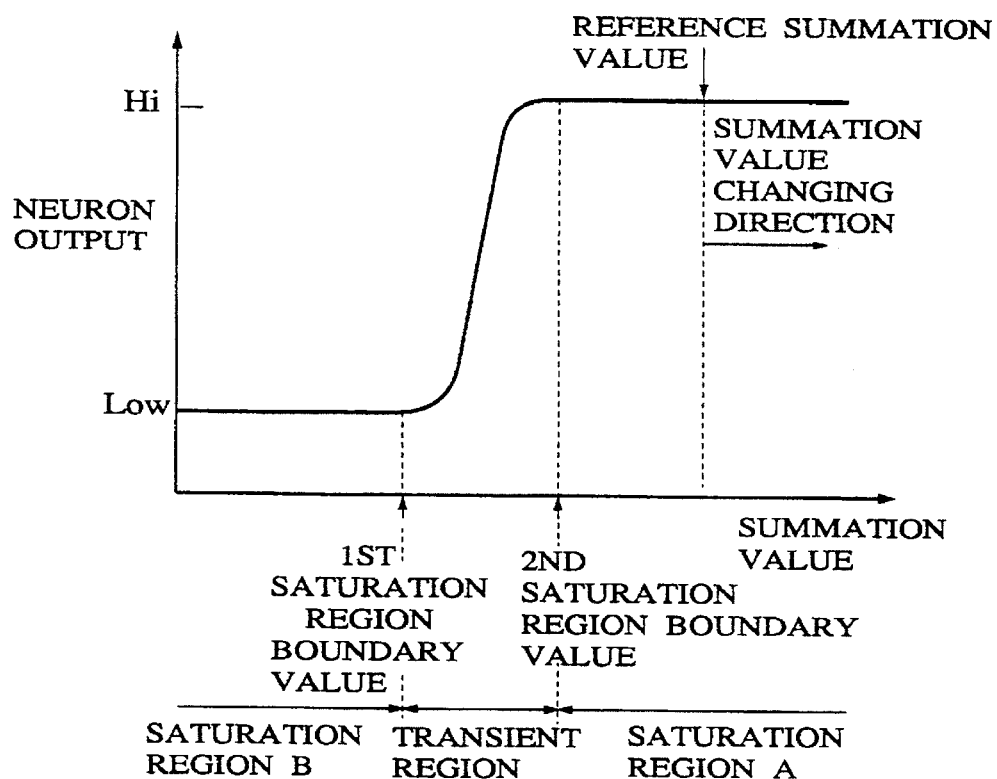

(b) When the input value<the reference input value, and the synapse weight value<0, as shown in FIG. 39B, the summation value changes in a direction departing from the second saturation region boundary value, and it is apparent that the next summation value is also going to be in the saturation region A, so that the calculation will be omitted.

(c) When the input value>the reference input value, and the synapse weight value>0, as shown in FIG. 39B, the summation value changes in a direction departing from the second saturation region boundary value, and it is apparent that the next summation value is also going to be in the saturation region A, so that the calculation will be omitted.

(d) When the input value>the reference input value, and the synapse weight value<0, as shown in FIG. 39A, the summation value changes in a direction approaching to the second saturation region boundary value, and it cannot be judged whether the final summation value is going to be in the saturation region or the transient region at this point, so that the calculation will be executed.

Now, with references to FIGS. 40 and 41, the simulation result indicating the effects of the omission of calculations and the reduction of the memory accesses to the synapse weight memory circuit according to the tenth embodiments of the present invention will be described.

Figure 40:
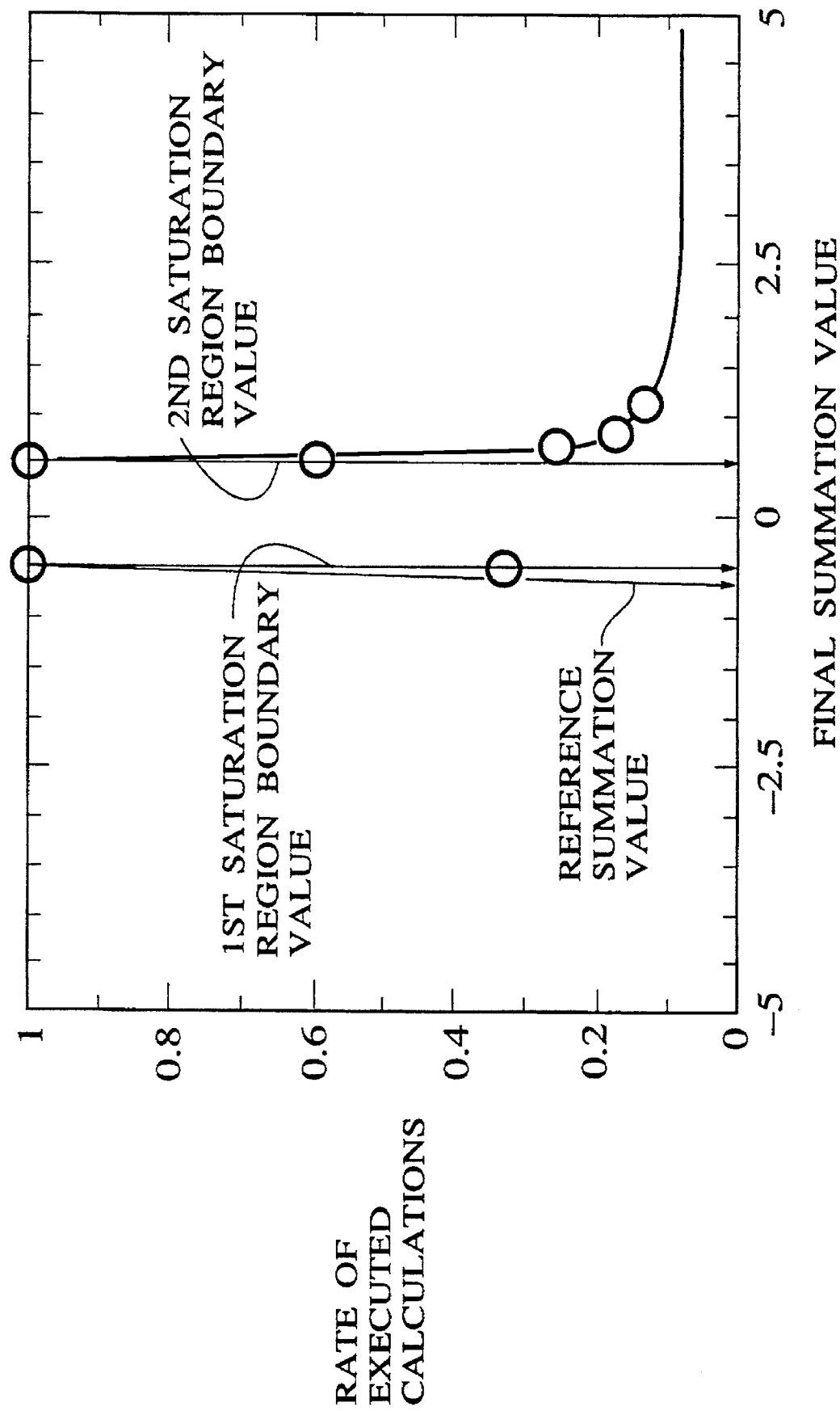
FIG. 40 is a graph of a rate of executed calculations versus a final summation value showing the effect of the omission of calculations in the tenth embodiment of a neural network circuit and a processing scheme according to the present invention.

FIG. 40 shows a relationship between the final summation value and the rate of executed calculations (i.e., a ratio of a number of calculations required in the system of the present invention with respect to a number of calculations required in the system of the prior art) for varying inputs in an exemplary case in which each of the synapse weight, the input value, and the reference input value comprises 16 bits including the sign bit and the absolute value portion, the reference summation value is set to be −0.693, the synapse weight is set to be −0.599, the reference input value is set to be 1.0, the first saturation region boundary value is set to be −0.5, and the second saturation region boundary value is set to be 0.5. It can be seen from this FIG. 40 that the effect of the omission of calculations becomes noticeable for the final summation values which are more distanced from the saturation region boundary values.

Figure 41:
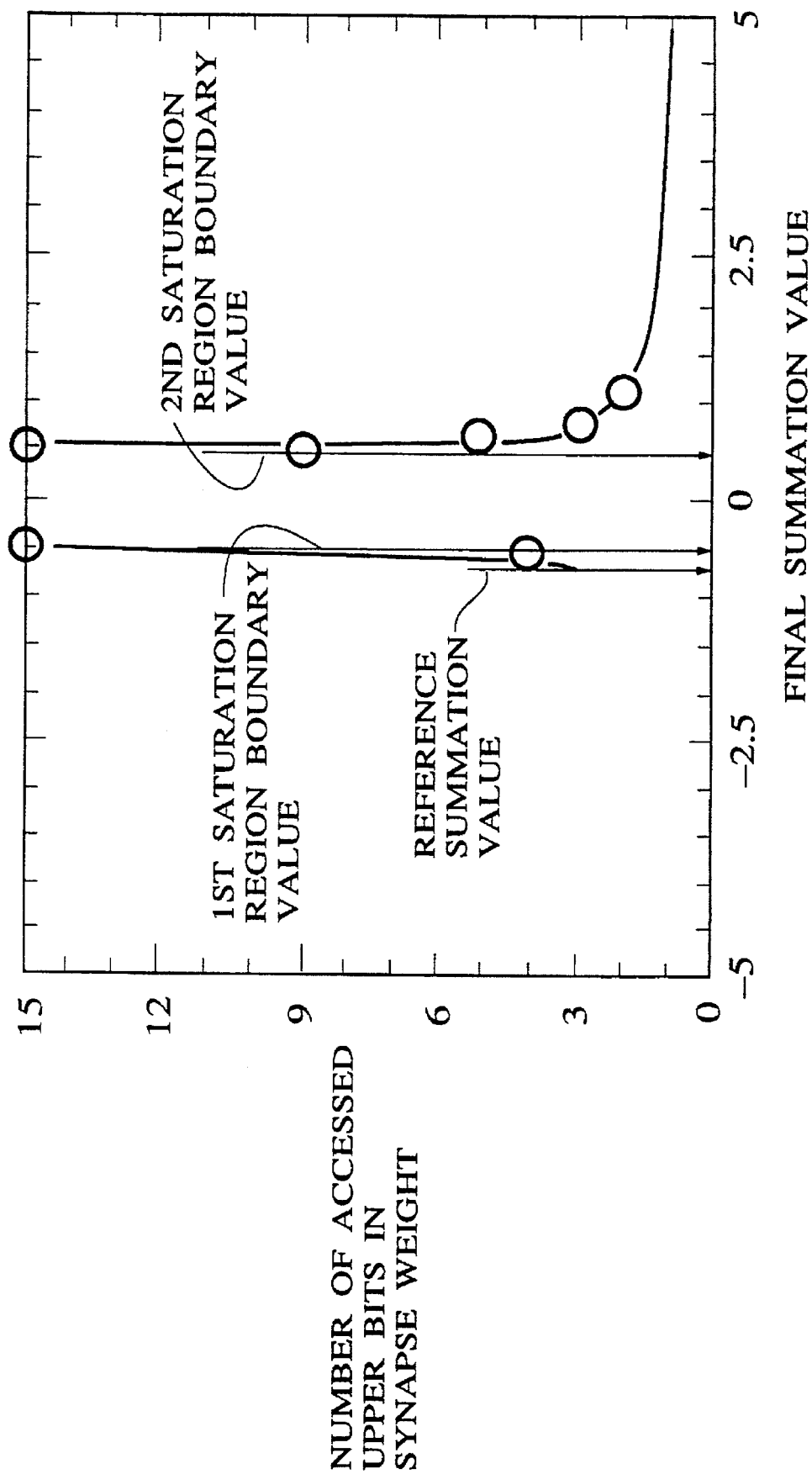
FIG. 41 is a graph of a number of accessed upper bits in synapse weight versus a final summation value showing the effect of the reduction of memory accesses in the tenth embodiment of a neural network circuit and a processing scheme according to the present invention.

On the other hand, FIG. 41 shows a relationship between the final summation value and the number of accessed upper bits in the synapse weight for the same exemplary case. It can be seen from this FIG. 41 that the effect of the reduction of memory accesses to the synapse weight memory circuit also becomes noticeable for the final summation value which are more distanced from the saturation region boundary values.

More specifically, these effects can be estimated quantitatively as follows. First, assuming that a rate by which the input value changes with respect to the reference input values among all the input values is 10%, the omission of calculations for the unchanged input values amounts to 90% reduction of the calculations. Moreover, assuming that a possibility for the reference summation value to be in the saturation region is 90%, a possibility for the reference summation value to be in the transient region to be 10%, a possibility for the summation value to change in a direction approaching to the saturation region boundary value when the reference summation value is in the saturation region is 50%, a possibility for the summation value to change in a direction departing from the saturation region boundary value when the reference summation value is in the saturation region is 50%, a possibility for the final summation value to be in the saturation region when the summation value approaches to the saturation region boundary value is 90%, a possibility for the final summation value to be in the transient region when the summation value approaches to the saturation region boundary value is 10%, and the average rate of executed calculations when the final summation value is in the saturation region is 20% in accordance with FIG. 40, it is possible to reduce the amount of calculations to be approximately 15.4%. Consequently, in total, the amount of calculations can be reduced to approximately 1.54%.

Similarly, assuming that a possibility for the input value to be unchanged from the reference input value to be 90%, a possibility for the reference summation value to be in the saturation region is 90%, a possibility for the reference summation value to be in the transient region to be 10%, a possibility for the summation value to change in a direction approaching to the saturation region boundary value when the reference summation value is in the saturation region is 50%, a possibility for the summation value to change in a direction departing from the saturation region boundary value when the reference summation value is in the saturation region is 50%, a possibility for the final summation value to be in the saturation region when the summation value approaches to the saturation region boundary value is 90%, a possibility for the final summation value to be in the transient region when the summation value approaches to the saturation region boundary value is 10%, and the average number of accessed upper bits in the synapse weight when the final summation value is in the saturation region is 1.5 bits in accordance with FIG. 41, it is possible to reduce the number of memory accesses to be approximately 0.77%.

Thus, according to the tenth embodiment described above, it is also possible to reduce the amount of calculations required for the synapse calculations and the summation as well as a number of memory accesses to the synapse weights, such that the processing speed of the synapse calculations can be increased while the power consumption required for the calculations can be reduced, and as a consequence, it becomes possible to realize a large scale neural network circuit with a high processing speed which can obtain the accurate final result regardless of values taken by the input values and the synapse weights.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A neural network circuit receiving a plurality of input values and outputting one output value, comprising:

calculation means for carrying out a synapse calculation for each input value and a corresponding synapse weight of each input value which are expressed by binary bit sequences, by using a sequentially specified bit of the corresponding synapse weight, and a summation calculation for sequentially summing synapse calculation results for the input values to obtain a summation value;

synapse weight memory circuit for storing a plurality of synapse weights;

memory read out circuit for selectively reading out a specified bit of a specified synapse weight from the synapse weight memory circuit to the calculation means;

a nonlinear unit for applying a prescribed nonlinear processing to the summation value obtained by the calculation means so as to determine the output value;

judging means for judging whether the summation value obtained by the calculation means reached to a saturation region of a transfer characteristic of the nonlinear unit; and control means for controlling the memory read out circuit and the calculation means to sequentially carry out the synapse calculation from upper bits of the corresponding synapse weight, and to stop the synapse calculation and the summation calculation whenever the judging means judges that the summation value obtained by the calculation means reached to the saturation region.

2. The neural network circuit of claim 1, wherein the calculation means sequentially carries out the synapse calculation by using all bits of each input value and each one bit of the corresponding synapse weight sequentially specified from upper bits to obtain a partial synapse calculation result for said each one bit, and adding each partial synapse calculation result for said each one bit with previous partial synapse calculation results for upper bits of said each one bit.

3. The neural network circuit of claim 2, wherein the calculation means includes:

a shifter for shifting all bits of each input value;

register means for registering a current summation value;

an adder for adding an output of the shifter and the current summation value registered in the register means, and updating the current summation value in the register means by an addition result; and a controller for controlling the shifter and the adder such that said adder carries out an addition of each partial synapse calculation result for all bits of each input value and said each one bit of the corresponding synapse weight required in the synapse calculation as well as an addition for sequentially summing synapse calculation results required in the summation calculation.

4. The neural network circuit of claim 3, wherein:

the calculation means further includes complementary expression conversion means for converting all bits of a specified input value into a complementary expression expressing the specified input value with a reversed sign such that the shifter shifts all bits of the complementary expression for the specified input value;

the register means includes a first register for registering a first summation value for monotonously decreasing calculations and a second register for registering a second summation value for monotonously increasing calculations such that the adder adds the output of the shifter and one of the first and second summation values registered in the first and second registers and updates said one of the first and second summation values in the first and second registers by the addition result;

the first register has an initial value of the first summation value set to be a maximum value that can possibly be taken by the synapse calculation result with a reversed sign, while the second register has an initial value of the second summation value set to be a minimum value that can possibly be taken by the synapse calculation result; and the calculation means carries out the synapse calculation for all bits of each input value and an i-th bit from a least significant bit of the corresponding synapse weight by adding "each input value×$2^i$" when said each input value is positive, to the second summation value when the i-th bit of the corresponding synapse weight has a bit value "1", or to the first summation value when the i-th bit of the corresponding synapse weight has a bit value "0", and adding "each input value with a reversed sign×$2^i$" when said each input value is negative, to the first summation value when the i-th bit of the corresponding synapse weight has a bit value "1", or to the second summation value when the i-th bit of the corresponding synapse weight has a bit value "0".

5. The neural network circuit of claim 3, wherein the register means includes a first register for registering a first summation value for monotonously decreasing calculations and a second register for registering a second summation value for monotonously increasing calculations such that the adder adds the output of the shifter and one of the first and second summation values registered in the first and second registers and updates said one of the first and second summation values in the first and second registers by the addition result;

the first register has an initial value of the first summation value set to be, while the second register has an initial value of the second summation value set to be; and the judging means judges that the summation value obtained by the calculation means reached to the saturation region when one of most significant bits of the first and second summation values changed from "1" to "0".

6. The neural network circuit of claim 3, wherein:

the calculation means further includes complementary expression conversion means for converting all bits of a specified input value into a complementary expression expressing the specified input value with a reversed sign such that the shifter shifts all bits of the complementary expression for the specified input value;

the register means includes a first register for registering a first summation value for monotonously decreasing calculations and a second register for registering a second summation value for monotonously increasing calculations such that the adder adds the output of the shifter and one of the first and second summation values registered in the first and second registers and updates said one of the first and second summation values in the first and second registers by the addition result;

the first register has an initial value of the first summation value set to be a maximum value that can possibly be taken by the synapse calculation result, while the second register has an initial value of the second summation value set to be a minimum value that can possibly be taken by the synapse calculation result with a reversed sign; and the calculation means carries out the synapse calculation for all bits of each input value and an i-th bit from a least significant bit of the corresponding synapse weight by adding "each input value with a reversed sign×$2^i$" when said each input value is positive, to the second summation value when the i-th bit of the corresponding synapse weight has a bit value "1", or to the first summation value when the i-th bit of the corresponding synapse weight has a bit value "0", and adding "each input value×$2^i$" when said each input value is negative, to the first summation value when the i-th bit of the corresponding synapse weight has a bit value "1", or to the second summation value when the i-th bit of the corresponding synapse weight has a bit value "0".

7. The neural network circuit of claim 3, wherein the register means includes a first register for registering a first summation value for monotonously decreasing calculations and a second register for registering a second summation value for monotonously increasing calculations such that the adder adds the output of the shifter and one of the first and second summation values registered in the first and second registers and updates said one of the first and second summation values in the first and second registers by the addition result;

the first register has an initial value of the first summation value set to be, while the second register has an initial value of the second summation value set to be; and the judging means judges that the summation value obtained by the calculation means reached to the saturation region when one of most significant bits of the first and second summation values changed from "0" to "1".

8. The neural network circuit of claim 1, wherein the calculation means has an initial value of the summation value for which the summation value monotonously increases or decreases as the sequentially carried out synapse calculations progress.

9. The neural network circuit of claim 8, wherein the calculation means has the initial value of the summation value set to be a maximum value that can possibly be taken by the synapse calculation result with a reversed sign for monotonously decreasing calculations, or the initial value of the summation value set to be a minimum value that can possibly be taken by the synapse calculation result for monotonously increasing calculations.

10. The neural network circuit of claim 1, wherein the calculation means sequentially carries out the synapse calculation by using each one bit of each input value and each one bit of the corresponding synapse weight which are sequentially specified from upper bits to obtain a partial synapse calculation result for said each one bit of each input value and said each one bit of the corresponding synapse weight, and adding each partial synapse calculation result for said each one bit of each input value and said each one bit of the corresponding synapse weight with previous partial synapse calculation results for upper bits of said each one bit of each input value and said each one bit of the corresponding synapse weight.

11. The neural network circuit of claim 10, wherein the calculation means includes:

a one bit multiplicator for calculating a product of said each one bit of each input value and said each one bit of the corresponding synapse weight;

register means for registering a current summation value;

a one bit adder for adding an output of the one bit multiplicator and a specified bit of the current summation value registered in the register means and updating the specified bit of the current summation value in the register means by an addition result; and a controller for controlling the one bit multiplicator and the one bit adder such that said one bit adder carries out an addition of each partial synapse calculation result for said each one bit of each input value and said each one bit of the corresponding synapse weight required in the synapse calculation as well as an addition for sequentially summing synapse calculation results required in the summation calculation.

12. The neural network circuit of claim 11, wherein the controller also controls the one bit multiplicator and the one bit adder such that operations at the one bit multiplicator and the one bit adder are omitted for a bit of each input value having a bit value "0".

13. The neural network circuit of claim 11, wherein:

the register means has an initial value of a monotonously decreasing summation value set to be when the synapse calculation result of each input value and the corresponding synapse weight is positive, or when the synapse calculation result of each input value and the corresponding synapse weight is negative, and an initial value of a monotonously increasing summation value set to be when the synapse calculation result of each input value and the corresponding synapse weight is positive, or when the synapse calculation result of each input value and the corresponding synapse weight is negative; and the judging means judges that the summation value obtained by the calculation means reached to the saturation region when there arises a need for a carrying a figure from one of most significant bits of the first and second summation values.

14. The neural network circuit of claim 10, wherein the calculation means includes:

a one bit multiplicator for calculating a product of each input value and the corresponding synapse weight bit by bit;

register means including a first register for registering a first summation value for monotonously decreasing calculations and a second register for registering a second summation value for monotonously increasing calculations, where the first register has an initial value of the first summation value set to be a total value of partial products of all bits of an absolute value portion of the corresponding synapse weight and each bit of each input value in which those partial products corresponding to bit values "1" in each input value are set to be entirely composed of "1" when the synapse calculation result of each input value and the corresponding synapse weight is positive, or "0" when the synapse calculation result of each input value and the corresponding synapse weight is negative, while the second register has an initial value of the second summation value set to be "0" when the synapse calculation result of each input value and the corresponding synapse weight is positive, or a total value of partial products of all bits of an absolute value portion of the corresponding synapse weight and each bit of each input value converted into 1's complementary expressions in which those partial products corresponding to bit values "1" in each input value are set to be entirely composed of "0" except for the most significant bit when the synapse calculation result of each input value and the corresponding synapse weight is negative;

a one bit adder for adding "1" and a specified bit of one of the first and second summation values registered in the register means and updating the specified bit of said one of the first and second summation values in the register means by an addition result according to the product obtained by the one bit multiplicator such that the one bit adder operates on the first summation value when the product has a positive sign and the specified bit of the product has a bit value "0" or when the product has a negative sign and the specified bit of the product has a bit value "1" whereas the one bit adder operates on the second summation value when the product has a positive sign and the specified bit of the product has a bit value "1" or when the product has a negative sign and the specified bit of the product has a bit value "0"; and a controller for controlling the one bit adder such that said one bit adder carries out an addition of each partial synapse calculation result for said each one bit of each input value and said each one bit of the corresponding synapse weight required in the synapse calculation as well as an addition for sequentially summing synapse calculation results required in the summation calculation for the first and second summation values;

and wherein the judging means judges whether each of the first and second summation values obtained by the calculation means reached to the saturation region.

15. The neural network circuit of claim 14, wherein the controller also controls the one bit multiplicator and the one bit adder such that operations at the one bit multiplicator and the one bit adder are omitted for a bit of each input value having a bit value "0".

16. The neural network circuit of claim 10, wherein the calculation means includes:

a one bit multiplicator for calculating a product of each input value and the corresponding synapse weight bit by bit;

register means including a first register for registering a first summation value for monotonously decreasing calculations and a second register for registering a second summation value for monotonously increasing calculations, where the first register has an initial value of the first summation value set to be when the synapse calculation result of each input value and the corresponding synapse weight is positive, or when the synapse calculation result of each input value and the corresponding synapse weight is negative, while the second register has an initial value of the second summation value set to be when the synapse calculation result of each input value and the corresponding synapse weight is positive, or when the synapse calculation result of each input value and the corresponding synapse weight is negative;

a one bit adder for adding "1" and a specified bit of one of the first and second summation values registered in the register means and updating the specified bit of said one of the first and second summation values in the register means by an addition result according to the product obtained by the one bit multiplicator such that the one bit adder operates on the first summation value when the product has a positive sign and the specified bit of the product has a bit value "0" or when the product has a negative sign and the specified bit of the product has a bit value "1" whereas the one bit adder operates on the second summation value when the product has a positive sign and the specified bit of the product has a bit value "1" or when the product has a negative sign and the specified bit of the product has a bit value "0"; and a controller for controlling the one bit adder such that said one bit adder carries out an addition of each partial synapse calculation result for said each one bit of each input value and said each one bit of the corresponding synapse weight required in the synapse calculation as well as an addition for sequentially summing synapse calculation results required in the summation calculation for the first and second summation values;

and wherein the judging means judges that each of the first and second summation values obtained by the calculation means reached to the saturation region when there arises a need for a carrying a figure from one of most significant bits of the first and second summation values.

17. A neural network system, comprising:

a plurality of neural network circuits which are independently operating with respect to each other, each neural network circuit receives a plurality of input values and outputs one output value, and includes:

calculation means for carrying out a synapse calculation for each input value and a corresponding synapse weight of each input value which are expressed by binary bit sequences, by using all bits of each input value and each one bit of the corresponding synapse weight sequentially specified from upper bits to obtain a partial synapse calculation result for said each one bit and adding each partial synapse calculation result for said each one bit with previous partial synapse calculation results for upper bits of said each one bit, and a summation calculation for sequentially summing synapse calculation results for the input values to obtain a summation value;

synapse weight memory circuit for storing a plurality of synapse weights;

memory read out circuit for selectively reading out a specified bit of a specified synapse weight from the synapse weight memory circuit to the calculation means;

a nonlinear unit for applying a prescribed nonlinear processing to the summation value obtained by the calculation means so as to determine the output value;

judging means for judging whether the summation value obtained by the calculation means reached to a saturation region of a transfer characteristic of the nonlinear unit; and control means for controlling the memory read out circuit and the calculation means to sequentially carry out the synapse calculation from upper bits of the corresponding synapse weight, and to stop the synapse calculation and the summation calculation whenever the judging means judges that the summation value obtained by the calculation means reached to the saturation region; and a common input value register for sequentially supplying said plurality of input values to each neural network circuit such that an identical one of said plurality of input values is supplied to all of said plurality of neural network circuits simultaneously.

18. A neural network circuit receiving a plurality of input values and outputting one output value, comprising:

reference input value register means for storing a plurality of reference input values in correspondence to said plurality of input values;

subtractor means for calculating a difference between each input value and a corresponding one of said plurality of reference input values to obtain an input difference for each input value;

calculation means for carrying out a synapse calculation for each input difference and a corresponding synapse weight of each input value and a summation calculation for summing synapse calculation results to obtain a summation value;

synapse weight memory circuit for storing a plurality of synapse weights;

memory read out circuit for selectively reading out the corresponding synapse weight from the synapse weight memory circuit to the calculation means;

a nonlinear unit for applying a prescribed nonlinear processing to the summation value obtained by the calculation means so as to determine the output value;

coincidence detection means for detecting a coincidence of each input value and the corresponding one of said plurality of reference input values;

reference output value register means for storing a reference output value corresponding to said plurality of reference input values;

switch means for selectively outputting one of the output value obtained by the nonlinear unit and the reference output value stored in the reference output value register means; and control means for controlling the calculation means and the switch means according to the coincidence detected by the coincidence detection means such that the calculation means stops the synapse calculation and the summation calculation while the switch means selectively outputs the reference output value stored in the reference output value register means whenever the coincidence detection means detects the coincidence, whereas the calculation means carries out the synapse calculation and the summation calculation while the switch means selectively outputs the output value obtained by the nonlinear unit otherwise.

19. The neural network circuit of claim 18, wherein the control means also controls the calculation means and the switch means according to a sign of the input difference obtained by the subtractor means and a sign of the corresponding synapse weight such that the calculation means carries out the synapse calculation and the summation calculation while the switch means selectively outputs the output value obtained by the nonlinear unit only when a direction of change of the summation value determined from the sign of the input difference and the sign of the corresponding synapse weight is in a direction approaching to a boundary value between a saturation region and a transient region in a transfer characteristic of the nonlinear unit, whereas the calculation means stops the synapse calculation and the summation calculation while the switch means selectively outputs the reference output value stored in the reference output value register means otherwise.

20. The neural network circuit of claim 19, further comprising:

a synapse weight sign memory circuit for storing the sign of each one of said plurality of synapse weights separately from the synapse weight memory circuit; and sign read out circuit for selectively reading out the sign of the corresponding synapse weight from the synapse weight sign memory circuit to the control means.

21. The neural network circuit of claim 18, further comprising:

judging means for judging whether the summation value obtained by the calculation means reached to a saturation region of a transfer characteristic of the nonlinear unit;

wherein the calculation means carries out the synapse calculation for each input difference and the corresponding synapse weight which are expressed by binary bit sequences, by using a sequentially specified bit of the corresponding synapse weight, the memory read out circuit selectively reads out a specified bit of a specified synapse weight from the synapse weight memory circuit to the calculation means, and the control means controls the memory read out circuit and the calculation means to sequentially carry out the synapse calculation from upper bits of the corresponding synapse weight, and to stop the synapse calculation and the summation calculation whenever the judging means judges that the summation value obtained by the calculation means reached to the saturation region.

22. A processing scheme using a neural network circuit receiving a plurality of input values and outputting one output value, comprising the steps of:

(a) carrying out a synapse calculation for each input value and a corresponding synapse weight of each input value which are expressed by binary bit sequences, by using a sequentially specified bit of the corresponding synapse weight, and a summation calculation for sequentially summing synapse calculation results for the input values to obtain a summation value;

(b) applying a prescribed nonlinear processing to the summation value obtained at the step (a) so as to determine the output value;

(c) judging whether the summation value obtained at the step (a) reached to a saturation region of a transfer characteristic of the prescribed nonlinear processing applied at the step (b); and (d) controlling the step (a) to sequentially carry out the synapse calculation from upper bits of the corresponding synapse weight, and to stop the synapse calculation and the summation calculation whenever the step (c) judges that the summation value obtained at the step (a) reached to the saturation region.

23. The processing scheme of claim 22, wherein the step (a) sequentially carries out the synapse calculation by using all bits of each input value and each one bit of the corresponding synapse weight sequentially specified from upper bits to obtain a partial synapse calculation result for said each one bit, and adding each partial synapse calculation result for said each one bit with previous partial synapse calculation results for upper bits of said each one bit.

24. The processing scheme of claim 23, wherein the step (a) includes the steps of:

(a1) shifting all bits of each input value by a shifter;

(a2) registering a current summation value in register means;

(a3) adding an output of the shifter and the current summation value registered in the register means by an adder, and updating the current summation value in the register means by an addition result; and (a4) controlling the shifter and the adder such that said adder carries out an addition of each partial synapse calculation result for all bits of each input value and said each one bit of the corresponding synapse weight required in the synapse calculation as well as an addition for sequentially summing synapse calculation results required in the summation calculation.

25. The processing scheme of claim 24, wherein:

the step (a) further includes the step of converting all bits of a specified input value into a complementary expression expressing the specified input value with a reversed sign such that the shifter shifts all bits of the complementary expression for the specified input value;

the register means includes a first register for registering a first summation value for monotonously decreasing calculations and a second register for registering a second summation value for monotonously increasing calculations such that the adder adds the output of the shifter and one of the first and second summation values registered in the first and second registers and updates said one of the first and second summation values in the first and second registers by the addition result;

the first register has an initial value of the first summation value set to be a maximum value that can possibly be taken by the synapse calculation result with a reversed sign, while the second register has an initial value of the second summation value set to be a minimum value that can possibly be taken by the synapse calculation result; and the step (a) carries out the synapse calculation for all bits of each input value and an i-th bit from a least significant bit of the corresponding synapse weight by adding "each input value×$2^i$" when said each input value is positive, to the second summation value when the i-th bit of the corresponding synapse weight has a bit value "1", or to the first summation value when the i-th bit of the corresponding synapse weight has a bit value "0", and adding "each input value with a reversed sign×$2^i$" when said each input value is negative, to the first summation value when the i-th bit of the corresponding synapse weight has a bit value "1", or to the second summation value when the i-th bit of the corresponding synapse weight has a bit value "0".

26. The processing scheme of claim 24, wherein the register means includes a first register for registering a first summation value for monotonously decreasing calculations and a second register for registering a second summation value for monotonously increasing calculations such that the adder adds the output of the shifter and one of the first and second summation values registered in the first and second registers and updates said one of the first and second summation values in the first and second registers by the addition result;

the first register has an initial value of the first summation value set to be, while the second register has an initial value of the second summation value set to be; and the step (c) judges that the summation value obtained at the step (a) reached to the saturation region when one of most significant bits of the first and second summation values changed from "1" to "0".

27. The processing scheme of claim 24, wherein:

the step (a) further includes the step of converting all bits of a specified input value into a complementary expression expressing the specified input value with a reversed sign such that the shifter shifts all bits of the complementary expression for the specified input value;

the register means includes a first register for registering a first summation value for monotonously decreasing calculations and a second register for registering a second summation value for monotonously increasing calculations such that the adder adds the output of the shifter and one of the first and second summation values registered in the first and second registers and updates said one of the first and second summation values in the first and second registers by the addition result;

the first register has an initial value of the first summation value set to be a maximum value that can possibly be taken by the synapse calculation result, while the second register has an initial value of the second summation value set to be a minimum value that can possibly be taken by the synapse calculation result with a reversed sign; and the step (a) carries out the synapse calculation for all bits of each input value and an i-th bit from a least significant bit of the corresponding synapse weight by adding "each input value with a reversed sign×2$^i$" when said each input value is positive, to the second summation value when the i-th bit of the corresponding synapse weight has a bit value "1", or to the first summation value when the i-th bit of the corresponding synapse weight has a bit value "0", and adding "each input value×2$^i$" when said each input value is negative, to the first summation value when the i-th bit of the corresponding synapse weight has a bit value "1", or to the second summation value when the i-th bit of the corresponding synapse weight has a bit value "0".

28. The processing scheme of claim 24, wherein the register means includes a first register for registering a first summation value for monotonously decreasing calculations and a second register for registering a second summation value for monotonously increasing calculations such that the adder adds the output of the shifter and one of the first and second summation values registered in the first and second registers and updates said one of the first and second summation values in the first and second registers by the addition result;

the first register has an initial value of the first summation value set to be, while the second register has an initial value of the second summation value set to be; and the step (c) judges that the summation value obtained at the step (a) reached to the saturation region when one of most significant bits of the first and second summation values changed from "0" to "1".

29. The processing scheme of claim 22, wherein the step (a) uses an initial value of the summation value for which the summation value monotonously increases or decreases as the sequentially carried out synapse calculations progress.

30. The processing scheme of claim 29, wherein the step (a) uses the initial value of the summation value set to be a maximum value that can possibly be taken by the synapse calculation result with a reversed sign for monotonously decreasing calculations, or the initial value of the summation value set to be a minimum value that can possibly be taken by the synapse calculation result for monotonously increasing calculations.

31. The processing scheme of claim 22, wherein the step (a) sequentially carries out the synapse calculation by using each one bit of each input value and each one bit of the corresponding synapse weight which are sequentially specified from upper bits to obtain a partial synapse calculation result for said each one bit of each input value and said each one bit of the corresponding synapse weight, and adding each partial synapse calculation result for said each one bit of each input value and said each one bit of the corresponding synapse weight with previous partial synapse calculation results for upper bits of said each one bit of each input value and said each one bit of the corresponding synapse weight.

32. The processing scheme of claim 31, wherein the step (a) Includes the steps of:

(a11) calculating a product of said each one bit of each input value and said each one bit of the corresponding synapse weight by a one bit multiplicator;

(a12) registering a current summation value in register means;

(a13) adding an output of the one bit multiplicator and a specified bit of the current summation value registered in the register means by a one bit adder, and updating the specified bit of the current summation value in the register means by an addition result; and (a14) controlling the one bit multiplicator and the one bit adder such that said one bit adder carries out an addition of each partial synapse calculation resist for said each one bit of each input value and said each one bit of the corresponding synapse weight required in the synapse calculation as well as an addition for sequentially summing synapse calculation results required in the summation calculation.

33. The processing scheme of claim 32, wherein the step (a14) also controls the one bit multiplicator and the one bit adder such that operations at the one bit multiplicator and the one bit adder are omitted for a bit of each input value having a bit value "0".

34. The processing scheme of claim 32, wherein:

the register means has an initial value of a monotonously decreasing summation value set to be when the synapse calculation result of each input value and the corresponding synapse weight is positive, or when the synapse calculation result of each input value and the corresponding synapse weight is negative, and an initial value of a monotonously increasing summation value set to be when the synapse calculation result of each input value and the corresponding synapse weight is positive, or when the synapse calculation result of each input value and the corresponding synapse weight is negative; and the step (c) judges that the summation value obtained at the step (a) reached to the saturation region when there arises a need for a carrying a figure from one of most significant bits of the first and second summation values.

35. The processing scheme of claim 31, wherein the step (a) includes the steps of:

(a21) calculating a product of each input value and the corresponding synapse weight by a one bit multiplicator bit by bit;

(a22) providing register means including a first register for registering a first summation value for monotonously decreasing calculations and a second register for registering a second summation value for monotonously increasing calculations, where the first register has an initial value of the first summation value set to be a total value of partial products of all bits of an absolute value portion of the corresponding synapse weight and each bit of each input value in which those partial products corresponding to bit values "1" in each input value are set to be entirely composed of "1" when the synapse calculation result of each input value and the corresponding synapse weight is positive, or "0" when the synapse calculation result of each input value and the corresponding synapse weight is negative, while the second register has an initial value of the second summation value set to be "0" when the synapse calculation result of each input value and the corresponding synapse weight is positive, or a total value of partial products of all bits of an absolute value portion of the corresponding synapse weight and each bit of each input value converted into 1's complementary expressions in which those partial products corresponding to bit values "1" in each input value are set to be entirely composed of "0" except for the most significant bit when the synapse calculation result of each input value and the corresponding synapse weight is negative;

(a23) adding "1" and a specified bit of one of the first and second summation values registered in the register means by a one bit adder and updating the specified bit of said one of the first and second summation values in the register means by an addition result according to the product obtained by the one bit multiplicator such that the one bit adder operates on the first summation value when the product has a positive sign and the specified bit of the product has a bit value "0" or when the product has a negative sign and the specified bit of the product has a bit value "1" whereas the one bit adder operates on the second summation value when the product has a positive sign and the specified bit of the product has a bit value "1" or when the product has a negative sign and the specified bit of the product has a bit value "0"; and (a24) controlling the one bit adder such that the one bit adder carries out an addition of each partial synapse calculation result for said each one bit of each input value and said each one bit of the corresponding synapse weight required in the synapse calculation as well as an addition for sequentially summing synapse calculation results required in the summation calculation for the first and second summation values;

and wherein the step (c) judges whether each of the first and second summation values obtained by the calculation means reached to the saturation region.

36. The processing scheme of claim 35, wherein the step (a24) also controls the one bit multiplicator and the one bit adder such that operations at the one bit multiplicator and the one bit adder are omitted for a bit of each input value having a bit value "0".

37. The processing scheme of claim 31, wherein the step (a) includes the steps of:

(a31) calculating a product of each input value and the corresponding synapse weight by a one bit multiplicator bit by bit;

(a32) providing register means including a first register for registering a first summation value for monotonously decreasing calculations and a second register for registering a second summation value for monotonously increasing calculations, where the first register has an initial value of the first summation value set to be when the synapse calculation result of each input value and the corresponding synapse weight is positive, or when the synapse calculation result of each input value and the corresponding synapse weight is negative, while the second register has an initial value of the second summation value set to be when the synapse calculation result of each input value and the corresponding synapse weight is positive, or when the synapse calculation result of each input value and the corresponding synapse weight is negative;

(a33) adding "1" and a specified bit of one of the first and second summation values registered in the register means by a one bit adder and updating the specified bit of said one of the first and second summation values in the register means by an addition result according to the product obtained by the one bit multiplicator such that the one bit adder operates on the first summation value when the product has a positive sign and the specified bit of the product has a bit value "0" or when the product has a negative sign and the specified bit of the product has a bit value "1" whereas the one bit adder operates on the second summation value when the product has a positive sign and the specified bit of the product has a bit value "1" or when the product has a negative sign and the specified bit of the product has a bit value "0"; and (a34) controlling the one bit adder such that the one bit adder carries out an addition of each partial synapse calculation result for said each one bit of each input value and said each one bit of the corresponding synapse weight required in the synapse calculation as well as an addition for sequentially summing synapse calculation results required in the summation calculation for the first and second summation values;

and wherein the step (c) judges that each of the first and second summation values obtained at the step (a) reached to the saturation region when there arises a need for a carrying a figure from one of most significant bits of the first and second summation values.

38. A processing scheme using a neural network system, comprising the steps of:

(a) independently operating a plurality of neural network circuits with respect to each other, by operating each neural network circuit which receives a plurality of input values and outputs one output value by the steps of:

(a1) carrying out a synapse calculation for each input value and a corresponding synapse weight of each input value which are expressed by binary bit sequences, by using all bits of each input value and each one bit of the corresponding synapse weight sequentially specified from upper bits to obtain a partial synapse calculation result for said each one bit and adding each partial synapse calculation result for said each one bit with previous partial synapse calculation results for upper bits of said each one bit, and a summation calculation for sequentially summing synapse calculation results for the input values to obtain a summation value;

(a2) applying a prescribed nonlinear processing to the summation value obtained at the step (a1) so as to determine the output value;

(a3) judging whether the summation value obtained at the step (a1) reached to a saturation region of a transfer characteristic of the prescribed nonlinear processing applied at the step (a2); and (a4) controlling the step (a1) to sequentially carry out the synapse calculation from upper bits of the corresponding synapse weight, and to stop the synapse calculation and the summation calculation whenever the step (a3) judges that the summation value obtained at the step (a1) reached to the saturation region; and (b) sequentially supplying said plurality of input values to each neural network circuit such that an identical one of said plurality of input values is supplied to all of said plurality of neural network circuits simultaneously.

39. A processing scheme using a neural network circuit receiving a plurality of input values and outputting one output value, comprising the steps of:

(a) storing in advance a plurality of reference input values in correspondence to said plurality of input values;

(b) calculating a difference between each input value and a corresponding one of said plurality of reference input values to obtain an input difference for each input value;

(c) carrying out a synapse calculation for each input difference and a corresponding synapse weight of each input value and a summation calculation for summing synapse calculation results to obtain a summation value;

(d) applying a prescribed nonlinear processing to the summation value obtained at the step (c) so as to determine the output value;

(e) detecting a coincidence of each input value and the corresponding one of said plurality of reference input values;

(f) storing in advance a reference output value corresponding to said plurality of reference input values;

(g) selectively outputting one of the output value obtained at the step (d) and the reference output value stored at the step (f); and (h) controlling the steps (c) and (g) according to the coincidence detected at the step (e) such that the step (c) stops the synapse calculation and the summation calculation while the step (g) selectively outputs the reference output value stored at the step (f) whenever the step (e) detects the coincidence, whereas the step (c) carries out the synapse calculation and the summation calculation while the step (g) selectively outputs the output value obtained at the step (d) otherwise.

40. The processing scheme of claim 39, wherein the step (h) also controls the steps (c) and (g) according to a sign of the input difference obtained at the step (b) and a sign of the corresponding synapse weight such that the step (c) carries out the synapse calculation and the summation calculation while the step (g) selectively outputs the output value obtained at the step (d) only when a direction of change of the summation value determined from the sign of the input difference and the sign of the corresponding synapse weight is in a direction approaching to a boundary value between a saturation region and a transient region in a transfer characteristic of the prescribed nonlinear processing applied at the step (d), whereas the step (c) stops the synapse calculation and the summation calculation while the step (g) selectively outputs the reference output value stored at the step (f) otherwise.

41. The processing scheme of claim 40, further comprising the steps of: (1) storing the sign of each one of said plurality of synapse weights separately from the synapse weights; and (j) selectively reading out the sign of the corresponding synapse weight stored at the step (1) so as to supply the sign of the corresponding synapse weight to the step (h).

42. The processing scheme of claim 39, further comprising the step of:

(k) judging whether the summation value obtained at the step (c) reached to a saturation region of a transfer characteristic of the prescribed nonlinear processing applied at the step (d);

wherein the step (a) carries out the synapse calculation for each input difference and the corresponding synapse weight which are expressed by binary bit sequences, by using a sequentially specified bit of the corresponding synapse weight, and the step (h) controls the step (c) to sequentially carry out the synapse calculation from upper bits of the corresponding synapse weight, and to stop the synapse calculation and the summation calculation whenever the step (k) judges that the summation value obtained at the step (c) reached to the saturation region.

* * * * *